(12) United States Patent
Yruski et al.

(10) Patent No.: US 8,676,900 B2
(45) Date of Patent: Mar. 18, 2014

(54) ASYNCHRONOUS ADVERTISING PLACEMENT BASED ON METADATA

(75) Inventors: Andrey Yruski, San Francisco, CA (US); Murgesh Navar, San Jose, CA (US); Roman Markovetski, Redwood City, CA (US)

(73) Assignee: Sony Computer Entertainment America LLC, San Mateo, CA (US)

( * ) Notice: Subject to any disclaimer, the term of this patent is extended or adjusted under 35 U.S.C. 154(b) by 601 days.

(21) Appl. No.: 11/586,989

(22) Filed: Oct. 25, 2006

(65) Prior Publication Data

US 2007/0094082 A1 Apr. 26, 2007

Related U.S. Application Data

(60) Provisional application No. 60/730,402, filed on Oct. 25, 2005.

(51) Int. Cl.
*G06F 15/16* (2006.01)
*G06Q 30/00* (2012.01)

(52) U.S. Cl.
USPC ............................................ 709/206; 705/14

(58) Field of Classification Search
USPC .................... 709/201–207, 230–237; 705/14
See application file for complete search history.

(56) References Cited

U.S. PATENT DOCUMENTS

| | | |
|---|---|---|
| 4,521,021 A | 6/1985 | Dixon |
| 4,542,897 A | 9/1985 | Melton et al. |
| 4,734,690 A | 3/1988 | Waller |
| 4,807,158 A | 2/1989 | Blanton et al. |
| 4,905,168 A | 2/1990 | McCarthy et al. |
| 4,926,255 A | 5/1990 | Von Kohorn |
| 4,969,036 A | 11/1990 | Bhanu et al. |
| 5,014,234 A | 5/1991 | Edwards, Jr. |
| 5,083,271 A | 1/1992 | Thacher et al. |
| 5,105,184 A | 4/1992 | Pirani et al. |
| 5,227,874 A | 7/1993 | Von Kohorn |
| 5,231,568 A | 7/1993 | Cohen et al. |
| 5,283,731 A | 2/1994 | Lalonde et al. |
| 5,305,195 A | 4/1994 | Murphy |
| 5,305,389 A | 4/1994 | Palmer |
| 5,319,454 A | 6/1994 | Schutte |
| 5,347,632 A | 9/1994 | Filepp et al. |
| 5,373,440 A | 12/1994 | Cohen et al. |
| 5,377,997 A | 1/1995 | Wilden et al. |

(Continued)

FOREIGN PATENT DOCUMENTS

| | | |
|---|---|---|
| AU | 9959097 | 11/1999 |
| AU | WO9959097 A1 | 11/1999 |

(Continued)

OTHER PUBLICATIONS

Business Wire, "Juno launches America's first free Internet e-mail service; Initial advertisers include Land's End, Miramax and Snapple," Apr. 19, 1996.

(Continued)

*Primary Examiner* — David X Yi

(74) *Attorney, Agent, or Firm* — Lewis Roca Rothgerber LLP

(57) ABSTRACT

A podcast system and method are provided to select and deliver media ads over a network to a user device and to insert the media ads in media content subscribed to and delivered over the network to the user device.

8 Claims, 33 Drawing Sheets

(56) References Cited

U.S. PATENT DOCUMENTS

| | | |
|---|---|---|
| 5,446,919 A | 8/1995 | Wilkins |
| 5,462,275 A | 10/1995 | Lowe et al. |
| 5,497,479 A | 3/1996 | Hornbuckle |
| 5,512,935 A | 4/1996 | Majeti et al. |
| 5,526,041 A | 6/1996 | Glatt |
| 5,539,450 A | 7/1996 | Handelman |
| 5,548,645 A | 8/1996 | Ananda |
| 5,564,038 A | 10/1996 | Grantz et al. |
| 5,565,909 A | 10/1996 | Thibadeau et al. |
| 5,572,643 A | 11/1996 | Judson |
| 5,592,212 A | 1/1997 | Handelman |
| 5,630,757 A | 5/1997 | Gagin et al. |
| 5,636,346 A | 6/1997 | Saxe |
| 5,663,757 A | 9/1997 | Morales |
| 5,684,526 A | 11/1997 | Yoshinobu |
| 5,697,844 A | 12/1997 | Von Kohorn |
| 5,699,497 A | 12/1997 | Erdahl et al. |
| 5,707,289 A | 1/1998 | Watanabe et al. |
| 5,712,979 A | 1/1998 | Graber et al. |
| 5,721,827 A | 2/1998 | Logan et al. |
| 5,724,521 A | 3/1998 | Dedrick |
| 5,748,867 A | 5/1998 | Cosman et al. |
| 5,751,956 A | 5/1998 | Kirsch |
| 5,758,068 A | 5/1998 | Brandt et al. |
| 5,758,257 A | 5/1998 | Herz et al. |
| 5,771,347 A | 6/1998 | Grantz et al. |
| 5,774,170 A | 6/1998 | Hite et al. |
| 5,794,210 A | 8/1998 | Goldhaber et al. |
| 5,798,519 A | 8/1998 | Vock et al. |
| 5,805,815 A | 9/1998 | Hill |
| 5,822,523 A | 10/1998 | Rothschild et al. |
| 5,848,396 A | 12/1998 | Gerace |
| 5,855,008 A | 12/1998 | Goldhaber et al. |
| 5,857,149 A | 1/1999 | Suzuki |
| 5,860,073 A | 1/1999 | Ferrel et al. |
| 5,867,208 A | 2/1999 | McLaren |
| 5,876,286 A | 3/1999 | Lee |
| 5,879,235 A | 3/1999 | Kaneko et al. |
| 5,903,816 A | 5/1999 | Broadwin et al. |
| 5,910,987 A | 6/1999 | Ginter et al. |
| 5,911,582 A | 6/1999 | Redford |
| 5,916,024 A | 6/1999 | Von Kohorn |
| 5,917,725 A | 6/1999 | Thacher et al. |
| 5,929,850 A | 7/1999 | Broadwin et al. |
| 5,937,037 A | 8/1999 | Kamel et al. |
| 5,946,646 A | 8/1999 | Schena et al. |
| 5,946,664 A | 8/1999 | Ebisawa |
| 5,948,061 A | 9/1999 | Merriman et al. |
| 5,964,660 A | 10/1999 | James et al. |
| 5,970,143 A | 10/1999 | Schneier et al. |
| 5,974,398 A | 10/1999 | Hanson et al. |
| 5,987,511 A | 11/1999 | Elixmann et al. |
| 6,005,602 A | 12/1999 | Matthews, III |
| 6,012,984 A | 1/2000 | Roseman |
| 6,015,348 A | 1/2000 | Lambright et al. |
| 6,020,883 A | 2/2000 | Herz et al. |
| 6,024,643 A | 2/2000 | Begis |
| 6,026,368 A | 2/2000 | Brown et al. |
| 6,029,046 A | 2/2000 | Khan et al. |
| 6,036,601 A | 3/2000 | Heckel |
| 6,047,289 A | 4/2000 | Thorne et al. |
| 6,088,722 A | 7/2000 | Herz et al. |
| 6,108,637 A | 8/2000 | Blumenau |
| 6,113,494 A | 9/2000 | Lennert |
| 6,149,519 A | 11/2000 | Osaki et al. |
| 6,151,631 A | 11/2000 | Ansell et al. |
| 6,165,070 A | 12/2000 | Nolte et al. |
| 6,179,713 B1 | 1/2001 | James et al. |
| 6,181,988 B1 | 1/2001 | Schneider et al. |
| 6,196,920 B1 | 3/2001 | Spaur et al. |
| 6,199,082 B1 | 3/2001 | Ferrel et al. |
| 6,236,975 B1 | 5/2001 | Boe et al. |
| 6,238,290 B1 | 5/2001 | Tarr et al. |
| 6,251,017 B1 | 6/2001 | Leason et al. |
| 6,263,360 B1 | 7/2001 | Arnold et al. |
| 6,264,555 B1 | 7/2001 | Glazman et al. |
| 6,264,560 B1 | 7/2001 | Goldberg et al. |
| 6,267,672 B1 | 7/2001 | Vance |
| 6,267,675 B1 | 7/2001 | Lee |
| 6,275,854 B1 | 8/2001 | Himmel et al. |
| 6,275,989 B1 | 8/2001 | Broadwin et al. |
| 6,308,328 B1 | 10/2001 | Bowcutt et al. |
| 6,312,337 B1 | 11/2001 | Edwards et al. |
| 6,320,495 B1 | 11/2001 | Sporgis |
| 6,324,519 B1 | 11/2001 | Eldering |
| 6,343,990 B1 | 2/2002 | Rasmussen et al. |
| 6,346,045 B2 | 2/2002 | Rider et al. |
| 6,366,701 B1 | 4/2002 | Chalom et al. |
| 6,371,850 B1 | 4/2002 | Sonoda |
| 6,379,251 B1 | 4/2002 | Auxier et al. |
| 6,381,362 B1 | 4/2002 | Deshpande et al. |
| 6,385,592 B1 | 5/2002 | Angles et al. |
| 6,390,922 B1 | 5/2002 | Vange et al. |
| 6,393,574 B1 | 5/2002 | Kashiwagi et al. |
| 6,394,899 B1 | 5/2002 | Walker |
| 6,400,996 B1 | 6/2002 | Hoffberg et al. |
| 6,411,936 B1 | 6/2002 | Sanders |
| 6,434,614 B1 | 8/2002 | Blumenau |
| 6,443,843 B1 | 9/2002 | Walker et al. |
| 6,446,130 B1 | 9/2002 | Grapes |
| 6,456,234 B1 | 9/2002 | Johnson |
| 6,468,155 B1 | 10/2002 | Zucker et al. |
| 6,470,138 B1 | 10/2002 | Um et al. |
| 6,484,148 B1 | 11/2002 | Boyd |
| 6,484,149 B1 | 11/2002 | Jammes et al. |
| 6,489,955 B1 | 12/2002 | Newhall, Jr. |
| 6,496,826 B1 | 12/2002 | Chowdhury et al. |
| 6,513,160 B2 | 1/2003 | Dureau |
| 6,516,338 B1 | 2/2003 | Landsman et al. |
| 6,529,940 B1 | 3/2003 | Humble |
| 6,530,840 B1 | 3/2003 | Cuomo et al. |
| 6,532,448 B1 | 3/2003 | Higginson et al. |
| 6,539,375 B2 | 3/2003 | Kawasaki |
| 6,539,544 B2 | 3/2003 | Ebisawa |
| 6,553,178 B2 | 4/2003 | Abecassis |
| 6,563,523 B1 | 5/2003 | Suchochki et al. |
| 6,564,217 B2 | 5/2003 | Bunney et al. |
| 6,595,859 B2 | 7/2003 | Lynn |
| 6,606,746 B1 | 8/2003 | Zdepski et al. |
| 6,611,813 B1 | 8/2003 | Bratton |
| 6,611,957 B2 | 8/2003 | Ebisawa |
| 6,632,138 B1 | 10/2003 | Serizawa et al. |
| 6,640,097 B2 | 10/2003 | Corrigan et al. |
| 6,640,335 B2 | 10/2003 | Ebisawa |
| 6,640,336 B1 | 10/2003 | Ebisawa |
| 6,645,068 B1 | 11/2003 | Kelly et al. |
| 6,654,725 B1 | 11/2003 | Langheinrich et al. |
| 6,659,861 B1 | 12/2003 | Faris et al. |
| 6,669,562 B1 | 12/2003 | Shiino |
| 6,669,564 B1 | 12/2003 | Young et al. |
| 6,680,746 B2 | 1/2004 | Kawai et al. |
| 6,687,608 B2 | 2/2004 | Sugimoto et al. |
| 6,698,020 B1 | 2/2004 | Zigmond et al. |
| 6,699,127 B1 | 3/2004 | Lobb et al. |
| 6,701,363 B1 | 3/2004 | Chiu et al. |
| 6,714,236 B1 | 3/2004 | Wada et al. |
| 6,716,103 B1 | 4/2004 | Eck et al. |
| 6,718,551 B1 | 4/2004 | Swix et al. |
| 6,721,748 B1 | 4/2004 | Knight et al. |
| 6,731,238 B2 | 5/2004 | Johnson |
| 6,738,078 B1 | 5/2004 | Duncombe |
| 6,758,746 B1 | 7/2004 | Hunter et al. |
| 6,758,754 B1 | 7/2004 | Lavanchy et al. |
| 6,764,403 B2 | 7/2004 | Gavin |
| 6,783,460 B2 | 8/2004 | Galyean, III et al. |
| 6,827,645 B2 | 12/2004 | Morita et al. |
| 6,840,861 B2 | 1/2005 | Jordan et al. |
| 6,874,683 B2 | 4/2005 | Keronen et al. |
| 6,882,978 B2 | 4/2005 | Ebisawa |
| 6,890,256 B2 | 5/2005 | Walker et al. |
| 6,895,170 B1 | 5/2005 | Lambert et al. |
| 6,912,398 B1 | 6/2005 | Domnitz |
| 6,928,414 B1 | 8/2005 | Kim |
| 6,941,574 B1 | 9/2005 | Broadwin et al. |

(56) References Cited

U.S. PATENT DOCUMENTS

| | | |
|---|---|---|
| 6,942,575 B2 | 9/2005 | Mergler |
| 6,954,728 B1 | 10/2005 | Kusumoto |
| 6,955,605 B2 | 10/2005 | Young et al. |
| 6,964,608 B1 | 11/2005 | Koza |
| 6,967,566 B2 | 11/2005 | Weston et al. |
| 6,968,567 B1 | 11/2005 | Gordon et al. |
| 6,970,834 B2 | 11/2005 | Martin et al. |
| 6,970,915 B1 | 11/2005 | Partovi et al. |
| 6,973,664 B2 | 12/2005 | Fries |
| 6,987,221 B2 | 1/2006 | Platt |
| 7,028,082 B1 | 4/2006 | Rosenberg et al. |
| 7,072,849 B1 | 7/2006 | Filepp et al. |
| 7,086,187 B2 | 8/2006 | Bandak |
| 7,136,871 B2 | 11/2006 | Ozer et al. |
| 7,305,442 B1 | 12/2007 | Lundy |
| 7,362,999 B2 | 4/2008 | Petschke et al. |
| 7,363,643 B2 | 4/2008 | Drake et al. |
| 7,370,002 B2 | 5/2008 | Heckerman et al. |
| 7,386,127 B2 | 6/2008 | Bar-On |
| 7,401,140 B2 | 7/2008 | Goulden et al. |
| 7,421,454 B2 | 9/2008 | DeShan et al. |
| 7,437,368 B1 | 10/2008 | Kolluri et al. |
| 7,466,823 B2 | 12/2008 | Vestergaard et al. |
| 7,487,112 B2 | 2/2009 | Barnes, Jr. |
| 7,594,189 B1 | 9/2009 | Walker et al. |
| 8,005,713 B1 | 8/2011 | Sanz-Pastor et al. |
| 8,024,766 B2 | 9/2011 | Addington |
| 8,074,076 B2 | 12/2011 | Courtois |
| 8,175,921 B1 | 5/2012 | Kopra |
| 8,191,088 B2 | 5/2012 | Edwards et al. |
| 8,267,783 B2 | 9/2012 | van Datta |
| 8,272,964 B2 | 9/2012 | van Datta |
| 8,302,030 B2 | 10/2012 | Soroca et al. |
| 2001/0011226 A1 | 8/2001 | Greer et al. |
| 2001/0013009 A1 | 8/2001 | Greening et al. |
| 2001/0014915 A1 | 8/2001 | Blumenau |
| 2001/0025254 A1 | 9/2001 | Park |
| 2001/0025274 A1 | 9/2001 | Zehr et al. |
| 2001/0027412 A1 | 10/2001 | Son |
| 2001/0032125 A1 | 10/2001 | Bhan et al. |
| 2001/0032132 A1 | 10/2001 | Moran |
| 2001/0032133 A1 | 10/2001 | Moran |
| 2001/0032137 A1 | 10/2001 | Bennett et al. |
| 2001/0034643 A1 | 10/2001 | Acres |
| 2001/0034762 A1 | 10/2001 | Jacobs et al. |
| 2001/0037232 A1 | 11/2001 | Miller |
| 2001/0039210 A1 | 11/2001 | St-Denis |
| 2001/0047297 A1 | 11/2001 | Wen |
| 2001/0052123 A1 | 12/2001 | Kawai |
| 2002/0004743 A1 | 1/2002 | Kutaragi et al. |
| 2002/0004744 A1 | 1/2002 | Muyres et al. |
| 2002/0007307 A1 | 1/2002 | Miller et al. |
| 2002/0007310 A1 | 1/2002 | Long |
| 2002/0010626 A1 | 1/2002 | Agmoni |
| 2002/0010628 A1 | 1/2002 | Burns |
| 2002/0010757 A1 | 1/2002 | Granik et al. |
| 2002/0013174 A1 | 1/2002 | Murata |
| 2002/0018076 A1 | 2/2002 | Gianola |
| 2002/0018982 A1 | 2/2002 | Conroy |
| 2002/0019774 A1 | 2/2002 | Kanter |
| 2002/0022476 A1 | 2/2002 | Go |
| 2002/0022516 A1 | 2/2002 | Forden |
| 2002/0023000 A1 | 2/2002 | Bollay |
| 2002/0026345 A1 | 2/2002 | Juels |
| 2002/0026355 A1 | 2/2002 | Mitsuoka et al. |
| 2002/0032608 A1 | 3/2002 | Kanter |
| 2002/0032906 A1 | 3/2002 | Grossman |
| 2002/0044687 A1 | 4/2002 | Federman |
| 2002/0046087 A1 | 4/2002 | Hey |
| 2002/0046095 A1 | 4/2002 | Wallace |
| 2002/0046102 A1 | 4/2002 | Dohring et al. |
| 2002/0049968 A1 | 4/2002 | Wilson et al. |
| 2002/0051521 A1 | 5/2002 | Patrick |
| 2002/0055833 A1 | 5/2002 | Sterling |
| 2002/0055876 A1 | 5/2002 | Gabler |
| 2002/0059577 A1 | 5/2002 | Lu et al. |
| 2002/0059590 A1 | 5/2002 | Kitsukawa et al. |
| 2002/0059610 A1 | 5/2002 | Ellis |
| 2002/0061778 A1 | 5/2002 | Acres |
| 2002/0067730 A1 | 6/2002 | Hinderks et al. |
| 2002/0069240 A1 | 6/2002 | Berk |
| 2002/0069405 A1 | 6/2002 | Chapin et al. |
| 2002/0072965 A1 | 6/2002 | Merriman et al. |
| 2002/0073235 A1 | 6/2002 | Chen et al. |
| 2002/0077906 A1 | 6/2002 | Remler |
| 2002/0078441 A1 | 6/2002 | Drake et al. |
| 2002/0082077 A1 | 6/2002 | Johnson et al. |
| 2002/0082910 A1 | 6/2002 | Kontogouris |
| 2002/0082913 A1 | 6/2002 | Li |
| 2002/0082941 A1 | 6/2002 | Bird |
| 2002/0087402 A1 | 7/2002 | Zustak |
| 2002/0087403 A1 | 7/2002 | Meyers et al. |
| 2002/0087887 A1 | 7/2002 | Busam et al. |
| 2002/0094868 A1 | 7/2002 | Tuck et al. |
| 2002/0095676 A1 | 7/2002 | Knee et al. |
| 2002/0098891 A1 | 7/2002 | Graham et al. |
| 2002/0099600 A1 | 7/2002 | Merriman et al. |
| 2002/0100040 A1 | 7/2002 | Bull |
| 2002/0107073 A1 | 8/2002 | Binney |
| 2002/0107075 A1 | 8/2002 | Stephan |
| 2002/0107730 A1 | 8/2002 | Bernstein |
| 2002/0109680 A1 | 8/2002 | Orbanes et al. |
| 2002/0111825 A1 | 8/2002 | Martin et al. |
| 2002/0111865 A1 | 8/2002 | Middleton, III et al. |
| 2002/0112035 A1 | 8/2002 | Carey et al. |
| 2002/0112233 A1 | 8/2002 | Cantu Bonilla et al. |
| 2002/0112240 A1 | 8/2002 | Bacso et al. |
| 2002/0112249 A1 | 8/2002 | Hendricks et al. |
| 2002/0112250 A1 | 8/2002 | Koplar et al. |
| 2002/0114466 A1 | 8/2002 | Tanaka et al. |
| 2002/0116284 A1 | 8/2002 | Steelman et al. |
| 2002/0120589 A1 | 8/2002 | Aoki |
| 2002/0122052 A1 | 9/2002 | Reich et al. |
| 2002/0123928 A1 | 9/2002 | Eldering et al. |
| 2002/0129368 A1 | 9/2002 | Schlack et al. |
| 2002/0133398 A1 | 9/2002 | Geller et al. |
| 2002/0136407 A1 | 9/2002 | Denning et al. |
| 2002/0138493 A1 | 9/2002 | Shapiro et al. |
| 2002/0143639 A1 | 10/2002 | Beckett et al. |
| 2002/0143652 A1 | 10/2002 | Beckett |
| 2002/0143901 A1 | 10/2002 | Lupo et al. |
| 2002/0144262 A1 | 10/2002 | Plotnick et al. |
| 2002/0144263 A1 | 10/2002 | Eldering et al. |
| 2002/0147633 A1 | 10/2002 | Rafizadeh |
| 2002/0147638 A1 | 10/2002 | Banerjee et al. |
| 2002/0147645 A1 | 10/2002 | Alao et al. |
| 2002/0152117 A1 | 10/2002 | Cristofalo et al. |
| 2002/0155878 A1 | 10/2002 | Lert, Jr. et al. |
| 2002/0155891 A1 | 10/2002 | Okada et al. |
| 2002/0157002 A1 | 10/2002 | Messerges et al. |
| 2002/0161625 A1 | 10/2002 | Brito-Valladares et al. |
| 2002/0161639 A1 | 10/2002 | Goldstein |
| 2002/0164977 A1 | 11/2002 | Link, II et al. |
| 2002/0164999 A1 | 11/2002 | Johnson |
| 2002/0165026 A1 | 11/2002 | Perkins et al. |
| 2002/0165764 A1 | 11/2002 | Wade et al. |
| 2002/0173349 A1 | 11/2002 | Ach, III |
| 2002/0173359 A1 | 11/2002 | Gallo et al. |
| 2002/0175936 A1 | 11/2002 | Tenembaum |
| 2002/0178442 A1 | 11/2002 | Williams |
| 2002/0178445 A1 | 11/2002 | Eldering et al. |
| 2002/0178447 A1 | 11/2002 | Plotnick et al. |
| 2002/0184047 A1* | 12/2002 | Plotnick et al. .................. 705/1 |
| 2002/0184086 A1 | 12/2002 | Linde |
| 2002/0184088 A1 | 12/2002 | Rosenberg |
| 2002/0184130 A1 | 12/2002 | Blasko |
| 2002/0184642 A1 | 12/2002 | Lude et al. |
| 2002/0193066 A1 | 12/2002 | Connelly |
| 2002/0194058 A1 | 12/2002 | Eldering |
| 2002/0194585 A1 | 12/2002 | Connelly |
| 2002/0194590 A1 | 12/2002 | Pong |
| 2002/0194598 A1 | 12/2002 | Connelly |
| 2002/0194607 A1 | 12/2002 | Connelly |
| 2003/0004810 A1 | 1/2003 | Eldering |

(56) References Cited

U.S. PATENT DOCUMENTS

| | | |
|---|---|---|
| 2003/0009762 A1 | 1/2003 | Hooper et al. |
| 2003/0014307 A1 | 1/2003 | Heng |
| 2003/0014312 A1 | 1/2003 | Fleisher |
| 2003/0014414 A1 | 1/2003 | Newman |
| 2003/0014754 A1 | 1/2003 | Chang |
| 2003/0018527 A1 | 1/2003 | Filepp et al. |
| 2003/0018797 A1 | 1/2003 | Dunning et al. |
| 2003/0028433 A1 | 2/2003 | Merriman et al. |
| 2003/0033405 A1 | 2/2003 | Perdon et al. |
| 2003/0035075 A1 | 2/2003 | Butler et al. |
| 2003/0036944 A1 | 2/2003 | Lesandrini et al. |
| 2003/0046148 A1 | 3/2003 | Rizzi et al. |
| 2003/0048293 A1 | 3/2003 | Werkhoven |
| 2003/0054888 A1 | 3/2003 | Walker et al. |
| 2003/0060247 A1 | 3/2003 | Goldberg et al. |
| 2003/0066092 A1 | 4/2003 | Wagner et al. |
| 2003/0070167 A1 | 4/2003 | Holtz et al. |
| 2003/0073496 A1 | 4/2003 | D'Amico et al. |
| 2003/0074252 A1 | 4/2003 | Chandler-Pepelnjak et al. |
| 2003/0076347 A1 | 4/2003 | Barrett et al. |
| 2003/0079226 A1 | 4/2003 | Barrett |
| 2003/0084449 A1 | 5/2003 | Chane et al. |
| 2003/0084456 A1 | 5/2003 | Ryan et al. |
| 2003/0093311 A1 | 5/2003 | Knowlson |
| 2003/0100375 A1 | 5/2003 | Wakae et al. |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0103644 A1 | 6/2003 | Klayh |
| 2003/0104867 A1 | 6/2003 | Kobayashi et al. |
| 2003/0110171 A1 | 6/2003 | Ozer et al. |
| 2003/0115074 A1 | 6/2003 | Freeman et al. |
| 2003/0115318 A1 | 6/2003 | Wueste |
| 2003/0115587 A1 | 6/2003 | Kendall et al. |
| 2003/0126150 A1 | 7/2003 | Chan |
| 2003/0135513 A1 | 7/2003 | Quinn et al. |
| 2003/0139966 A1 | 7/2003 | Sirota et al. |
| 2003/0144044 A1 | 7/2003 | Pisarsky |
| 2003/0144048 A1 | 7/2003 | Silva |
| 2003/0149618 A1 | 8/2003 | Sender et al. |
| 2003/0149623 A1 | 8/2003 | Chen |
| 2003/0149975 A1 | 8/2003 | Eldering et al. |
| 2003/0158872 A1 | 8/2003 | Adams |
| 2003/0163369 A1 | 8/2003 | Arr |
| 2003/0163482 A1 | 8/2003 | Bunney et al. |
| 2003/0171988 A1 | 9/2003 | Sugihara |
| 2003/0171990 A1 | 9/2003 | Rao et al. |
| 2003/0172376 A1 | 9/2003 | Coffin, III |
| 2003/0177490 A1* | 9/2003 | Hoshino et al. ................. 725/34 |
| 2003/0182567 A1 | 9/2003 | Barton et al. |
| 2003/0182663 A1 | 9/2003 | Gudorf et al. |
| 2003/0187719 A1 | 10/2003 | Brocklebank |
| 2003/0190961 A1 | 10/2003 | Seidman |
| 2003/0191690 A1 | 10/2003 | McIntyre et al. |
| 2003/0191742 A1 | 10/2003 | Yonezawa et al. |
| 2003/0195021 A1 | 10/2003 | Yamashita et al. |
| 2003/0195801 A1 | 10/2003 | Takakura et al. |
| 2003/0195837 A1 | 10/2003 | Kostic et al. |
| 2003/0199292 A1 | 10/2003 | Greenberg |
| 2003/0200452 A1 | 10/2003 | Tagawa et al. |
| 2003/0204632 A1 | 10/2003 | Willebeek-LeMair et al. |
| 2003/0212608 A1 | 11/2003 | Cliff |
| 2003/0215211 A1 | 11/2003 | Coffin, III |
| 2003/0226141 A1 | 12/2003 | Krasnow et al. |
| 2003/0226142 A1* | 12/2003 | Rand ............................. 725/32 |
| 2004/0002380 A1 | 1/2004 | Brosnan et al. |
| 2004/0003396 A1 | 1/2004 | Babu |
| 2004/0014454 A1 | 1/2004 | Burgess et al. |
| 2004/0015397 A1 | 1/2004 | Barry et al. |
| 2004/0015608 A1 | 1/2004 | Ellis et al. |
| 2004/0019521 A1 | 1/2004 | Birmingham |
| 2004/0025174 A1 | 2/2004 | Cerrato |
| 2004/0030595 A1 | 2/2004 | Park |
| 2004/0034536 A1 | 2/2004 | Hughes |
| 2004/0034686 A1 | 2/2004 | Guthrie |
| 2004/0039648 A1 | 2/2004 | Candelore et al. |
| 2004/0039796 A1 | 2/2004 | Watkins |
| 2004/0043817 A1 | 3/2004 | Willis |
| 2004/0043819 A1 | 3/2004 | Willis |
| 2004/0044567 A1 | 3/2004 | Willis |
| 2004/0044569 A1 | 3/2004 | Roberts et al. |
| 2004/0044571 A1 | 3/2004 | Bronnimann et al. |
| 2004/0044574 A1 | 3/2004 | Cochran et al. |
| 2004/0054589 A1 | 3/2004 | Nicholas et al. |
| 2004/0057348 A1 | 3/2004 | Shteyn et al. |
| 2004/0059625 A1 | 3/2004 | Schrader |
| 2004/0068552 A1 | 4/2004 | Kotz et al. |
| 2004/0073482 A1 | 4/2004 | Wiggins et al. |
| 2004/0078263 A1 | 4/2004 | Altieri |
| 2004/0078266 A1 | 4/2004 | Kim |
| 2004/0078292 A1 | 4/2004 | Blumenau |
| 2004/0078809 A1 | 4/2004 | Drazin |
| 2004/0083133 A1 | 4/2004 | Nicholas et al. |
| 2004/0088583 A1 | 5/2004 | Yoon et al. |
| 2004/0102248 A1 | 5/2004 | Young et al. |
| 2004/0103024 A1 | 5/2004 | Patel et al. |
| 2004/0103429 A1 | 5/2004 | Carlucci et al. |
| 2004/0107136 A1 | 6/2004 | Nemirofsky et al. |
| 2004/0110565 A1 | 6/2004 | Levesque |
| 2004/0111484 A1 | 6/2004 | Young et al. |
| 2004/0116183 A1 | 6/2004 | Prindle |
| 2004/0117272 A1 | 6/2004 | Shehab |
| 2004/0121835 A1 | 6/2004 | Willis et al. |
| 2004/0121842 A1 | 6/2004 | Willis et al. |
| 2004/0126747 A1 | 7/2004 | Fujisawa et al. |
| 2004/0133480 A1 | 7/2004 | Domes |
| 2004/0133518 A1 | 7/2004 | Dryall |
| 2004/0137980 A1 | 7/2004 | Aenlle |
| 2004/0139465 A1 | 7/2004 | Matthews, III et al. |
| 2004/0140352 A1 | 7/2004 | Walker et al. |
| 2004/0143478 A1 | 7/2004 | Ward |
| 2004/0143495 A1 | 7/2004 | Koenig |
| 2004/0148221 A1 | 7/2004 | Chu |
| 2004/0148424 A1 | 7/2004 | Berkson et al. |
| 2004/0148625 A1 | 7/2004 | Eldering et al. |
| 2004/0152517 A1 | 8/2004 | Hardisty et al. |
| 2004/0152518 A1 | 8/2004 | Kogo |
| 2004/0153360 A1 | 8/2004 | Schumann |
| 2004/0153363 A1 | 8/2004 | Stehling |
| 2004/0153385 A1 | 8/2004 | Allibhoy et al. |
| 2004/0153453 A1 | 8/2004 | Brodie et al. |
| 2004/0158858 A1* | 8/2004 | Paxton et al. ................. 725/42 |
| 2004/0162758 A1 | 8/2004 | Willis |
| 2004/0162759 A1 | 8/2004 | Willis |
| 2004/0163101 A1 | 8/2004 | Swix et al. |
| 2004/0163134 A1 | 8/2004 | Willis |
| 2004/0168063 A1 | 8/2004 | Revital et al. |
| 2004/0168188 A1 | 8/2004 | Bennington et al. |
| 2004/0168202 A1 | 8/2004 | Ebihara |
| 2004/0169678 A1 | 9/2004 | Oliver |
| 2004/0172324 A1 | 9/2004 | Merriman et al. |
| 2004/0172331 A1 | 9/2004 | Merriman et al. |
| 2004/0172332 A1 | 9/2004 | Merriman et al. |
| 2004/0172343 A1 | 9/2004 | Allibhoy et al. |
| 2004/0176170 A1 | 9/2004 | Eck et al. |
| 2004/0176995 A1 | 9/2004 | Fusz |
| 2004/0177001 A1 | 9/2004 | Salinas |
| 2004/0181808 A1 | 9/2004 | Schaefer et al. |
| 2004/0186766 A1 | 9/2004 | Fellenstein et al. |
| 2004/0193488 A1 | 9/2004 | Khoo et al. |
| 2004/0194123 A1 | 9/2004 | Fredlund et al. |
| 2004/0194128 A1 | 9/2004 | McIntyre et al. |
| 2004/0201629 A1 | 10/2004 | Bates et al. |
| 2004/0204238 A1 | 10/2004 | Aoki |
| 2004/0204247 A1 | 10/2004 | Walker et al. |
| 2004/0205157 A1 | 10/2004 | Bibelnieks et al. |
| 2004/0205508 A1 | 10/2004 | Wecker et al. |
| 2004/0205807 A1 | 10/2004 | Wilcoxson et al. |
| 2004/0210472 A1 | 10/2004 | Lew et al. |
| 2004/0210489 A1 | 10/2004 | Jackson et al. |
| 2004/0210661 A1 | 10/2004 | Thompson |
| 2004/0210824 A1 | 10/2004 | Shoff et al. |
| 2004/0220850 A1 | 11/2004 | Ferrer et al. |
| 2004/0221018 A1 | 11/2004 | Ji |

(56) References Cited

U.S. PATENT DOCUMENTS

| | | |
|---|---|---|
| 2004/0224772 A1 | 11/2004 | Canessa et al. |
| 2004/0225562 A1 | 11/2004 | Turner |
| 2004/0225715 A1 | 11/2004 | Gottfried |
| 2004/0230593 A1 | 11/2004 | Rudin et al. |
| 2004/0230994 A1 | 11/2004 | Urdang et al. |
| 2004/0234932 A1 | 11/2004 | Hughes et al. |
| 2004/0236585 A1 | 11/2004 | Kohnke et al. |
| 2004/0243455 A1 | 12/2004 | Smith |
| 2004/0243466 A1 | 12/2004 | Trzybinski et al. |
| 2004/0243470 A1 | 12/2004 | Ozer et al. |
| 2004/0243623 A1 | 12/2004 | Ozer et al. |
| 2004/0248649 A1 | 12/2004 | Arai et al. |
| 2004/0249786 A1 | 12/2004 | Dabney et al. |
| 2004/0252051 A1 | 12/2004 | Johnson |
| 2004/0254831 A1 | 12/2004 | Dean |
| 2004/0254957 A1 | 12/2004 | Hyotyniemi et al. |
| 2004/0255148 A1 | 12/2004 | Monteiro et al. |
| 2004/0259553 A1 | 12/2004 | Delaney et al. |
| 2004/0260609 A1 | 12/2004 | Loeb et al. |
| 2004/0261125 A1 | 12/2004 | Ellis et al. |
| 2004/0266535 A1 | 12/2004 | Reeves |
| 2004/0266537 A1 | 12/2004 | Morris |
| 2004/0267611 A1 | 12/2004 | Hoerenz |
| 2005/0005242 A1 | 1/2005 | Hoyle |
| 2005/0015267 A1 | 1/2005 | Barringer et al. |
| 2005/0021387 A1 | 1/2005 | Gottfurcht |
| 2005/0021396 A1 | 1/2005 | Pearch et al. |
| 2005/0021397 A1 | 1/2005 | Cui et al. |
| 2005/0021403 A1 | 1/2005 | Ozer et al. |
| 2005/0021465 A1 | 1/2005 | Segerstrom |
| 2005/0021470 A1 | 1/2005 | Martin et al. |
| 2005/0021853 A1 | 1/2005 | Parekh et al. |
| 2005/0027587 A1 | 2/2005 | Latona et al. |
| 2005/0027595 A1 | 2/2005 | Ha et al. |
| 2005/0027699 A1 | 2/2005 | Awadallah et al. |
| 2005/0028188 A1 | 2/2005 | Latona et al. |
| 2005/0028195 A1 | 2/2005 | Feinleib et al. |
| 2005/0032577 A1 | 2/2005 | Blackburn et al. |
| 2005/0033700 A1 | 2/2005 | Vogler et al. |
| 2005/0038698 A1 | 2/2005 | Lukose et al. |
| 2005/0038702 A1 | 2/2005 | Merriman et al. |
| 2005/0050070 A1 | 3/2005 | Sheldon |
| 2005/0055725 A1 | 3/2005 | Stewart |
| 2005/0060264 A1 | 3/2005 | Schrock et al. |
| 2005/0075172 A1 | 4/2005 | Coleman |
| 2005/0076051 A1 | 4/2005 | Carobus et al. |
| 2005/0091107 A1 | 4/2005 | Blum |
| 2005/0091108 A1 | 4/2005 | Frost |
| 2005/0091111 A1 | 4/2005 | Green et al. |
| 2005/0096975 A1 | 5/2005 | Moshe |
| 2005/0096983 A1 | 5/2005 | Werkhoven |
| 2005/0097622 A1 | 5/2005 | Zigmond et al. |
| 2005/0101386 A1 | 5/2005 | Lavanchy et al. |
| 2005/0102177 A1 | 5/2005 | Takayama |
| 2005/0102202 A1 | 5/2005 | Linden et al. |
| 2005/0107158 A1 | 5/2005 | Kanisawa et al. |
| 2005/0108095 A1 | 5/2005 | Perlmutter |
| 2005/0113170 A1 | 5/2005 | McHugh |
| 2005/0114526 A1 | 5/2005 | Aoyama |
| 2005/0125286 A1 | 6/2005 | Crippen et al. |
| 2005/0130725 A1 | 6/2005 | Creamer et al. |
| 2005/0143174 A1 | 6/2005 | Goldman et al. |
| 2005/0144063 A1 | 6/2005 | Spector |
| 2005/0144073 A1 | 6/2005 | Morrisroe et al. |
| 2005/0149396 A1 | 7/2005 | Horowitz et al. |
| 2005/0153760 A1 | 7/2005 | Varley |
| 2005/0154640 A1 | 7/2005 | Kolluri et al. |
| 2005/0154717 A1 | 7/2005 | Watson et al. |
| 2005/0155056 A1 | 7/2005 | Knee et al. |
| 2005/0155083 A1 | 7/2005 | Oh et al. |
| 2005/0160442 A1 | 7/2005 | Kaplowitz |
| 2005/0164757 A1 | 7/2005 | Ebisawa |
| 2005/0165640 A1 | 7/2005 | Kotorov |
| 2005/0165644 A1 | 7/2005 | Beyda et al. |
| 2005/0171865 A1 | 8/2005 | Beardow |
| 2005/0177413 A1 | 8/2005 | Blumberg et al. |
| 2005/0177430 A1 | 8/2005 | Willis |
| 2005/0177431 A1 | 8/2005 | Willis et al. |
| 2005/0177461 A1 | 8/2005 | Rosefelt et al. |
| 2005/0178940 A1 | 8/2005 | Granick |
| 2005/0179685 A1 | 8/2005 | Kake et al. |
| 2005/0182693 A1 | 8/2005 | Alivandi |
| 2005/0182737 A1 | 8/2005 | Brown |
| 2005/0185825 A1 | 8/2005 | Hoshino et al. |
| 2005/0192071 A1 | 9/2005 | Matsuno et al. |
| 2005/0192864 A1 | 9/2005 | Ganz |
| 2005/0193411 A1 | 9/2005 | Funston |
| 2005/0193425 A1 | 9/2005 | Sull et al. |
| 2005/0195157 A1 | 9/2005 | Kramer et al. |
| 2005/0202385 A1 | 9/2005 | Coward et al. |
| 2005/0203804 A1 | 9/2005 | Suzuki et al. |
| 2005/0203811 A1 | 9/2005 | David |
| 2005/0204381 A1 | 9/2005 | Ludvig et al. |
| 2005/0216346 A1 | 9/2005 | Kusumoto et al. |
| 2005/0216348 A1 | 9/2005 | Martin et al. |
| 2005/0216581 A1 | 9/2005 | Blumenau et al. |
| 2005/0222908 A1 | 10/2005 | Altberg et al. |
| 2005/0227749 A1 | 10/2005 | Bender et al. |
| 2005/0228797 A1 | 10/2005 | Koningstein et al. |
| 2005/0235030 A1 | 10/2005 | Lauckhart et al. |
| 2005/0235199 A1 | 10/2005 | Adams |
| 2005/0235310 A1 | 10/2005 | Bies |
| 2005/0235318 A1 | 10/2005 | Grauch et al. |
| 2005/0240476 A1 | 10/2005 | Bigott |
| 2005/0246736 A1 | 11/2005 | Beyda et al. |
| 2005/0247769 A1 | 11/2005 | Potter et al. |
| 2005/0251539 A1 | 11/2005 | Parekh et al. |
| 2005/0254366 A1 | 11/2005 | Amar |
| 2005/0256768 A1 | 11/2005 | Robinson |
| 2005/0261062 A1 | 11/2005 | Lewin et al. |
| 2005/0261962 A1 | 11/2005 | Chuah |
| 2005/0266906 A1 | 12/2005 | Stevens |
| 2005/0266907 A1 | 12/2005 | Weston et al. |
| 2005/0270537 A1 | 12/2005 | Mian et al. |
| 2005/0283395 A1 | 12/2005 | Lesandrini et al. |
| 2005/0283401 A1 | 12/2005 | Swix et al. |
| 2005/0288999 A1 | 12/2005 | Lerner et al. |
| 2006/0007312 A1 | 1/2006 | James |
| 2006/0031551 A1 | 2/2006 | Agresta et al. |
| 2006/0085517 A1 | 4/2006 | Kaurila |
| 2006/0085816 A1 | 4/2006 | Funk et al. |
| 2006/0090186 A1 | 4/2006 | Santangelo et al. |
| 2006/0143650 A1 | 6/2006 | Tanikawa et al. |
| 2006/0150249 A1 | 7/2006 | Gassen et al. |
| 2006/0167747 A1 | 7/2006 | Goodman |
| 2006/0193471 A1 | 8/2006 | Stehle |
| 2006/0195859 A1 | 8/2006 | Konig et al. |
| 2006/0195860 A1 | 8/2006 | Eldering et al. |
| 2006/0212347 A1 | 9/2006 | Fang et al. |
| 2006/0212350 A1 | 9/2006 | Ellis et al. |
| 2006/0230141 A1 | 10/2006 | Willis |
| 2006/0242667 A1 | 10/2006 | Peterson et al. |
| 2006/0242703 A1 | 10/2006 | Abeni |
| 2006/0248209 A1* | 11/2006 | Chiu et al. .................. 709/231 |
| 2006/0253323 A1 | 11/2006 | Phan et al. |
| 2006/0253330 A1 | 11/2006 | Maggio et al. |
| 2006/0265503 A1 | 11/2006 | Jones et al. |
| 2006/0268667 A1 | 11/2006 | Jellison, Jr. et al. |
| 2006/0294566 A1 | 12/2006 | Zlattner |
| 2007/0027771 A1 | 2/2007 | Collins et al. |
| 2007/0038931 A1 | 2/2007 | Allaire et al. |
| 2007/0050254 A1 | 3/2007 | Driscoll |
| 2007/0055980 A1 | 3/2007 | Mageid et al. |
| 2007/0066287 A1 | 3/2007 | Papulov |
| 2007/0073756 A1 | 3/2007 | Manhas et al. |
| 2007/0078706 A1 | 4/2007 | van Datta |
| 2007/0078712 A1 | 4/2007 | Ott et al. |
| 2007/0078714 A1* | 4/2007 | Ott et al. .................. 705/14 |
| 2007/0078989 A1 | 4/2007 | van Datta |
| 2007/0079326 A1 | 4/2007 | van Datta |
| 2007/0079331 A1 | 4/2007 | van Datta |
| 2007/0079335 A1 | 4/2007 | McDonough |
| 2007/0083611 A1 | 4/2007 | Farago et al. |
| 2007/0089151 A1 | 4/2007 | Moore et al. |

(56) References Cited

U.S. PATENT DOCUMENTS

| | | |
|---|---|---|
| 2007/0094081 A1 | 4/2007 | Yruski |
| 2007/0094083 A1 | 4/2007 | Yruski |
| 2007/0094363 A1 | 4/2007 | Yruski |
| 2007/0101360 A1 | 5/2007 | Gutta et al. |
| 2007/0118425 A1 | 5/2007 | Yruski |
| 2007/0130012 A1 | 6/2007 | Yruski |
| 2007/0130594 A1 | 6/2007 | Hidary et al. |
| 2007/0146812 A1 | 6/2007 | Lawton |
| 2007/0150919 A1 | 6/2007 | Morishita |
| 2007/0162945 A1 | 7/2007 | Mills |
| 2007/0174471 A1 | 7/2007 | Van Rossum |
| 2007/0244760 A1 | 10/2007 | Bodnar et al. |
| 2007/0294740 A1 | 12/2007 | Drake et al. |
| 2007/0299935 A1 | 12/2007 | Plastina et al. |
| 2008/0046948 A1 | 2/2008 | Verosub |
| 2008/0097872 A1 | 4/2008 | Peckover |
| 2008/0104106 A1 | 5/2008 | Rosenberg et al. |
| 2008/0109844 A1 | 5/2008 | Baldeschwieler et al. |
| 2008/0127244 A1 | 5/2008 | Zhang |
| 2008/0140239 A1 | 6/2008 | Rosenberg et al. |
| 2008/0140717 A1 | 6/2008 | Rosenberg et al. |
| 2008/0141372 A1 | 6/2008 | Massey et al. |
| 2008/0207137 A1 | 8/2008 | Maharajh et al. |
| 2009/0083788 A1 | 3/2009 | Russell |
| 2009/0183081 A1 | 7/2009 | Rodriguez |
| 2009/0204481 A1 | 8/2009 | Navar |
| 2010/0022310 A1 | 1/2010 | van Datta |
| 2010/0030640 A1 | 2/2010 | van Datta |
| 2010/0043022 A1 | 2/2010 | Kaftan |
| 2010/0169910 A1 | 7/2010 | Collins et al. |
| 2010/0269138 A1 | 10/2010 | Krikorian et al. |
| 2011/0004669 A1 | 1/2011 | Navar |
| 2011/0010545 A1 | 1/2011 | Kill et al. |
| 2011/0015975 A1 | 1/2011 | Yruski et al. |
| 2011/0029383 A1 | 2/2011 | Engel et al. |
| 2011/0125582 A1 | 5/2011 | van Datta |
| 2011/0307339 A1 | 12/2011 | Russell |
| 2013/0232000 A1 | 9/2013 | van Datta |
| 2013/0232001 A1 | 9/2013 | van Datta |

FOREIGN PATENT DOCUMENTS

| | | |
|---|---|---|
| CA | 2106122 A1 | 3/1994 |
| EP | 0337539 A2 | 10/1989 |
| EP | 0405776 A2 | 1/1991 |
| EP | 0620688 A2 | 10/1994 |
| EP | 0 625 760 | 11/1994 |
| EP | 0625760 A1 | 11/1994 |
| EP | 0 743 595 | 10/1996 |
| EP | 0743595 A2 | 10/1996 |
| EP | 0 905 928 | 3/1999 |
| GB | 2141907 A | 1/1985 |
| GB | 2194369 A | 3/1988 |
| JP | 12-20925 | 9/1989 |
| JP | 1220925 | 9/1989 |
| JP | 6335569 | 12/1994 |
| JP | 8117445 | 5/1996 |
| JP | 8173634 | 7/1996 |
| JP | 82-80934 | 10/1996 |
| JP | 8280934 | 10/1996 |
| JP | 2001111921 | 4/2001 |
| JP | 2001-321556 | 11/2001 |
| JP | 01321556 | 11/2001 |
| JP | 2002-259433 | 9/2002 |
| JP | 2002-358455 | 12/2002 |
| JP | 2002-366971 | 12/2002 |
| JP | 02366971 | 12/2002 |
| JP | 2003-248844 | 9/2003 |
| JP | 03248844 | 9/2003 |
| JP | 2004-298469 | 10/2004 |
| JP | 04298469 | 10/2004 |
| WO | 9314462 A1 | 7/1993 |
| WO | 9319427 A1 | 9/1993 |
| WO | 9322017 A1 | 11/1993 |
| WO | 9323125 | 11/1993 |
| WO | 9512442 A1 | 5/1995 |
| WO | 9512853 | 5/1995 |
| WO | 03032127 A2 | 4/2003 |
| WO | WO 2004/100010 | 11/2004 |
| WO | 2005086969 A2 | 9/2005 |
| WO | WO 2007/041022 | 4/2007 |
| WO | WO 2007/041028 | 4/2007 |
| WO | WO 2007/130681 | 11/2007 |

OTHER PUBLICATIONS

"Statement in Accordance with the Notice from the European Patent Office dated Oct. 1, 2007 Concerning Business Methods" Nov. 1, 2007, XP002456252.

Extended European Search Report for EP 07776856.2 dated Jun. 9, 2011.

JP Notification Reasons for Refusal for JP Application No. 2009-509786 dated Jul. 28, 2011.

U.S. Appl. No. 12/190,323 Final Office Action mailed Nov. 14, 2011.

U.S. Appl. No. 12/370,531 Final Office Action mailed Nov. 16, 2011.

U.S. Appl. No. 12/571,225 Office Action mailed Feb. 2, 2012.

Andreaux. J.-P.; Copy Protection system for digital home networks; Mar. 2004; IEEE, vol. 21, Issue: 2; pp. 100-108.

Business Wire, "RTIME Announces First 100-Person Twitch Game for Internet; "RTIME Rocks!" Demonstrates the Power of the RTIME Interactive Networking Engine to Support Large Scale, High Performance, Internet Game Play," Apr. 14, 1997.

Courtois N et al: An Algebraic Masking Method to Protect AES Agaist Power Attacks, Online! XP002344150 Retrieved from the Internet: URL:eprint.iacr.org/2005/204.pdf> retrieved on Sep. 8, 2005.

PricewaterhouseCoopers, "Lab Online Ad Measurement Study," Dec. 2001.

What TV Ratings Really Mean (and Other Frequently-Asked Questions). Nielsen Media Research. Web. <http:// documents. chelmsford. k 12. ma.us/dsweb/GeUDocument-14983/ nielsenmedia.htm>, Jun. 2005.

PCT/US06/037018, International Search Report and Written Opinion mailed Aug. 7, 2007.

PCT/US06/036958, International Search Report and Written Opinion mailed Apr. 27, 2007.

PCT/US07/11059, International Search Report and Written Opinion mailed May 30, 2008.

EP 06815173.7, Extended European Search Report mailed Oct. 5, 2011.

CN 200780016268.2, First Office Action mailed Jan. 4, 2012.

U.S. Appl. No. 11/241,229 Final Office Action mailed Apr. 23, 2010.

U.S. Appl. No. 11/241,229 Office Action mailed Nov. 19, 2009.

U.S. Appl. No. 12/571,204 Office Action mailed Feb. 28, 2012.

U.S. Appl. No. 11/240,655 Office Action mailed Aug. 5, 2013.

U.S. Appl. No. 11/240,655 Final Office Action mailed Jan. 27, 2010.

U.S. Appl. No. 11/240,655 Office Action mailed Apr. 16, 2009.

U.S. Appl. No. 12/190,323 Final Office Action mailed Feb. 25, 2013.

U.S. Appl. No. 12/190,323 Office Action mailed May 7, 2012.

U.S. Appl. No. 12/190,323 Office Action mailed Jun. 8, 2011.

U.S. Appl. No. 13/191,398 Final Office Action mailed Jun. 7, 2013.

U.S. Appl. No. 13/191,398 Office Action mailed Mar. 22, 2012.

U.S. Appl. No. 11/535,370 Final Office Action mailed Jun. 8, 2010.

U.S. Appl. No. 11/535,307 Office Action mailed Dec. 10, 2009.

U.S. Appl. No. 11/535,307 Final Action mailed Sep. 8, 2009.

U.S. Appl. No. 11/535,307 Office Action mailed Apr. 16, 2009.

U.S. Appl. No. 13/013,789 Final Office Action mailed Feb. 27, 2013.

U.S. Appl. No. 13/013,789 Office Action mailed Oct. 9, 2012.

U.S. Appl. No. 11/452,848 Final Office Action mailed Feb. 15, 2011.

U.S. Appl. No. 11/452,848 Office Action mailed Sep. 15, 2010.

U.S. Appl. No. 11/452,848 Final Office Action mailed Apr. 21, 2010.

U.S. Appl. No. 11/452,848 Office Action mailed Oct. 20, 2009.

U.S. Appl. No. 11/452,848 Final Office Action mailed Jul. 9, 2009.

U.S. Appl. No. 11/452,848 Office Action mailed Jan. 27, 2009.

U.S. Appl. No. 11/586,990 Final Office Action mailed Apr. 10, 2013.

U.S. Appl. No. 11/586,990 Office Action mailed Nov. 23, 2012.

U.S. Appl. No. 11/586,990 Final Office Action mailed Feb. 14, 2011.

(56) References Cited

OTHER PUBLICATIONS

U.S. Appl. No. 11/586,990 Office Action mailed Sep. 15, 2010.
U.S. Appl. No. 11/588,036 Final Office Action mailed Oct. 4, 2012.
U.S. Appl. No. 11/588,036 Office Action mailed Apr. 27, 2012.
U.S. Appl. No. 11/588,036 Final Office Action mailed Feb. 17, 2011.
U.S. Appl. No. 11/588,036 Office Action mailed Sep. 14, 2010.
U.S. Appl. No. 11/586,958 Office Action mailed Mar. 18, 2011.
U.S. Appl. No. 11/586,958 Office Action mailed Sep. 1, 2010.
U.S. Appl. No. 11/586,958 Office Action mailed Dec. 11, 2009.
U.S. Appl. No. 11/586,959 Final Office Action mailed Aug. 30, 2013.
U.S. Appl. No. 11/586,959 Office Action mailed May 8, 2013.
U.S. Appl. No. 11/586,959 Final Office Action mailed Oct. 5, 2012.
U.S. Appl. No. 11/586,959 Office Action mailed Apr. 27, 2012.
U.S. Appl. No. 11/586,959 Final Office Action mailed Feb. 14, 2011.
U.S. Appl. No. 11/586,959 Office Action mailed Oct. 1, 2010.
U.S. Appl. No. 12/370,531 Office Action mailed Aug. 1, 2013.
U.S. Appl. No. 12/370,531 Final Office Action mailed Aug. 3, 2011.
U.S. Appl. No. 12/370,531 Final Office Action mailed Aug. 1, 2011.
U.S. Appl. No. 12/370,531 Office Action mailed Feb. 2, 2011.
U.S. Appl. No. 11/588,236 Office Action mailed Sep. 9, 2009.
U.S. Appl. No. 11/588,236 Office Action mailed Mar. 5, 2009.
U.S. Appl. No. 12/703,188 Final Office Action mailed Oct. 12, 2012.
U.S. Appl. No. 12/703,188 Office Action mailed Apr. 6, 2012.
U.S. Appl. No. 10/924,009 Final Office Action mailed Dec. 5, 2008.
U.S. Appl. No. 10/924,009 Office Action mailed Jun. 30, 2008.
U.S. Appl. No. 12/717,108 Final Office Action mailed Jan. 31, 2012.
U.S. Appl. No. 12/717,108 Final Office Action mailed Jul. 20, 2011.
U.S. Appl. No. 12/717,108 Office Action mailed Feb. 9, 2011.
U.S. Appl. No. 12/782,678 Final Office Action mailed Jul. 31, 2013.
U.S. Appl. No. 12/782,678 Office Action mailed Jan. 7, 2013.
U.S. Appl. No. 12/782,678 Office Action mailed Oct. 4, 2012.
"RTIME Announces First 100—Person Twitch Game for Internet; "RTIME Rocks!" Demonstrates the Power of the RTIME Interactive Networking Engine to Support Large Scale, High Performance, Internet Game Play ." Look Smart: Find Articles (1997): n. pag. Web. <http://findarticles.com/p/articles/mi_m0EIN/is_1997_April_14/ai_19308014/?tag=content;col1>.
"Lab Online Ad Measurement Study." PricewaterhouseCoopers. (Dec. 2001): 1-52.
"What TV Ratings Really Mean (and Other Frequently-Asked Questions)." Nielsen Media Research. Web. <http://documents.chelmsford.k12.ma.us/dsweb/Get/Document-14983/nielsenmedia.htm>.

* cited by examiner

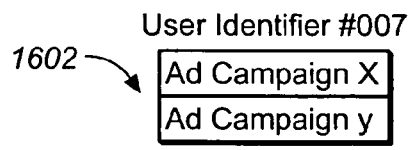
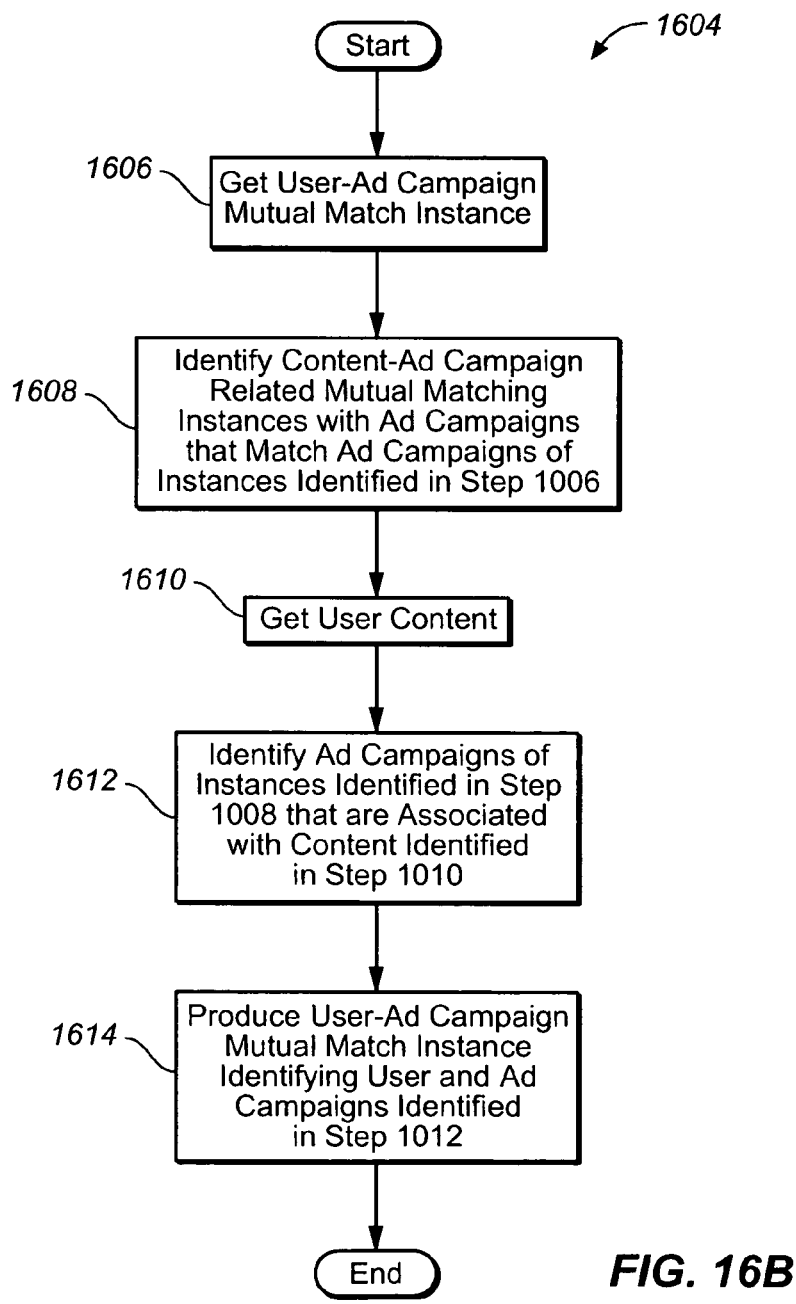
*FIG. 16A*
*FIG. 16B*

Long Description: New Exciting Podcast brings you a daily dose of VIP interviews and entertainment focuse news. Wallace & Gromit interview Mel Gibson, Jennifer Aniston and others.

Website URL: www.podcastwebsitehome.com

Episode Frequency: Daily

Explicit Content: No

Banned advertiser categories: (Check all that apply)

- ☐ Recall
- ☐ Home Furnishings & Appliances
- ☐ Movies, Media & Advertising
- ☐ Restaurants & Fast Food
- ☐ Financial Services
- ☑ Beer, Wine & Liquor
- ☐ Computer, Software & Internet
- ☐ Direct Response Companies
- ☐ Telecommunications
- ☐ Business & Manufacturing Equipment
- ☐ Automotive
- ☐ Personal Care
- ☐ Airlines, Hotels & Car Rentals
- ☐ Sporting Goods, Toys & Games
- ☐ Medicine & healthcare
- ☐ Apparel
- ☐ Insurance & Real Estate
- ☑ Gas & Oil
- ☐ Food & Beverage
- ☐ Pets, Pet Food & Supplies
- ☐ Government & Politics
- ☑ Cigarettes & Tobacco (create channel) (cancel)

©2006 Podbridge Inc. All rights reserved.    Read our privacy policy

Done                                          ○ Internet

FIG. 17D

FIG. 18A podbridge (channels overview) (add a new channel) (edit your profile)

Campaign Overview

You are logged in as: Mergesh Navar
Last Updated: 2006-03-20 15:33:25-06

(log out)

Summary

| 5,874 | 452 | $587.40 | $45.20 |
|---|---|---|---|
| MTD Listens | Avg Daily Listens (last five days) | MTD Spend | Avg Daily Spend (last five days) |

Active Campaign (s)

☑ View this information

Click on the campaign name to edit or to view the details of that campaign

| Campaign Name | Start Date | End Date | Total Budget | Daily Budget | Total Served |
|---|---|---|---|---|---|
| Telecom Ad Campaign | 1/28/2006 | 3/31/2006 | $ 10,000 | $ 500 | 5,750 |
| Broadband Ad Campaign | 1/28/2006 | 3/31/2006 | $ 7,500 | $ 500 | 2,034 |

*For advertisers* | *podbridge site*

FIG. 18B podbridge ( channels overview ) ( add a new channel ) ( edit your profile )

Campaign Detail

You are logged in as: Mergesh Navar
Last Updated: 2006-03-20 15:33:25-06

( log out )

Telecom Ad Campaign

Campaign Information

| Start Date | End Date | Total Served | Daily Budget | Total Budget | Campaign Status |
|---|---|---|---|---|---|
| 1/28/2006 | 3/31/2006 | 5,750 | $ 500 | $ 10,000 | Active ▾ |

Targets
☐ View this information

Categories
☐ View this information

Advertisments in this campaign
☐ View this information

Upload Ads / Files
☐ View this information

Advertising in this campaign
☐ View this information

FIG. 18C-1

Targets
☑ View this information

| Regions | Markets | Age Groups | Gender |
|---|---|---|---|
| New York | Consumer | 18-24 | Not Applicable |
| Los Angeles | Small Business | 25-34 | |
| Chicago | | 35-44 | Children in Household |
| Philadelphia | | 45-54 | Not Applicable |
| Boston (Manchester) | | | |
| San Francisco-Oak-San Jose | | | |
| Dallas-Ft. Worth | | | |

Categories
☑ View this information

Retail
Movies, Media & Advertising
Airlines, Hotels & Car Rentals
Business & Manufacturing Equipment

Advertisements in this campaign
☑ View this information

| Date Created | Advertisment Name | File Type | Total Served | Total MTD | Overall Distribution | Status |
|---|---|---|---|---|---|---|
| 1/28/2006 | Free Handset | audio/mpeg | 644 | | 11% | Active |
| 1/28/2006 | 500 extra minutes | audio/mpeg | 389 | | 7% | Inactive |
| 1/28/2006 | Family time | audio/mpeg | 1,367 | | 24% | Active |
| 1/28/2006 | No contract | audio/mpeg | 1,850 | | 32% | Active |
| 2/4/2006 | Razr thin | audio/mpeg | 913 | | 16% | Active |

Upload Ads / Files

☑ View this information

Advertisment name [GM 2007]
Description [GM automobiles for 2007]
File Type [MP3 ▼]

Enter the location of your file or browse for your file

Select file [filelocation for uploading] (browse) (add)

Added files

| File Name | Advertisement Name | Description | File Type |

(upload files)

Categorize your product or service

☑ View this information

Categories
(Check all that apply)

- ☐ Recall
- ☐ Movies, Media & Advertising
- ☐ Financial Services
- ☐ Computer, Software & Internet
- ☐ Telecommunications
- ☑ Automotive
- ☐ Airlines, Hotels & Car Rentals
- ☐ Medicine & healthcare
- ☐ Insurance & Real Estate
- ☐ Food & Beverage
- ☐ Government & Politics

- ☐ Home Furnishings & Appliances
- ☐ Restaurants & Fast Food
- ☐ Beer, Wine & Liquor
- ☐ Direct Response Companies
- ☐ Business & Manufacturing Equipment
- ☐ Personal Care
- ☐ Sporting Goods, Toys & Games
- ☐ Apparel
- ☐ Gas & Oil
- ☐ Pets, Pet Food & Supplies
- ☐ Cigarettes & Tobacco

FIG. 19C

Upload Ads / Files

☑ View this information

Advertisment name: GM-Hybrid
Description: GM autos
File Type: MP3 ▼

Enter the location of your file or browse for your file

Select file: filelocation    (browse)    (add)

Added files

| File Name | Advertisement Name | Description | File Type |
|---|---|---|---|

(upload files)

FIG. 20A

Podbridge Service Registration podbridge

The Podbridge Service brings you high-quality podcasts without fees or hassles. To keep the content free, we provide podcast producers with information about their audience. All of the information we provide is anonymous and aggregate data, no personal data is appended.

Please take a look at our Terms of Service and Privacy Policy for more information.

Please take a moment to provide the following information.

Year you were born  [1990 ▼]
Gender  ○ Male  ⦿ Female
ZIP  [10012]
Do you have children in the home? ⦿ Yes ○ No (register)

reviewed by
[TRUSTe]
site privacy statement

FIG. 20B

```
<channel>

<item>
    <podbridge:ad>
        <slot fadeout="false" max="15">0:0:0.0</slot>
        <slot fadeout="true" max="15">0:15:0.0</slot>
        <slot fadeout="true" max="15">0:30:0.0</slot>
        <slot fadeout="false" max="30">0:45:0.0</slot>
    </podbridge:ad>
</item>

<item>
    <podbridge:ad>
        <slot fadeout=false>0:0:0.0</slot>
        <slot fadeout=true>0:0:0.0</slot>
        <slot fadeout=true>0:30:0.0</slot>
        <slot fadeout=false>0:30:0.0</slot>
    </podbridge:ad>
</item>

</channel>
```

FIG. 23

| (1)<br>Mpeg 1<br>64 kbps<br>16 bit sample rate.<br>mono | (2)<br>Mpeg 1<br>96 kbps<br>16 bit sample rate.<br>mono | (3)<br>Mpeg 1<br>96 kbps<br>16 bit sample rate.<br>stereo |
|---|---|---|
| (4)<br>Mpeg 1<br>128 kbps<br>16 bit sample rate.<br>stereo | (5)<br>AAC<br>64 kbps<br>8 bit sample rate.<br>mono | (6)<br>AAC<br>64 kbps<br>16 bit sample rate.<br>stereo |
| (7)<br>AAC<br>96 kbps<br>16 bit sample rate.<br>stereo | (8)<br>AAC<br>128 kbps<br>16 bit sample rate.<br>stereo | (9)<br>Mpeg 1<br>196 kbps<br>16 bit sample rate.<br>stereo |

*FIG. 24*

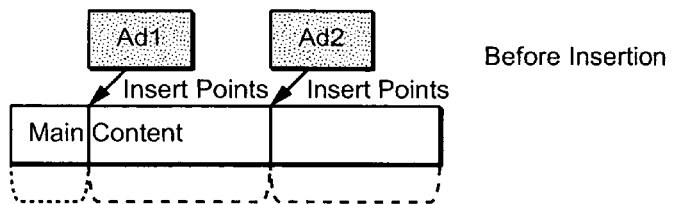

*FIG. 25A*

*FIG. 25B*

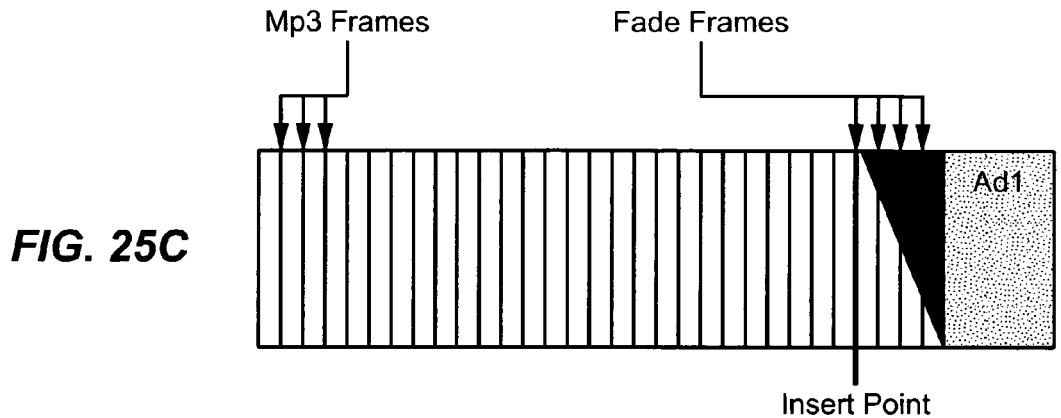
FIG. 25C
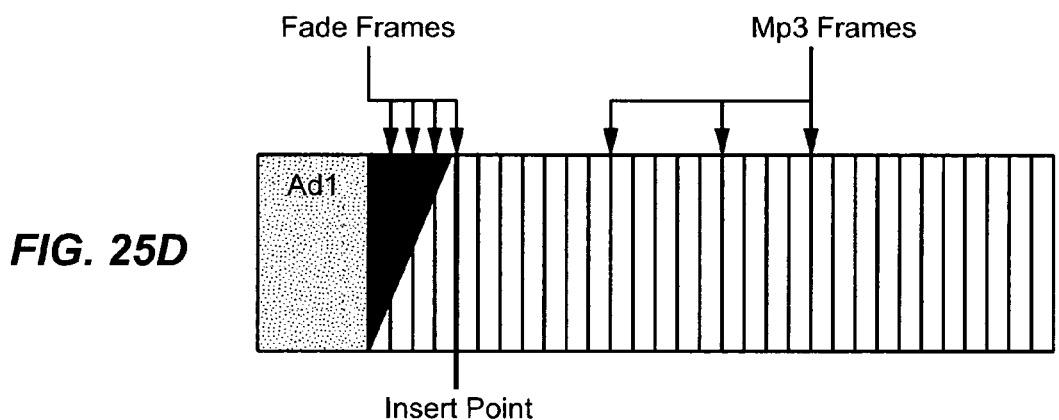
FIG. 25D
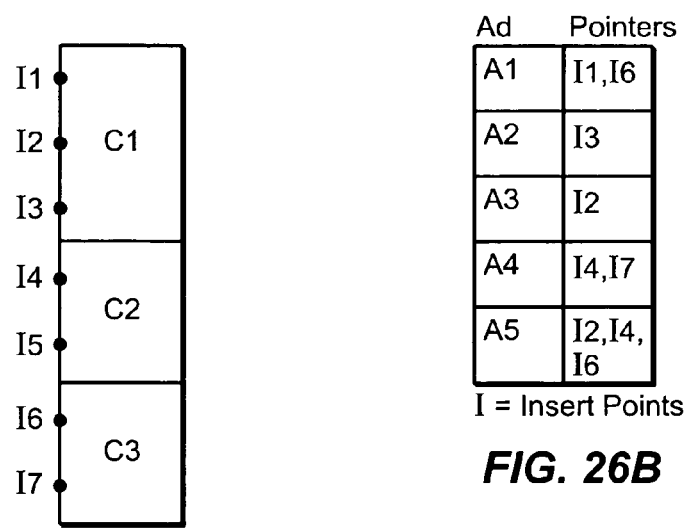
FIG. 26A
FIG. 26B

ASYNCHRONOUS ADVERTISING PLACEMENT BASED ON METADATA

CROSS-REFERENCE TO RELATED APPLICATIONS

This patent application claims priority to U.S. Provisional Patent Application Ser. No. 60/730,402, filed Oct. 25, 2005, which is expressly incorporated herein by this reference.

BACKGROUND OF THE INVENTION

1. Field of the Invention

The invention relates in general to subscription to receive information over a computer network, and more particularly, to podcasting.

2. Description of the Related Art

Podcasting involves distribution of multimedia files over a network, typically the Internet, using a syndication format, for playback on mobile devices or personal computers, for example. Ordinarily, these information content files contain audio or video, but also may contain images, text, PDF, or any file type. By syndication format, it is meant a format used to associate computer readable files. A syndication format is used to associate files that are available for delivery over a network. The syndication format also is used to provide users with information concerning the subject matter or content of files available for download. Based upon information provided in the syndication format, a user may decide to subscribe to delivery of one or more files. Syndication format-aware computer programs then can automatically determine what files to download to subscribing users and to automatically download such files.

A feed is an association among files specified in accordance with a syndication format. Generally, a feed is used to associate files according to criteria specified by a publisher of the content. For example, files associated by a feed may represent episodes in a program similar to episodes of a television or radio program. For instance, a feed may comprise a list of the URLs by which episodes of a show may be accessed over the Internet. A content provider may post a feed on a webserver. This location may be referred to as the feed URI (or, perhaps more often, feed URL). Ordinarily, a feed is updated each time a new file (e.g. episode or media file) is published. Alternatively, a feed may associate files based upon more arbitrary criteria, however, such as files of favorite songs of a particular blogger. The RSS and Atom formats are examples of two popular feed formats. The RSS format is an example of a simple XML-based format that allows users to subscribe to content available for download from networks sites such as Internet websites. An RSS feed comprises an association of files using the RSS format. An Atom feed comprises an association of files using the Atom format.

A user typically uses a type of computer program known as an aggregator, sometimes called a podcatcher or podcast receiver, to subscribe to and manage subscriptions to feeds. An aggregator monitors a set of feeds for a user and downloads file updates at a specified interval, such as every two hours, for example. A downloaded file, such as an episode of a show for example, then can be played, replayed, or archived as with any other computer file.

RSS (Really Simple Syndication) is an example of a simple XML-based feed format that allows users to subscribe to their favorite websites. Using RSS, a webmaster can put content into a well-known format, which can be viewed and organized through RSS-aware software. The web address of a file (e.g. a media file) may be contained in a enclosure tag of an item in an XML file in accordance with RSS 2.0. Two constituents of a typical RSS feed are the channel element and the item element. Both the channel element and the item element may comprise sub-elements. Actually the item element itself is a sub-element of a channel element.

The following is a list of some RSS channel elements, each with a brief description and example.

| Element | Description | Example |
| --- | --- | --- |
| title | The channel name | entertainment.com |
| link | URL to the HTML website corresponding to the channel. | http://www.entertainment.com/ |
| description | Phrase or sentence describing the channel. | The report from entertainment, an entertainment company Web site. |

A channel may contain a number of <item>s. An item also may be complete in itself. Elements of an item are optional. The following lists some RSS item elements, each with a brief description and example.

| Element | Description | Example |
| --- | --- | --- |
| title | The title of the item. | Excellent New Song |
| link | The URL of the item. | http://publication.com/2006/10/18EAF.html |
| description | Brief description of the item. | The Excellent New Song was released to critical acclaim. |
| enclosure | Description of an object attached to the item. | Has three required attributes. url indicating where the enclosure is located, length indicating size in bytes, and type indicates file type is, e.g. standard MIME type. <enclosure url="http://www.songname.com/mp3s/firstsong.mp3" length="13217840" type="audio/mpeg" /> |
| guid | Globally unique identifier, a string that uniquely identifies the item. When present, an aggregator may choose to use this string to determine if an item is new. | <guid>http://arbitrary.server.com/weblogItem5050</guid> |
| source | RSS channel where the item came from. (The purpose of this element is to propagate credit for links) | <source url="http://www.musicreview.org/links2.xml">moviereview's location</source> |

Thus, podcasting provides a new paradigm for delivery of information over networks. The popularity of podcasting has created a need to develop new approaches to targeting content to users based upon the content to which have subscribed. In particular, for example, there has been increased interest in developing improved techniques to target advertisements to users who subscribe to content. The present invention meets this need.

SUMMARY OF THE INVENTION

In one aspect a method is provided to manage insertion of media ads in media content over a network. The method includes receiving a request for ad updates for insertion in media content subscribed to by a user device, and also receiving information identifying at least one media ad to insert in the subscribed to content on the user device. The method further includes generating metadata indicating an ad placement rule to designate insertion location of the at least one media ad in the subscribed to media content. The at least one media ad is sent over the network to the device. The metadata also is sent over the network to the device.

In another aspect a system is provided to manage insertion of media ads in media content over a network. The system comprises a CPU, data storage and a bus interconnecting the CPU and the data storage. The data storage is encoded with program code to cause the CPU to perform a process. The process includes receiving a request for ad updates for insertion in media content subscribed to by a user device, and also receiving information identifying at least one media ad to insert in the subscribed to content on the user device. In addition, the process includes generating metadata indicating an ad placement rule to designate insertion location of the at least one media ad in the subscribed to media content. The at least one media ad is sent over the network to the device. The metadata also is sent over the network to the device.

These and other features and advantages of the invention will be appreciated from the following description of embodiments thereof in conjunction with the appended drawings.

BRIEF DESCRIPTION OF THE DRAWINGS

FIGS. 16A-16B are illustrative drawings of an example of a user/ad campaign match instance, which indicates an ad campaign eligible to be sent to a user based upon the ad campaign/content mutual matching instances of FIG. 12A and the ad campaign/user mutual matching instances of FIG. 15A, and an illustrative flow diagram of a process performed by a third sub-system of FIG. 9 to produce the user/ad campaign match instance in accordance with some embodiments of the invention.

FIGS. 17A-17E are illustrative drawings of a content provider graphical user interface (GUI) used by content provider devices to interact over a network with a web based publisher application operative on the registration server as shown in FIG. 3 in accordance with some embodiments of the invention.

FIGS. 18A-18D are illustrative drawings of a ad campaign provider graphical user interface (GUI) used by ad campaign provider devices to interact over a network with a campaign manager operative on the registration server as shown in FIG. 3 in accordance with some embodiments of the invention.

FIGS. 19A-19C are illustrative drawings representing successive portions of a scrollable "Add a New Campaign" ad campaign GUI screen that is generated by actuating the "add a new campaign" button on the "Campaign Overview" screen of FIG. 18A or on the "Campaign Detail" screen of FIG. 18B.

FIGS. 20A-20B are illustrative drawings of a content provider graphical user interface (GUI) used by user devices to interact over a network with a registration profile gathering server as shown in FIG. 2.

FIG. 23 is an illustrative drawing of an example of XML code that encodes an RSS feed representing two content items and their associated cue sheet information.

FIG. 24 is an illustrative chart showing a matrix of ad encoding possibilities for content media in a variety of different encoding formats.

FIGS. 25A-25D are illustrative drawings representing content and ads before insertion (FIG. 25A), after ad insertion (FIG. 25B fade details near the beginning of an inserted ad (FIG. 25C) and near the end of an inserted ad (FIG. 25D).

FIGS. 26A-26B are illustrative diagrams representing content and associated ad insertion points (FIG. 26A) and a set of ads and corresponding ad insertion points (FIG. 26B).

DETAILED DESCRIPTION OF THE PREFERRED EMBODIMENTS

Figure 1:
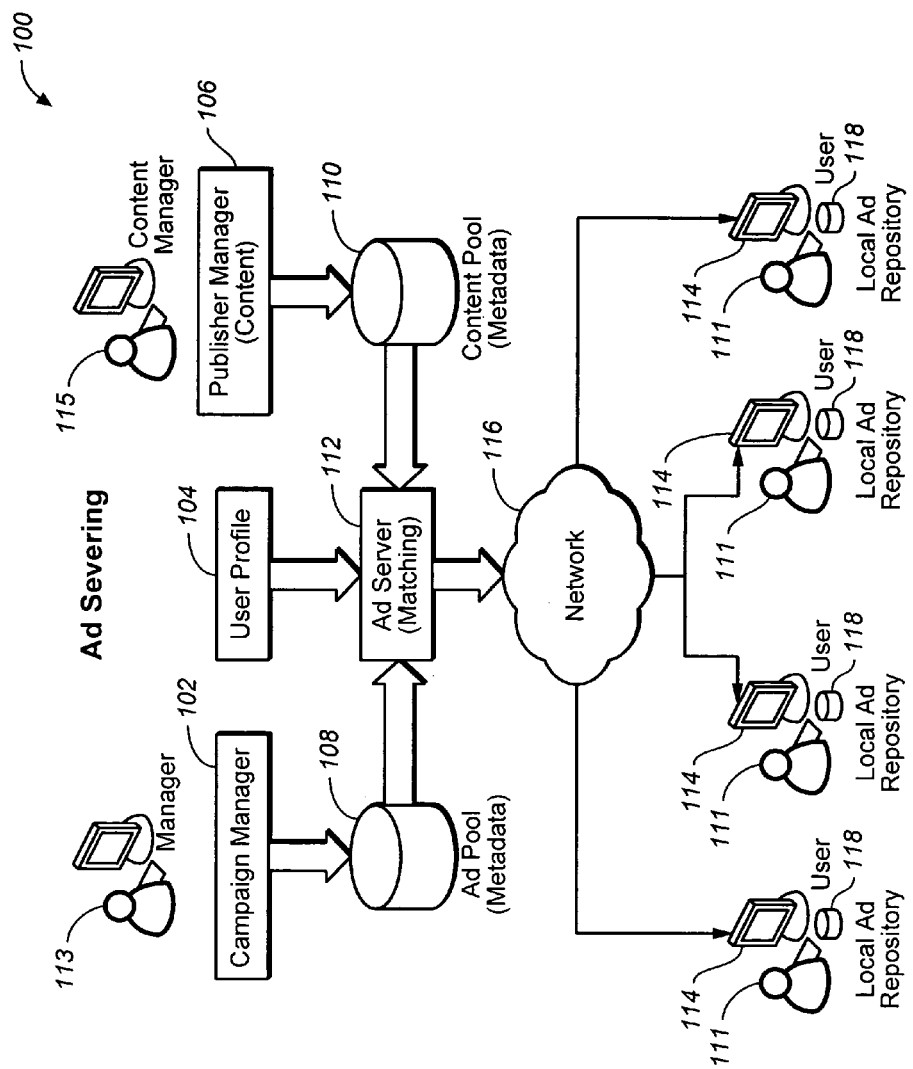
FIG. 1 is an illustrative block level diagram representing a system and related method to receive and process content provider criteria for determining combination of ads with content (metadata), user profile information, and ad campaign provider criteria for determining combination of content with ads (metadata), and further, to deliver ads determined to be associated with content to users who have received or subscribed to receive the content.

The following description is presented to enable any person skilled in the art to make and use a system and method for matching selected information, such as advertising information, to media content/user combinations in which the information and the content are delivered to a user over a network. The description discloses the system and method in accordance with embodiments of the invention and in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention can be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

A system and method in accordance with some embodiments of the invention facilitates an online marketplace in which providers of media content and ad providers match ads with content and with online users who receive or subscribe to receive the content. The online marketplace provides a venue in which content providers and advertisers can find out about each others' offerings and user profiles and preferences and can agree upon matching of ads with content and users. Content providers provide media content. As used herein media content may comprise sounds or motion pictures or a combination of both. One quality of a motion picture is that it comprises a series of images played so as to approximate continuous motion. A motion picture may represent real-life images or computer generated images such as video game environments, for example. Media content may comprise music, news reports, talk shows, weather reports, traffic reports, video clips and radio/TV like programs, for example. Media content can be organized into content channels that may be updated periodically. For instance, a talk show channel may be updated with the latest interview or a weather channel may be updated with a new weather report.

In some embodiments, content providers use a network such as the internet to designate criteria for associating their content with ads. Ad campaign providers use the network to designate criteria for associating their ad campaigns with content and users (e.g. listeners or viewers). Users subscribe to receive content over the network. Users use the network to designate preferences that may be used to focus and/or limit the types of ads and/or content they receive. A user's content and/or ad usage information that is indicative of user habits or preferences is gathered via a communications medium, such as the internet. Ads are selected for online delivery based upon the content provider criteria, ad campaign provider criteria, user preferences and user usage history or habits. Selected ads are delivered over the internet to the user. Ad campaign providers make payments to content providers in return for users viewing or listening to content obtained online interspersed with ads obtained online.

FIG. 1 is an illustrative block level diagram of a system 100 to receive and process content provider criteria for determining combination of ads with content (metadata), user profile information, and ad campaign provider criteria for determining combination of content with ads (metadata), and further, to deliver ads determined to be associated with content to users who have received or subscribed to receive the content. More particularly, the illustrative drawing of FIG. 1 shows flow of input control information and processing used to dynamically match advertisements with content/user profile combinations in accordance with some embodiments of the invention. The system 100 includes multiples sources of control information: campaign manager block 102, user profiles block 104 and content publisher/manager block 106. The system 100 includes a storage repository 108 for ad campaign-related control information (metadata) and a storage repository 110 for content-related control information (metadata). The system 100 includes a match processing block 112 that determines which ads to match to which content/user combinations 111 based upon the control information. In some embodiments, the match processing block is associated with an ad server that sends ads to user devices 114 via network 116 for storage in a user device's local ad storage 118.

In operation, an ad campaign manager 113 inputs metadata and rules concerning an ad campaign via block 102. The ad campaign metadata and rules may serve as control information for use in determining which users and/or which content to match to ads in an ad campaign. The ad metadata may include information about the ads in the campaign, for example. A content publisher manager 115 inputs metadata and rules concerning content via block 106. The content metadata and rules also may serve as control information for use in determining which users and/or which content to match to ads in an ad campaign. The content metadata may include information about the content, for example. The user profiles block includes an aggregation of information concerning usage, preferences, geographic information, demographic information about users. For instance, user information may be included in user profiles for individual users or for groups of users or for user organizations, for example. The user profiles may serve as control information for use in determining which users and/or which content to match to ads in an ad campaign.

The match processing block 112 reconciles control information in the ad-related control information storage repository 108 and in the content-related control information storage repository 110, and user profile information of block 104. Note that updates to the ad-related control information storage repository 108 and to the content-related control information storage repository 110 need not be provided at the same time. Moreover, user profile information provided via user profiles block 104 can be updated frequently without regard to the updating of the control information in storage 108, 110.

The match processing block 112 determines which ads to associate with content/user profile combinations. The determination is made, for example, based upon user profiles associated with user devices 114 and content delivered or subscribed to by users 111 of the devices 114. Ads may be delivered to user devices 114 over a network 116 for storage in ad storage 118 associated with those devices 114. Play of the stored ads may be interspersed with play of content delivered to the devices 114. Thus, different users 111 may experience different ad/content associations depending upon the reconciling by the match processing block 112.

Figure 2:
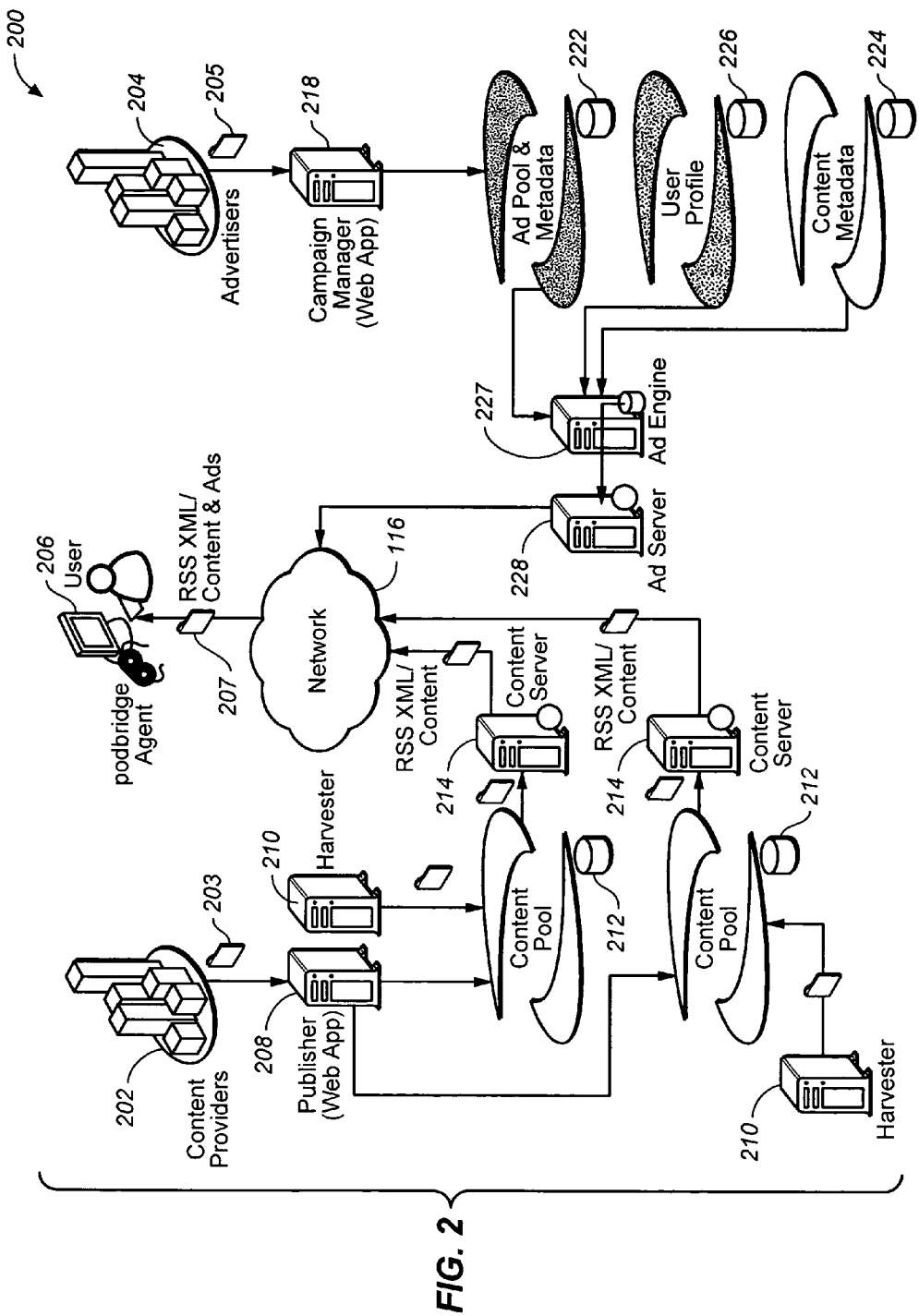
FIG. 2 is an illustrative architecture level diagram representing a server level view of content delivery systems and ad delivery systems and representing the flow of content and ads to users and showing, in generalized form, the use of ad campaign-related control information (metadata), user profile information and content-related control information (metadata) to determine which ads to send to which user devices.

FIG. 2 is an illustrative networked server hardware level view of an ad delivery system 200 showing the flow of content and ads and showing, in generalized form, the use of ad campaign-related control information, user profile information and content-related control information to determine which ads to send to an illustrative user device. Multiple content providers 202 provide content 203 for publication. Multiple ad providers 204 provide ads 205 for distribution. A multiplicity of user devices (only one shown) 206 receive selected content and selected ads 207. In some embodiments, users may subscribe to have their user devices 206 receive content that is updated via an RSS XML feed. In some embodiments, ads are provided to user devices 206 separate from the content feeds via an http protocol that specifies for each content file the list ads accompanied by ad insertion position and additional rules if any.

With respect to content publishing, in some embodiments, content providers 202 may publish content via a publisher 208 and/or via harvester 210. The publisher server 208 provides a UI application for a content provider to publish fees and content. Content provider content may be uploaded to the content pools 212 (e.g. RAID) and served by the content server 214.

Content servers 214 may be hosted by content providers or by a third party such as the Podbridge, for example. In other words, some content providers may elect to host content via a third party publisher (e.g. Podbridge) and others may elect to do their own hosting of own content. The publisher 208 runs a UI application to publish feeds (and content if hosted by a third party such as Podbridge). The harvester is an automation publication server. Instead of publishing feeds one by one, a harvester works with scripts that identify feeds to be published and provide an automation schedule for publishing.

Generally, speaking, a harvester uses a script that describes where to get content and how and when to publish it. The harvester does not actually serve content. Rather, it injects feeds and content to local content servers.

Ad providers 204 provide ad campaign management information via an ad campaign manager 218. The ad campaign information may include ad campaign-related control information. An ad information storage repository 222 stores ad campaign-related control information. A content information storage repository 224 stores content-related control information. A user profile information storage repository 226 stores user profile-related information. For the content received by or subscribed to by a given user device 206 and for the user profile information associated with the given user device 206, a match server 227 reconciles the stored ad campaign-related information, the stored content-related information and corresponding user profile-related information, in order to identify which ads to send to the user device 206.

An ad server 228 sends the identified ads to the given user device 206 via the network 116. Although only one ad server 228 is shown, the system 200 may have many ad servers. Ad content (i.e. the actual ad media) is stored in ad storage (not shown) associated with the ad server 228 (only one shown) that serves the ad content. Therefore, a user may subscribe to multiple content streams provided by multiple different content providers, and ads will be delivered to a user's device based upon stored ad campaign control information, content control information and user profile information. In this manner, ads may be precisely targeted and delivered.

Figure 3:
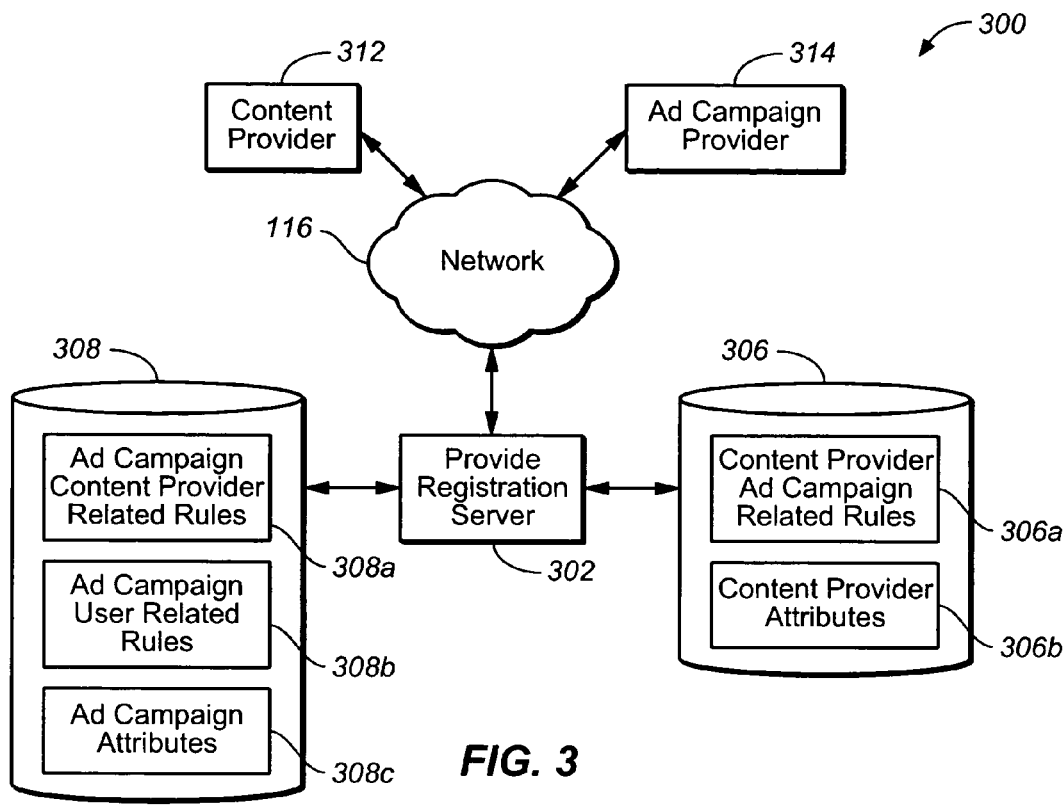
FIG. 3 is an illustrative drawing representing a system to gather content provider information and advertisement campaign provider information in accordance with some embodiments of the invention.

FIG. 3 is an illustrative drawing representing a system 300 to gather content provider information and advertisement campaign provider information in accordance with an embodiment of the invention. The system 300 includes a provider registration server 302, a content provider storage repository 306 to store content provider information and an ad campaign provider storage repository 308 to store ad campaign provider information. In some embodiments the provider registration server 302 comprises a web server. The content provider storage repository 306 includes a storage region 306a to store content provider ad campaign-related rules and a storage region 306b to store content attributes. The ad campaign provider storage repository 308 includes a storage region 308a to store ad campaign provider content-related rules, a storage region 308b to store ad campaign provider user-related rules and a storage region 308c to store ad campaign attributes. A content provider device 312 and an ad campaign provider device 314, such as web browser enabled personal computers, communicate with the provider registration server 302 via a network 116, such as the internet, for example.

The provider registration server 302 serves one or more content provider web pages to the content provider device 312 for use in inputting content-related information including criteria for associating ads with the content provider's content and including attributes of that content. The server 302 receives the content provider information via the network 116 and communicates it to the content provider storage repository 306. Similarly, the server 302 serves one or more ad campaign provider web pages to the ad campaign provider device 314 for use in inputting ad campaign-related information including criteria for associating content and/or users with the ad campaign provider's ads and including attributes of the ad campaign. The provider registration server 302 receives the ad campaign provider information via the network 116 and communicates it to the ad campaign provider storage repository 308.

Details concerning the implementation of the provider registration server 302 are unimportant to the principles of the invention, and there are a variety of ways in which such sever may be designed and implemented consistent with the principles of the invention. For example, content provider registration and ad campaign provider registration may involve different server processes running on the server 302. Moreover, the server 302 may be implemented as multiple physically distinct hardware devices each running one or more instances of a server process. Furthermore, separate hardware devices may be used to implement a content provider registration process and to implement an ad campaign provider registration process.

Similarly, details concerning the content provider storage repository 306 and the ad campaign provider storage repository 308 are unimportant to the to the principles of the invention, and there are a variety of ways in which such storage repositories may be designed and implemented consistent with the principles of the invention. For example, the storage repositories may be implemented as a relational database. Content provider and ad campaign provider rules and attributes may be stored in the database as set of tables. SQL statements may be used to calculate the matching, for example.

Figure 4:
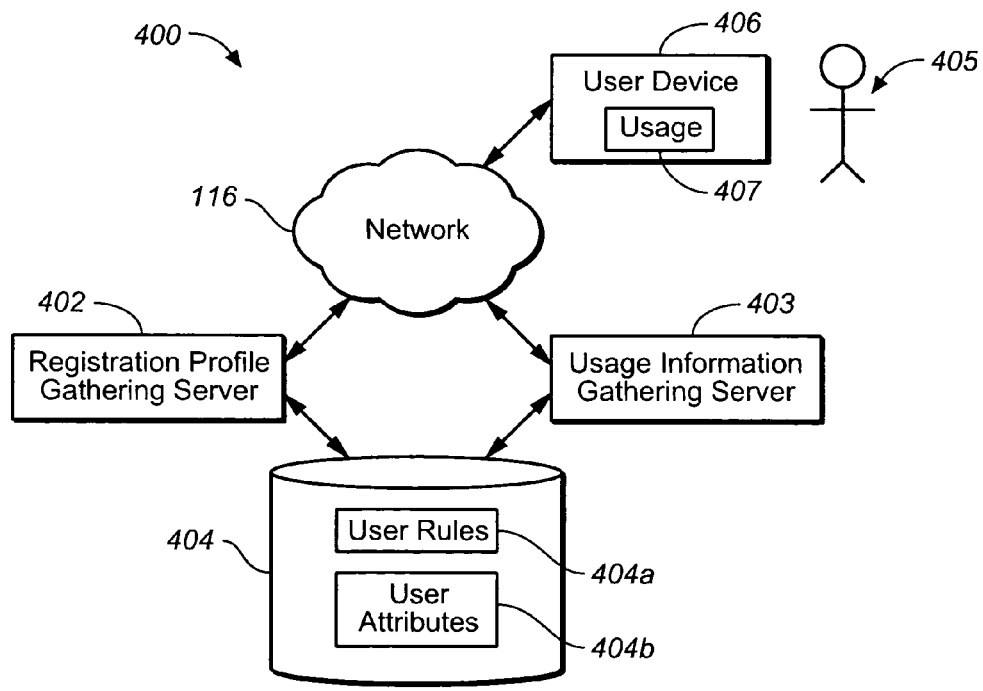
FIG. 4 is an illustrative drawing of a user information gathering system in accordance with some embodiments of the invention.

FIG. 4 is an illustrative drawing of a user information gathering system 400 in accordance with an embodiment of the invention. A user 405 operates a user device, which may for example, comprise a personal computer, PDA, iPod device, Sony brand PSP, which permits downloading of content over a network such as the internet. For instance, the user device 406 may comprise a browser enabled computer device that permits the user to download content over the internet. The user information gathering system 400 gathers and stores user related information over the network 116. In some embodiments, the user information gathering system 400 gathers user registration profile information when a user first registers to receive certain content. In addition, the user usage information gathering system 400 periodically gathers user usage information indicative of content and advertisements obtained or subscribed to by a user.

In some embodiments, a user registration profile gathering server 402 gathers user profile information over the network 116 during user registration. For example, server 402 may comprise a web page server that serves up web pages to a browser enabled user device 406 over the network 116 to solicit user preferences and/or rules during user registration. Moreover, a user usage information gathering server 403 periodically gathers user usage related information over the network 116. In one embodiment, a user device 406 runs a computer program module 407 that gathers usage information and that periodically uploads it over the network 116 to the user usage information gathering server 403. The usage information upload is automated in that it does not require user interaction. In one embodiment, when a user first registers to receive a podcast he/she is asked to download a plug-in (client) and provide user profile information, which is stored via user registration profile gathering server 402 as a user registration profile. As part of the plug-in (client) normal operation, the client periodically sends user usage data to usage information gathering server 403.

The system 400 also includes a storage repository 404 to store user-related information. The user-related information may comprise user acceptability rules that express preferences. Such preferences may be absolute such as what type of information a user absolutely does or does not want to receive or may be flexible. The preferences are, in effect, a type of user acceptability rules that indicate the acceptability of different types of information from the user's perspective. In other words, the preferences may serve as acceptability rules that indicate what types of content or ads a user does and does not want to accept. The user-related information also may comprise user attributes that express user qualities or characteristics. For example, user attributes may comprise a user's gender, age, listening and or viewing habits, geographic info (e.g. zip code) and whether there are children in the house. In one embodiment, the user information storage repository 404 includes a user rules related information storage repository 204a and includes a user attributes related storage repository 404b.

Details concerning the implementation of the registration profile gathering server 402 and the user usage information gathering server 403 are unimportant to the principles of the invention, and there are a variety of ways in which these severs may be designed and implemented consistent with the principles of the invention. For example, both servers may be implemented as processes running in a shared hardware environment. Alternatively, they may be implemented on multiple physically distinct devices each running one or more instances of a server process.

Figure 5:
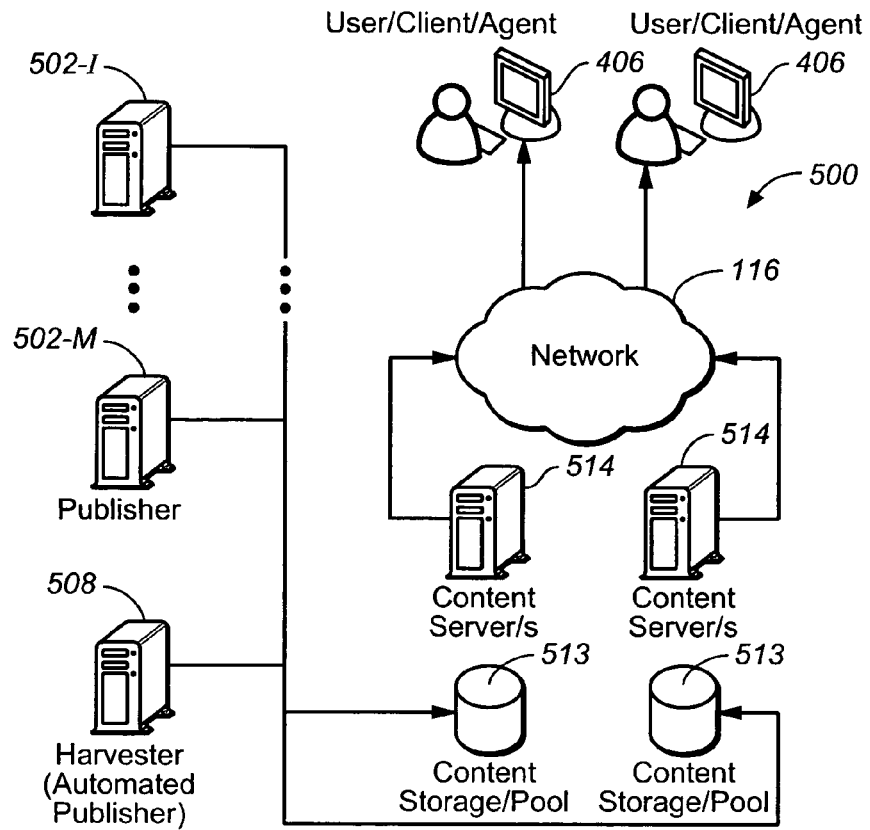
FIG. 5 is an illustrative drawing of a system to register to receive content in accordance with some embodiments of the invention.

FIG. 5 is an illustrative drawing of a system 500 to register to receive content in accordance with an embodiment of the invention. The content may comprise an mp3 or mp4 media file, for example. Each of multiple content provider content sources 502-1 to 502-m (i.e. publishers) are associated with one or more content feeds used to obtain corresponding content over the network 116. Each content provider content source 502-1 to 502-m, for example, may include one or more servers that serve content provider content (e.g., an episode of a talk show) to a user device 406 in response to requests provided via associated content feeds. In some embodiments, a content publisher 508 acts as a meta-harvester, harvesting content provider content source information from multiple content sources 502-1 to 502-m and periodically serving it to the user device 406. The harvester 508 and the publisher 508 do not actually serve content. Rather, they inject it to content pools 513 (or repositories) for delivery by one or more content servers 514.

The following Content Feed example represents information in an example content feed.

Content Feed (Example)

id channel_id
name channel_name
link website url describing podcast
ct when created
mt when recently modified
description Long Description
update_schedule How frequently episodes are added
itunes_category iTunes category it belongs to
itunes_subcategory iTunes subcategory it belongs to
itunes_author Who is creating this podcast
itunes_subtitle What is the subtitle to substitute if an episode
   doesn't have a title
itunes_keywords Keywords to describe the podcast
itunes_short_description Short description
provider_id Who is the provider (provider table has more
   details)
itunes_explicit IS Explicit content
itunes_block Should this be blocked?
itunes_image What is the image to be showed in iTunes
aggregates__30 dayusers Unique users in last 30 days who
   listened to something aggregates_7 dayusers Unique users in last 7 days who listened to something
external_rss If remotely hosted what URL it is hosted on
number_episodes How many episodes published so far
number_downloads How many total downloads of all episodes
number_listens How many total listens so far
mre_number_downloads How many total downloads for most recent episode
mre_number_listens How many total listens for most recent episode
mre_last_upload Data and time of most recent episode Feed information such as that in the above content feed (example) is stored in a database for each feed/channel in the system. (The term feed is used herein synonymous with the term channel) The ad insertion slots may be represented in the RSS XML. A subset of this feed information is included the RSS XML. In a present embodiment, ad insertion (slot) information is not stored in the database. Rather, ad slot information is added by the content provider directly in the RSS. Also, note that an ad insertion cue sheet is for a particular episode (e.g. content information such as a file delivered pursuant to a feed) and is not for the feed itself.

Therefore, publisher 508 manages the delivery to a user device 406, content source information associated such as content feeds. It will be appreciated that RSS feeds are requested by the user device 406 from the one or more content servers 514 prior to delivery of the content by the content servers 514. The harvester 508 harvests content from one or more content provider content sources 502-1 to 502-m and stores it in one or more content pools 513 for delivery to user devices 406 via one or more content servers 514. Generally speaking, a harvester is an automation process that allows a content sources (e.g., sources 502-1 to 502-m) to schedule content updates (harvests) automatically driven by a schedule. A user may communicate over network 116 to obtain content previously harvested by the harvester server 508 from the one or more content sources 502-1 to 502-m and stored in one or more content pools 513.

Content feeds associated with content to which the user desires to subscribe. In a present embodiment, a user subscription process is initiated when a user actuates a "Get Podcast" button, discussed more fully below, on a web page associated with a content provider content source. Actuation of the "Get Podcast" button also initiates user registration profile gathering by the registration profile gathering server 402 of FIG. 4. Once a user device 406 has subscribed to one or more content feeds, the user device 406 periodically communicates with one or more content servers to request updated content associated with the one or more content feeds that the user device has subscribed to. In general, an iTunes device or another podcasting ready application periodically generates a request to check if a new episode/s available for a particular feed. Note that in one embodiment, the plug-in client does not manage the updating of podcast feed episodes. Rather, a podcast application manages updating of the podcast feeds.

Details concerning the implementation of the content publisher 508 and the harvester 510 are unimportant to the principles of the invention, and there are a variety of ways in which they may be designed and implemented consistent with the principles of the invention. For example, both servers may be implemented as processes running in a single hardware environment. Alternatively, they may be implemented on multiple physically distinct devices each running one or more instances of a server process.

Figure 6:
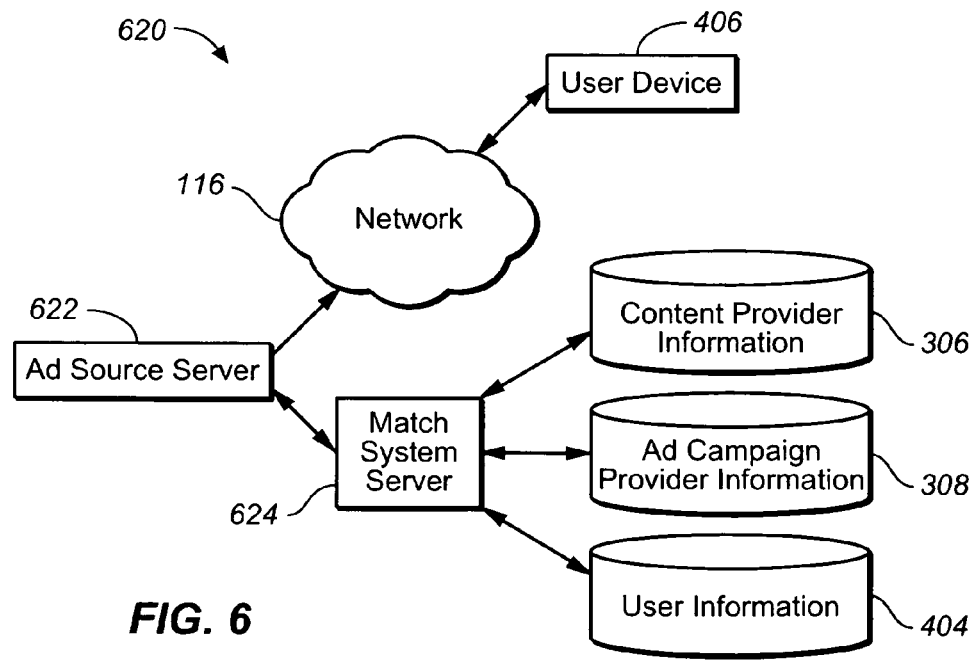
FIG. 6 is an illustrative drawing of a system to select ads for delivery to a user device and an advertisement delivery source for delivery of selected ads to a user device.

FIG. 6 is an illustrative drawing of a system 620 to select information for delivery to a user device 406 and an ad source server 622 to deliver selected information to a user device 406. The selection system 620 includes a match system server 624 that is in communication with the content provider information repository 306, the ad campaign provider information repository 308 and the user information repository 404. The match system server 624 resolves content provider information, ad campaign provider information and user information in order to determine optimal matching of ads to content-user combinations in accordance with some embodiments of the invention. The system 620 provides ad selection information to ad source server 622 to indicate what ad information to deliver to the user device 406.

The match system server 624 utilizes content provider information, ad campaign provider information and user information to determine ad related information to be delivered to the user device 406. In one embodiment, the match system 624 determines candidate ad related information based upon information stored in the content provider, ad campaign provider and user storage repositories 306, 308 and 404. The match system 624 determines which candidate ad related information to actually deliver to a user device 406 based at least in part upon information obtained over the network 116 from the user device 406 as to what content actually has been obtained or subscribed to by the user device 406. The match system server 624 provides an indication to the ad server 622 as to what ad campaign related information to select to deliver to the user device 406. The ad server 622 delivers the ad campaign related information to the user device 406 over the network 116.

A determination of what ads to deliver also may depend upon factors such as the amount that different ad campaign providers are willing to pay to have their ads delivered to a user having a particular profile and/or to have their ads associated with particular content and/or to have their ads matched to a particular user/content combination. The amounts could be determined, for example, through a competitive bidding process. Ad campaign providers could submit bids to determine which ads to match with users, content or user/content combinations, for example. In the event of control information (e.g. rules, and metadata such as attributes) resulting in multiple ad campaigns matching to some user, content or user/content combination, an ad provider submitting the highest bid may have its ad(s) selected to be sent in spite of the other matches.

Details concerning the implementation of the match system server 624 and the ad server 622 are unimportant to the principles of the invention, and there are a variety of ways in which these severs may be designed and implemented consistent with the principles of the invention. For example, both servers may be implemented as processes running in a single hardware environment. Alternatively, they may be implemented on multiple physically distinct devices each running one or more instances of a server process.

Figure 7:
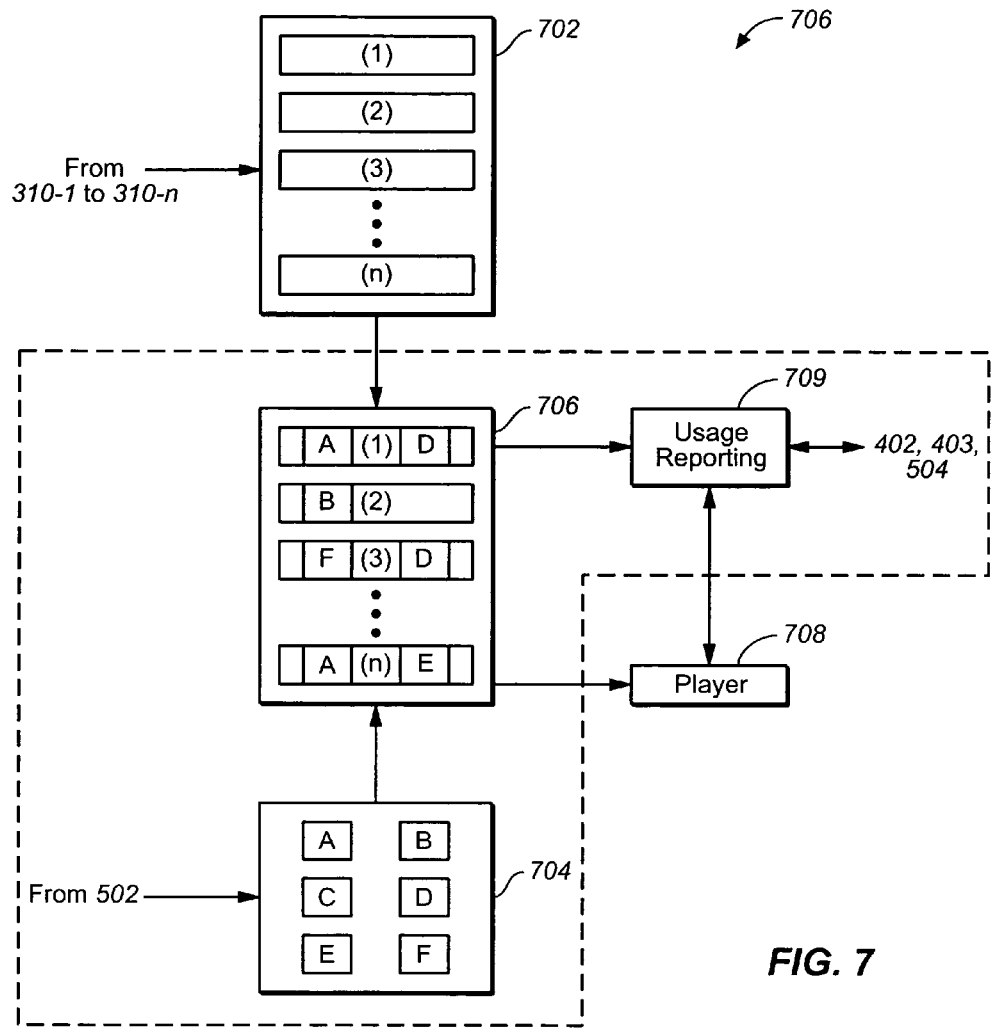
FIG. 7 is an illustrative block level diagram showing interaction of select components of a user device involved with associating ads with content and gathering and reporting user usage information in accordance with some embodiments of the invention.

FIG. 7 is an illustrative drawing showing components of a user device 406 involved with combining ads with content and involved with gathering and reporting on user usage information in accordance with an embodiment of the invention. The user device 406 includes a processing unit such as a CPU or controller (not shown), and a data storage buffer 702 interconnected by a bus (not shown). The content buffer 702 receives raw content (1) to (n) from one or more content sources, such as via a content server 214. An ad information storage buffer 704 receives ads and associated ad meta-data (a) to (f) from an ad server 322.

An ad insertion module 706 associates content provider content with ad campaign provider ads. In some embodiments, the ad insertion module 706 comprises computer program code that runs on the user device 406. In some embodiments, the plug-in (client) application is downloaded to the user's device 406 the first time the user requests content (i.e. when the user actuates the "Get Podcast"). The user is asked to approve the download and the installation of the plug-in.

Computer Code Appendix A, which is expressly incorporated herein in its entirety by this reference, comprises computer program code used in the implementation of some embodiments of the invention. This "Get Podcast" code comprises automatically generated JavaScript that can be attached to a content provider's web site to provide a link that permits visitors to the content provider's web site to easily sign up for the subscription service. It supports both the WIN and the MAC and other major browsers.

The plug-in is downloaded from a software download server, such as a web server, for example. Once the plug-in has been installed and run for the first time, it triggers a request to the user to provide user profile information via the user device 406 over the network 116 to the usage information gathering server 403. Moreover, in one embodiment, the ad insertion module 706 associates the ads with the content as the content is received and passes the ad-infused content to the media player, such iTunes. More specifically, the plug-in downloads content from a content server (i.e. any content server specified in an RSS feed subscribed to by a user. The plug-in connects the ad source server to obtain a list of ad files and the insertion positions/slots within content files, and additional placement rules (if any) for this content. A JavaScript AddChannel onclick( ) function is defined that makes sure that the user device has the client-side agent installed. The actions initiated by user actuation of the Get Podcast button include: (1) check if the agent module is installed, if yes, call the AddToMyChannels( ) function; and (2) if podbridge agent is not installed, download an installation file and execute it. If the agent is not installed, then this function initiates an agent installation process, which includes a registration process in which a user is asked to provide user profile information as described above.

The plug-in downloads the ads from the associated ad source server (download only if not previously cached on the user device) The plug-in associates the ads with the content at specified insertion locations. If specific insertion positions/slots have not been specified, the plug-in follows placement rules to determine where to insert the ads. If rules have not been presented, the plug-in follows default insertion behavior.

A player 708 plays the ad-infused content. In some embodiments, the player, for example, may comprise iTunes, iPod device, future windows media player, Sony PSP device, Sony PS3 device, XBOX device. A distinction between an iPod device and Sony PSP device is that an iPod device uses iTunes to manage and download podcast feeds. In some embodiments, the plug-in is integrated with iTunes. A PSP device, on the other hand, due to its WiFi capability, can connect to the internet directly or get content through a Sony Media Manager application. Thus, a PSP device can download podcasts either through its Media Manager application similar to the way an iPod device does, via the iTunes application, or can obtain content directly from the internet, skipping the Media Manager PC application. Whether or not podcast downloads occur via a media manager, the client can be installed to handle association of ads with content and sending usage reports. In some embodiments, the user device 406 may include separable components. For instance, the user device 406 may comprise a personal computer component with a detachable connection to a handheld component such as an iPod. The player 708 may operate in the personal computer component of the user device such as a media player application such as iTunes, MS media player, Sony Media Manager. Moreover, the media player may operate in a handheld device such as iPod device or a PSP device. Alternatively, for example, the media player may operate in a gaming console such as PS3 or XBOX, for example.

A usage reporting module 709, which may be a part of the plug-in download described above, reports user usage information to user usage information gathering server 403 for storage in user storage repository 404. In the above example, in which the user device 406 comprises a personal computer component and a separable handheld component, the usage reporting module 709 runs on the personal computer component.

Figure 8:
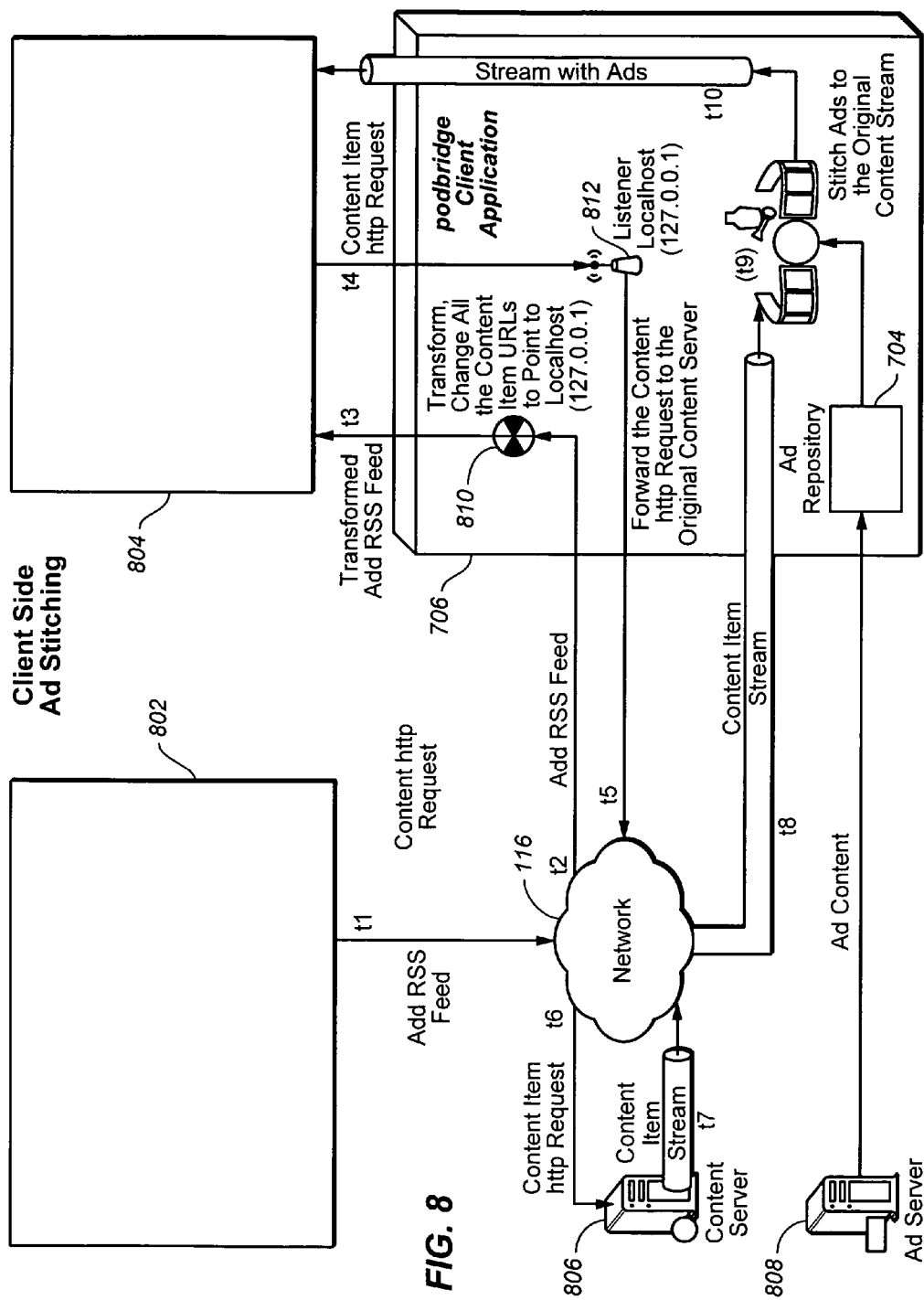
FIG. 8 is an illustrative functional block diagram representing operation of a system and process to separately deliver content and ads to a user device and to associate the ads with content by the user device in accordance with some embodiments of the invention.

FIG. 8 is an illustrative functional block diagram showing in general terms, an example of the operation of an overall system and process 800 of combining ad campaign provider ads into content provider content in accordance with an embodiment of the invention. A web page 802 is displayed by a PC web browser (not shown). The web page 802 is associated with a content provider. A content provider content server 806 serves content in response to RSS feed requests. The web page 804 is associated with one of the content provider content servers 302-1 to 302-m. An ad server 808 serves ad information (e.g., ads and associated meta-data). An ad insertion module 706 runs on the user device (not shown) It is assumed that the ad insertion module 406 was downloaded previously as part of the plug-in (agent) to the user device.

In operation, at time=t1, a user actuates a link on web page 802 to request an RSS feed associated with content served by content server 806. In response to the request, at time=t2, the RSS feed is delivered over the network 116 to the user device. However, a transform module 810 within the ad insertion module 406 intercepts the RSS feed and changes all content URLs to point to localhost (127.0.0.1). At time=t3, the RSS feed with the transformed URLs is delivered to the user device. The content provider's web page 802 includes a "get podcast" button associated with Java script used to download the plug-in. When a user selects the "get podcast" button, the user is asked for permission to install the plug-in client, if it was not previously installed. If the client already has been installed, the client takes control and adds the feed to the podcast application, such as iTunes.

At time=t4, the podcast application, such as iTunes initiates an update of content associated with the RSS feed. The request is intercepted by the ad insertion module 706, which includes a listener 812 on localhost (127.0.0.1). The listener is a part of the plug-in code, which listens on the local host IP 127.0.0.1 and intercept calls by the iTunes application (or any other media manger application). At time=t5, the ad insertion module 706 forwards the intercepted request over the network 116 to the content server 214. At time=t6, the content server 806 receives the request sent by the ad insertion module 706.

At time=t7, the content server 806 returns the requested content over the network to the ad insertion module 406. At time=t8, the ad insertion module 706 receives the requested content update. At time=t9, ads stored in ad information storage buffer 704 are combined with the content delivered by the content server 214. At time=t10, ad-infused content is streamed to be played. Note that as explained below, ads may be associated with content through an ad rotation scheme, for example, in which different ads from an ad campaign or from different ad campaigns are stitched into different content updates.

Meanwhile, the ad source 808 delivers ad information to the ad information storage buffer 404. Ad information is delivered based upon outcome of a match process performed by the match system 624. In some embodiments, the timing of delivery of ad information by the ad server 808 is substantially independent of the timing of delivery of content by the content server 806. While ads are sent based upon at least in part, on the content that a user is receiving (either actually received or subscribed to receive), there is no synchronization required of the timing of the delivery of ads and delivery of content. Although ads should be delivered in time for them to be inserted into content before a user 'plays' (e.g. listens to and/or views) the content. In that sense, the delivery of ads and the delivery of content are asynchronous relative to each other. Ads are buffered in advance in the ad information storage buffer 704 and are combined with appropriate content once such content is received from the content server 806. Specifically, the ad insertion module 706 downloads an ad from the ad server 808 if a specified ad is not present in the local ad repository 704. That is, the ad server 808 informs the insertion module of ads that ought to be downloaded, and if the ads have not already been downloaded, then the ad insertion module 406 downloads the ads.

Basically, the original RSS XML is transformed by the management agent (after download) to point all the URLs of the files, such as content files, mp3, m4v, etc . . . , to the "local server" (127.0.0.1), so all the podcast manager application content requests for this RSS will be directed to the agent (client application) and handled by it. Thus, the podcast management agent listens on a local host port and intermediates in content requests by the podcast manager application. More particularly, each RSS feed may represent a podcast content feed with a list of episodes, for example. In one embodiment, there is one RSS feed per podcast subscription, similar to a virtual channel. The client-side agent intervenes each time the user (i.e., consumer/subscriber) clicks on a "Get Podcast" button for each feed, by rewriting address elements within each RSS feed (changing address to 127.0.0.1:port) before handing it off to the podcast manager application such as iTunes. For instance, if a user subscribes to 100 feeds/channels, then there are 100 RSS feeds that client-side agent intervenes in.

In particular, assume, for example, that the podcast manager application requests a file from the RSS feed. The management agent intercepts the feed request, which has been modified to point to the request to the local host. The management agent, rather than the podcast manager application, forwards the request for the file indicated by the RSS feed. The agent generates a new http request for the file from the server, such a content server 214. Note that a content server that hosts the content can be either hosted by a content provider or by an intermediary. More particularly, the agent intercepts file requests from the podcast manager application (to 127.0.0.1:port) and rewrites each such request so that the content server 214 receiving the request sends requested content back to the management agent rather than sending it directly to the podcast manager application.

The following is an illustrative example of the intermediation of the management agent in the retrieval of content feed in accordance with one embodiment of the invention. Assume that a user requests that a content feed be added by clicking an icon on a user device UI, for instance. The request is captured by the management agent software, which changes the file's original URL in the RSS feed, e.g., http://www.some-site.com/podcast/channels/morning_news.mp3, to e.g., http://127.0.0.1:10930/?getitem_www.somesite.com/podcast/channels/morning_news.mp3. The file's full original URL is stored as an argument after the "getitem_". Subsequently, a user may request a file from that RSS feed. Thus, the podcast manager uses the changed URL, (http://127.0.0.1:10930/?getitem_www.somesite.com/podcast/channels/morning_news.mp3), to actually make the call for the file. The agent software is listening on the address 127.0.0.1:10930, however. The agent captures the requests and generate a request to a content server that serves the requested RSS feed, using the original URL that is stored as an argument after the "getitem_", i.e. www.somesite.com/podcast/channels/morning_news.mp3.

Alternatively, agent application could be also implemented used directly on user devices with IP (internet protocol) capabilities such Sony PSP. These kind of devices do not need to use an intermediate podcast manager application (e.g., iTunes) for content syncing. They can obtain the RSS and the content directly from the network, such as the internet.

The management agent receives the content from the content source. The agent splices ads to the received content. In one embodiment, ads are stitched into the content on the fly. The management agent periodically connects to the ad server source 622 and downloads the ads selected for delivery to the client device 406 for storage in the ad repository 704. The management agent streams the content with the stitched in ads back to the podcast manager application.

The ad repository may be implemented as an ad queue which specifies the priority order in which ads in the repository are to be spliced into content. The ad repository is periodically refreshed independent of the status of the various podcast RSS feeds the subscriber is subscribed to depending upon ad campaign management status. For example, fulfilled and expired ads are removed. Higher value ads are moved ahead in priority. Finer targeted (more relevant) ads are moved ahead in priority.

Figure 9:
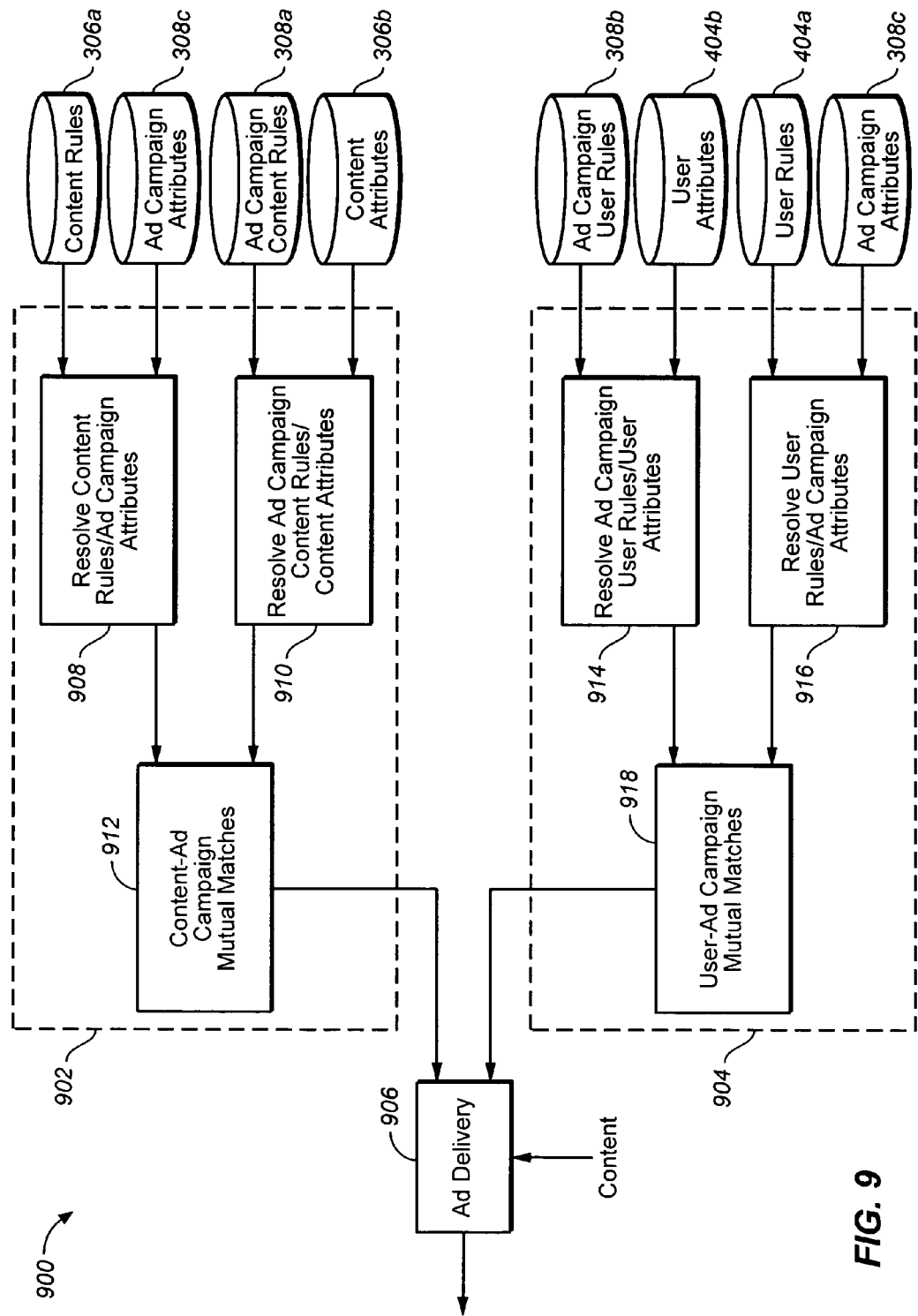
FIG. 9 is an illustrative block diagram representing a system and process to resolve content provider ad campaign-related rules, ad campaign provider content-related rules and ad campaign provider user-related rules to determine optimal matching of ads to users and content in accordance with some embodiments of the invention.

FIG. 9 is an illustrative drawing representing a matching system 900 to resolve, content provider ad campaign-related rules, ad campaign provider content-related rules, ad campaign provider user-related rules and user provided rules in relation to content attributes, ad campaign attributes and user attributes in order to determine optimal matching of ads to users and content in accordance with some embodiments of the invention. There is no bright line between rules and an attribute. In general, an attribute is a quality or characteristic of an ad, a media content file or a user. However, in some cases, an attribute may be interpreted as also being rule. For instance, assume that a user profile indicates that a particular user does not want to receive content or ads touching upon some particular topic. This desire to not receive certain information may be construed as an attribute of the user and may be construed as a rule to be applied to delivery of content to the user. Therefore, although the following description describes the matching process in terms of rules applied to attributes (e.g. content rules applied to ad campaign attributes, ad campaign rules applied to content rules, etc.), it will be appreciated that an attribute may also serve as a rule and vise versa.

The matching system 900 includes a first sub-system, indicated by dashed lines 902, that determines which combinations of content and ad campaigns are mutually acceptable to the content providers and to the ad campaign providers. The matching system 900 also includes a second sub-system, indicated by dashed lines 904, that determines which matchings of users and ad campaigns are mutually acceptable to the users and to the ad campaign providers. The matching system 900 further includes a third sub-system 906 to determine which ads to deliver to a user based upon determinations of the first and second sub-systems 902, 904 and content indicated as actually obtained or subscribed to by a user.

Thus, the first subsystem 902 determines what ads and content are suitable for matching based upon ad campaign provider rules as to content and based upon content provider rules as to ad campaigns. The second subsystem 904 determines what ads and users-subscribers are suitable for matching based upon ad campaign provider rules as to users-subscribers and based upon user-subscriber rules. The third subsystem 906 determines what ads that actually are eligible to be sent to a user-subscriber based upon indications of content that the user-subscriber is receiving (i.e., whether the user already actually received the content or has subscribed to receive the content) and based upon the ad/content matching suitability results produced by the first subsystem 902 and based upon the ad/user profile matching suitability results produced by the second subsystem 904.

More particularly, the first sub-system 902 includes a first module 908 to determine content-ad campaign matches by resolving content provider ad campaign-related rules obtained from content rules storage repository 306a in relation to ad campaign attributes obtained from ad campaign attribute storage repository 308c. The first sub-system 902 also includes a second module 910 to determine ad campaign-content matches by resolving ad campaign content-related rules obtained from ad campaign content related rules repository 308a in relation to content attributes obtained from content attributes repository 306b. The first sub-system further includes a third module 912 to determine mutual matches between content and ad campaigns by resolving content-ad campaign matches determined by the first module 908 in relation to ad campaign-content matches determined by the second module 912.

The first module 908 receives as input, information obtained from the content rules storage repository 306a and information obtained from the ad campaign attributes storage repository 308c. The second module 910 receives as input, information obtained from the ad campaign content-related rules repository 308a and information obtained from the content attributes storage repository 306b. The first module 908 provides as output, content-ad campaign match instances, which may be input to the third module 912. The second module 910 provides as output, ad campaign-content match instances, which may be input to the third module 912. The third module 912 provides as output ad campaign-content match instances, which also comprise as an output of the first-sub-system 902. In alternative embodiments, the first subsystem 902 may resolve only ad campaign provider rules as to content, in which case the first module 908 and the third module 912 would not be required.

The second sub-system 904 includes a fourth module 914 to determine ad campaign user-related rules based user matches by resolving ad campaign user-related rules obtained from ad campaign user-related rules storage repository 308b in relation to user attributes obtained from user attribute storage repository 404b. The second sub-system 904 includes a fifth module 916 to determine user-subscriber rules-based ad campaign matches by resolving user provided rules obtained from user rules storage repository 404a in relation to ad campaign attributes obtained from ad campaign attribute repository 306b. The second sub-system 904 further includes a sixth module 918 to determine mutual matches between users-subscribers and ad campaigns by resolving ad campaign user-related rules based matches determined by the fourth module 914 in relation to user-subscriber rules-based ad campaign matches determined by the fifth module 916.

The fourth module 914 receives as input, information obtained from the ad campaign user-related rules storage repository 308b and information obtained from the user attributes storage repository 404b. The fifth module 916 receives as input, information obtained from the ad campaign user-related rules repository 308b and information obtained from the ad campaign attributes storage repository 308c. The fourth module 914 provides as output, ad campaign user-related rules-based match instances, which may be input to the sixth module 918. The fifth module 916 provides as output, user rules based match instances, which may be input to the sixth module 918. The sixth module 918 provides as output user rules based match instances, which also comprise as an output of the second-sub-system 904. In alternative embodiments, the second subsystem 904 may resolve only ad campaign provider rules as to users-subscribers, in which case the fifth module 916 and the sixth module 918 would not be required.

The third sub-system 900 receives as input, one or more ad campaign-content match instances produced by the third module 912 and one or more user rules based match instances produced by the sixth module 918. The third sub-system 906 also receives as input an indication of content obtained or subscribed to by a user. The third sub-system produces an indication of what ad campaign(s) are eligible to be associated with the user. More particularly, in one embodiment, the third sub-system 906 provides as output, at least one user-ad campaign match instance, which is eligible to be delivered to the user. A determination of which of the one or more ads determined to be eligible to be sent to a user to actually send to the user may be resolved through a bidding process among advertisers or through some other allocation process.

The match system 904 may be implemented using one or more hardware systems. Each of the first to third sub-systems 902, 904 and 906 may be implemented as a computer program controlled process running on one or more computers (not shown). Each of the first to sixth modules 908 to 918 may be implemented as a computer program implemented process running on one or more computers (not shown).

Figure 10A:
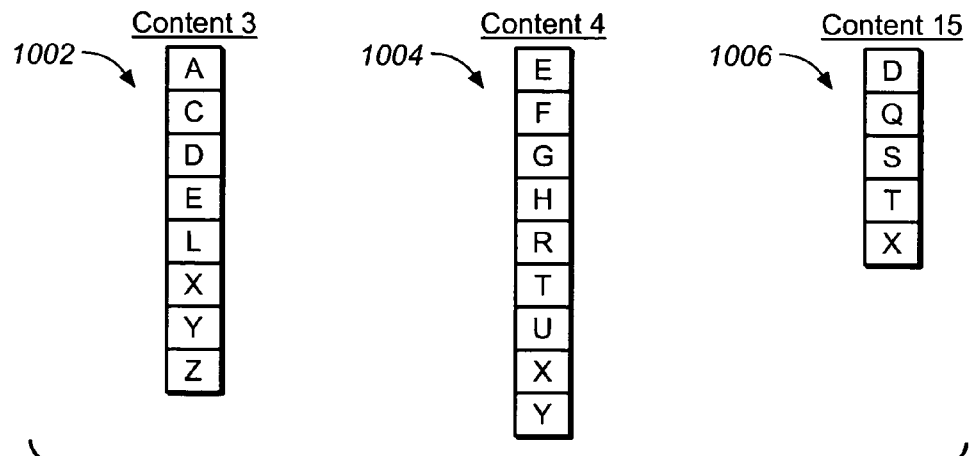
FIGS. 10A-10B are illustrative drawings of an illustrative example of instances of matching between content of individual content providers and multiple ad campaigns and an illustrative flow diagram of a process performed by a first module of FIG. 9 to produce these instances in accordance with some embodiments of the invention.
Figure 10B:
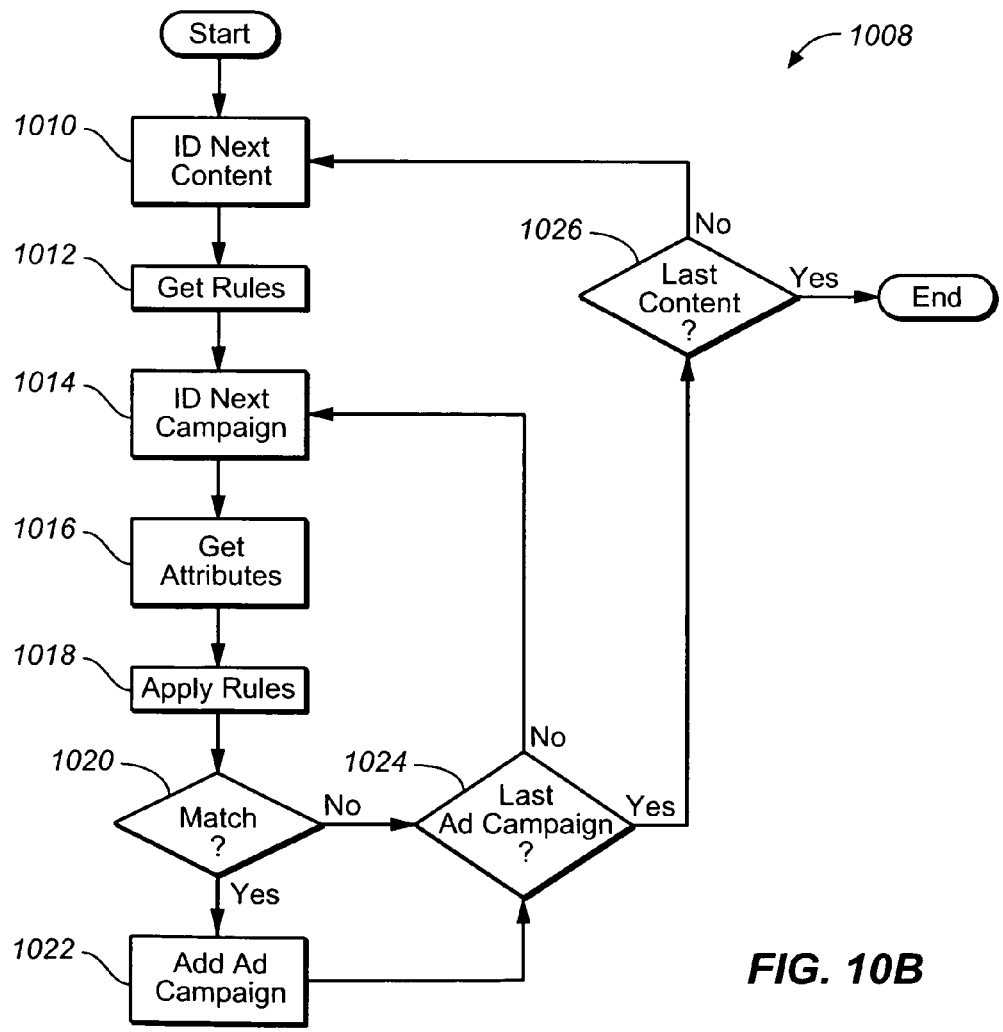

FIG. 10A is an illustrative drawing of several content-ad campaign match instances 1002, 1004, 1006 produced as output of the first module 908 of FIG. 9. Each such instance 1002, 1004, 1006, is an example of matching between individual content provider content and multiple ad campaigns. Each different content matching instance is produced using content provider ad campaign-related rules of a corresponding different content provider. FIG. 10B is an illustrative flow diagram of a process 1008 to produce the instances of FIG. 10A. In the following hypothetical examples, content is represented by numerals (i.e., 1, 2, 3, 4, etc.), and ad campaigns are represented by letters (i.e., a, b, c, d, etc.). In one embodiment, matching instances are represented as tables. A first content-ad campaign match instance 402 represents a matching between content (3) and ad campaigns (a, c, d e, l, x, y, z). A second content-ad campaign match instance 1004 represents a matching between content (4) and ad campaigns (e, f, g, h, r, t, u, x, y). A third content-ad campaign match instance 406 represents a matching between content (15) and ad campaigns (d, q, s, t, x).

FIG. 10B illustrates a process 1008 to create content matching instances in which, in step 1010, content to be evaluated next is identified. In step 1012, content provider ad campaign-related rules for the identified next content to be evaluated are retrieved from storage region 306a. In step 1014, an ad campaign to be evaluated next is identified. In step 1016, attributes of the identified next ad campaign to be evaluated are retrieved from the storage region 308c. In step 1018, the content provider ad campaign-related rules retrieved in step 1012 are applied to the ad campaign attributes retrieved in step 1016. In decision step 1020, a determination is made as to whether there is a match between the content currently under evaluation and the ad campaign-currently under evaluation. If in decision step 1020 a determination is made that there is a match, then in step 1022 an identifier of the ad campaign currently under evaluation is added to a content matching instance (e.g., a table) corresponding to the content currently under evaluation. If in decision step 1020, a determination is made that there is no match, then the process proceeds to step 1024. Alternatively, if in decision step 1020, a determination is made that there is a match, then after step 1022, the process proceeds to decision step 1024. In decision step 1024, a determination is made as to whether there are additional ad campaigns to be evaluated using the currently retrieved content provider ad campaign-related rules. If there exists another ad campaign to be evaluated, then in step 1014, an ad campaign to be evaluated next is identified, and the steps following step 1014 are repeated for the next ad campaign. If in decision step 1024, a determination is made that there are no more ad campaigns to be evaluated using the currently retrieved rules, then in decision step 1026, a determination is made as to whether there is additional content to be evaluated. If so, then in step 1010, content to be evaluated next is identified, and the steps following step 1010 are repeated for the next content to be evaluated. If not, then the process ends.

The following is a brief illustrative example of the application of ad campaign-related content rules to ad campaign attributes according to the process 1008 of FIG. 10B. Consider, for example, the first content instance 1002 of FIG. 10A, which specifies ad campaigns associated with content (3). Assume that the provider of content (3) specifies a first rule that content (3) shall not be associated with an advertising campaign promoting tobacco use, and also specifies a second rule that content (3) shall not be associated with advertising promoting the use of alcoholic beverages. Also, assume that the provider of ad campaign (f) specifies an attribute of that campaign that indicates that that campaign promotes tobacco use. Moreover, assume that the provider of ad campaign (g) specifies an attribute of that ad campaign that indicates that that ad campaign promotes alcoholic beverages. With these assumptions, during one iteration of the outer loop (from step 1010 to step 1026) of the process 1008, in which the rules specified for content (3) are applied to attributes of ad campaign (f), a decision is made in that the application of the first rule of content (3) to the tobacco use indicating attribute of ad campaign (f) means that there is not a match between content (3) and ad campaign (f). Accordingly, content instance 1002, does not associate ad campaign (f) with content (3). Similarly, during another iteration of the outer loop, in which the rules specified for content (3) are applied to attributes of ad campaign (g), a decision is made in that the application of the second rule of content (3) to the alcohol use indicating attribute of ad campaign (g) means that there is not a match between content (3) and ad campaign (g). As a result, content-ad campaign match instance 1002, does not associate ad campaign (g) with content (3).

Figure 11A:
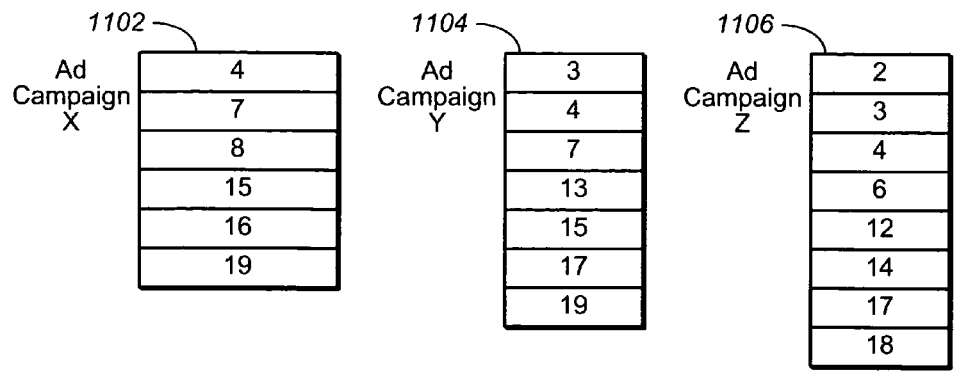
FIGS. 11A-11B are illustrative drawings of an illustrative example of several instances of matching between ad campaigns of individual ad campaign providers and multiple content sources and an illustrative flow diagram of a process performed by a second module of FIG. 9 to produce the instances in accordance with some embodiments of the invention.
Figure 11B:
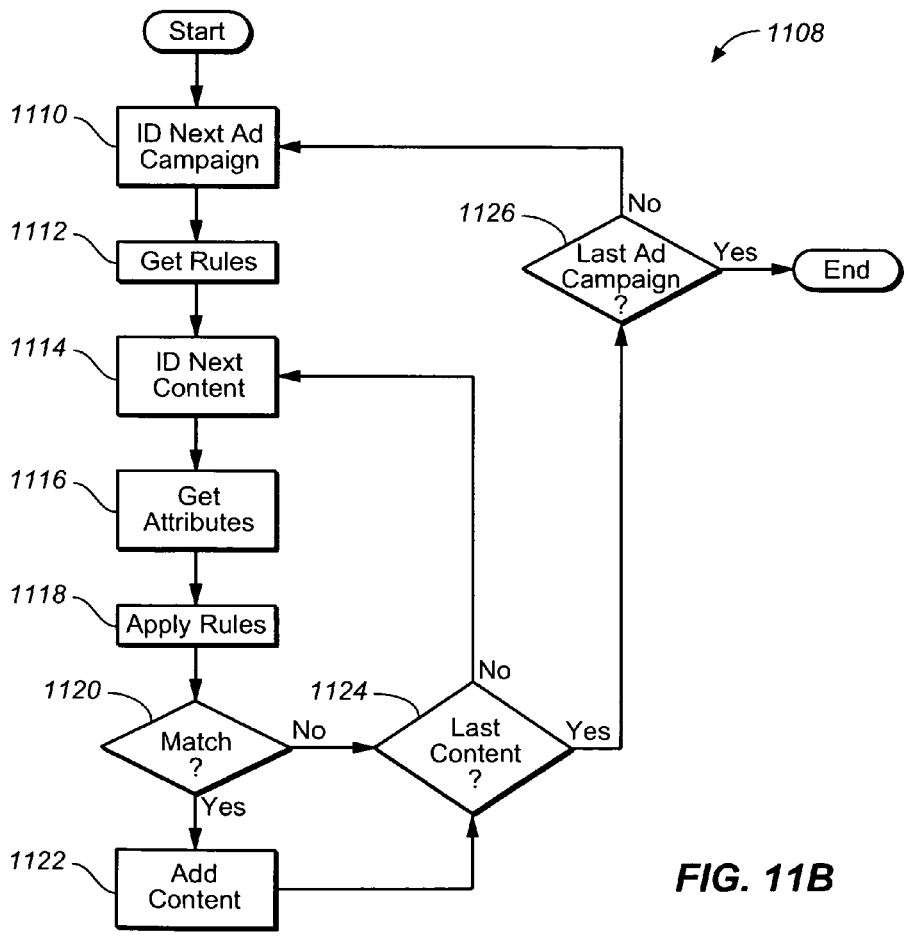

FIG. 11A is an illustrative drawing of several ad campaign-content match instances 1102, 1104, 1106 produced as output of the second module 910 of FIG. 9. Each such instance 1102, 1104, 1106, is an example of matching between individual ad campaigns and multiple content sources. Each different ad campaign matching instance is produced using ad campaign provider rules of a corresponding different ad campaign. FIG. 11B is an illustrative flow diagram of a process 1108 to produce the instances of FIG. 11A. For example, a first ad campaign-content match instance 1102 represents a matching between ad campaign (x) and content (4, 7, 8, 15, 16, 19). A second ad campaign-content match instance 1104 represents a match between ad campaign (y) and content (3, 4, 7, 13, 15, 17, 19). A third ad campaign-content match instance 1106 represents a matching between ad campaign (z) and content (2, 3, 4, 6, 12, 14, 17, 18).

FIG. 11B illustrates a process 1108 to create ad campaign matching instances in which, in step 510, an ad campaign to be evaluated next is identified. In step 1112, ad campaign provider content-related rules for the identified next ad campaign to be evaluated are retrieved from storage region 308a. In step 1114, next content to be evaluated is identified. In step 1116, attributes of the identified next content to be evaluated are retrieved from the storage region 306b. In step 1118, the ad campaign provider content-related rules retrieved in step 1112 are applied to the content attributes retrieved in step 1116. In decision step 1120, a determination is made as to whether there is a match between the ad campaign currently under evaluation and the content currently under evaluation. If in decision step 1120 a determination is made that there is a match, then in step 1122, an identifier of the content currently under evaluation is added to an ad campaign matching instance (e.g., a table) corresponding to the ad campaign currently under evaluation. If in decision step 1120, a determination is made that there is no match, then the process proceeds to decision step 1124. Alternatively, if in decision step 1120, a determination is made that there is a match, then after step 1122, the process proceeds to decision step 1124. In decision step 1124, a determination is made as to whether there is additional content to be evaluated using the currently retrieved ad campaign provider content-related rules. If there exists additional content to be evaluated, then in step 1114, content to be evaluated next is identified, and steps following step 1114 are repeated for the next content. If in decision step 1124, a determination is made that there is no more content to be evaluated using the currently retrieved rules, then in decision step 1126, a determination is made as to whether there are additional ad campaigns to be evaluated. If so, then in step 1110, a next ad campaign to be evaluated is identified, and the steps following step 1110 are repeated for the next ad campaign. If not, then the process ends.

The following is a brief illustrative example of the application of content-related ad campaign rules to content attributes according to the process 1108 of FIG. 11B. Consider, for example, the first content instance 1102 of FIG. 11A, which specifies content associated with ad campaign (x). Assume that the provider of ad campaign (x) specifies a first rule that ad campaign (x) shall be associated with content relating to sports, and also specifies a second rule that ad campaign (x) shall not be associated with content relating to hunting and/or firearms. Also, assume that the provider of content (8) specifies an attribute of that content that indicates that that content involves basketball games. Moreover, assume that the provider of content (17) specifies an attribute of that content that indicates that that content includes a sports competition and also specifies an attribute indicating that the competition features marksmanship as one of the events. With these assumptions, during one iteration of the inner loop (from step 1114 to step 1124) of the process 1108, in which the rules specified for ad campaign (x) are applied to attributes of content (8), a decision is made in that the application of the first rule of ad campaign (x) to the sport of basketball attribute of content (8) means that there is a match between ad campaign (x) and content (8). Accordingly, ad campaign instance 1102, does associate content (8) with ad campaign (x). However, during another iteration of the inner loop, in which the rules specified for ad campaign (x) are applied to attributes of content (17), a decision is made in that although the application of the first rule of ad campaign (x) to the sports competition attribute of content (17) suggests a match, the application of the second rule of ad campaign (x) to the marksmanship attribute of content (17) means that there is not a match between ad campaign (x) and content (17). As a result, ad campaign-content match instance 1102, does not associate content (17) with ad campaign (x).

Figure 12A:
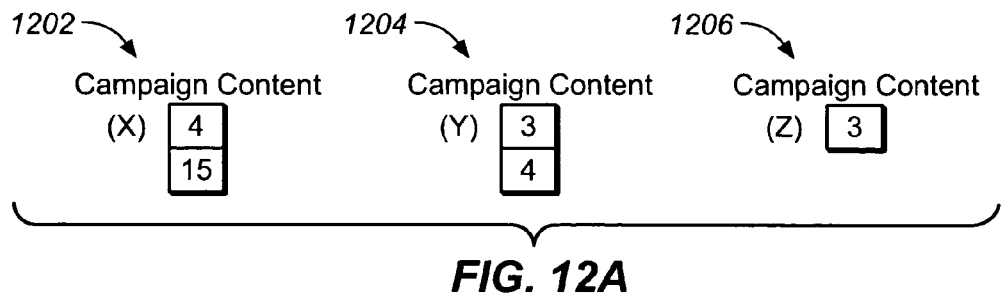
FIGS. 12A-12B are illustrative drawings of an example of several instances of mutual matching between content and ad campaigns identified through resolution of content matching instances of FIG. 10A and ad matching instances of FIG. 11A and an illustrative flow diagram of a process performed by a third module of FIG. 9 to resolve the matching results of the first and second modules to produce one or more ad campaign/content mutual matching instances in accordance with some embodiments of the invention.

FIG. 12A is an illustrative drawing of several content-ad campaign related mutual match instances 1202, 1204, 1206, produced as output of the third module 912, which also is an output of the first sub-system 902, of FIG. 9. Each such instance 1202, 1204, 1206 is an example of matching between content and ad campaigns identified through resolution of content matching instances of FIG. 10A and ad matching instances of FIG. 11A. First mutual match instance 1202 indicates a match between ad campaign (x) and content (4, 15). Second mutual match instance 1204 indicates a match between ad campaign (y) and content (3, 4). Third mutual match instance 1206 indicates a match between ad campaign (z) and content (3).

Figure 12B:
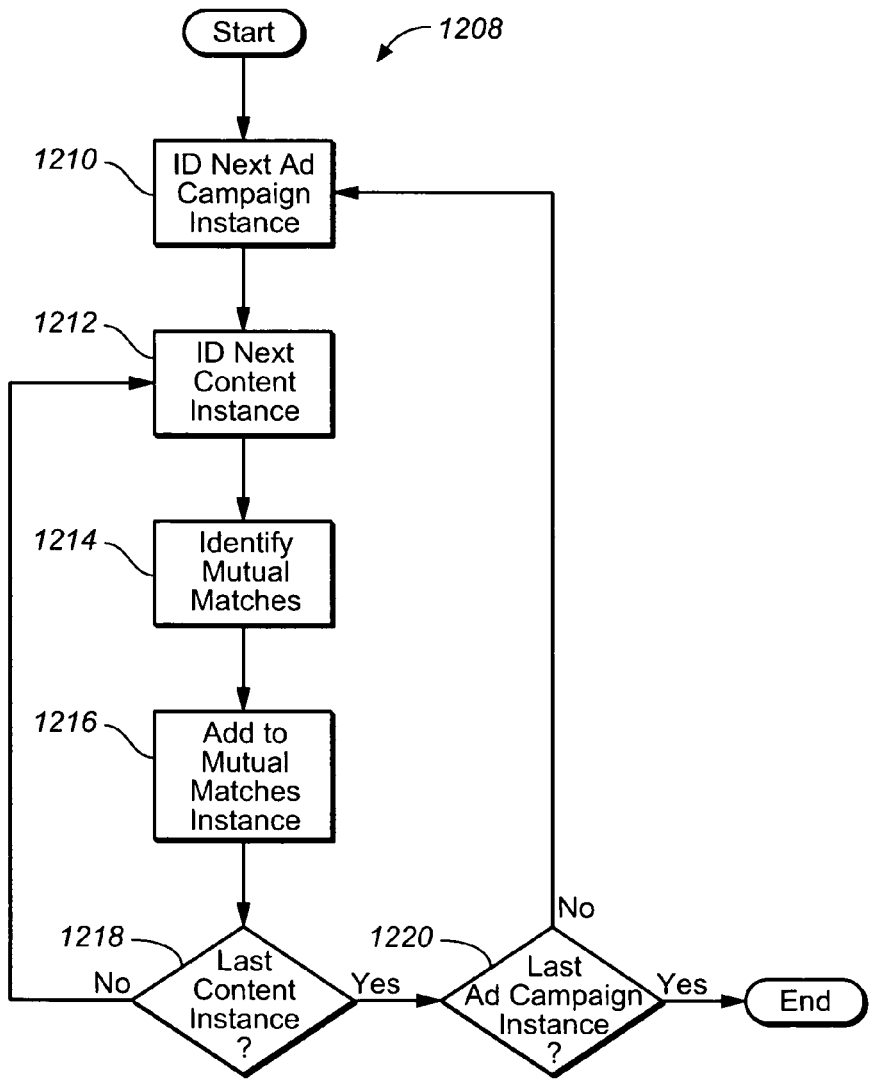

FIG. 12B is an illustrative flow diagram of a process 1208 to resolve content matching instances and ad campaign matching instances to produce content-ad related mutual matching instances. In step 1210, a next ad campaign instance is selected for evaluation. In step 1212, a next content instance is selected for evaluation. In step 1214, mutual matches (if any) are identified for the currently selected ad campaign instance and the currently selected content instance. In step 1216, an identifier of a matching content instance (if any) identified in step 1214 is added to a mutual matching instance (e.g., a table) corresponding to the currently selected ad campaign. In decision step 1218, a determination is made as to whether there are additional content instances to be evaluated relative to the currently selected ad campaign instance. If so, then in step 1212, a next content instance is selected for evaluation, and the steps following step 1212 are repeated for the next content instance. If not, then in decision step 1220, a determination is made as to whether there are additional campaign instances to be evaluated for mutual matching. If so, then in step 1210, a next ad campaign instance is selected for evaluation, and the steps following step 1210 are repeated for the next ad campaign instance. If not, then the process ends.

For example, assume that producing the first content-ad related mutual matching instance 1202 of FIG. 12A, the process of FIG. 12B, involves evaluation of mutual matching of the first campaign instance 1102 of FIG. 11A relative to the first, second and third content instances 1002, 1004, 1006 of FIG. 10A. More specifically, an iteration of an inner loop of the process (i.e., the loop from step 1212 to step 1218), identifies mutual matches (if any) between a selected ad campaign instance and individual content instances. More specifically, the inner loop determines that ad campaign (x) is identified in the second and third content instances 1004, 1006, corresponding to content (4) and (15), respectively. The inner loop also determines that the first ad campaign instance 1102, which corresponds to ad campaign (x), identifies both content (4) and (15). Thus, the inner loop determines that there is a mutual match between ad campaign (x) and content (4) and between ad campaign (x) and content (15). Accordingly, the inner loop causes identifiers for content (4) and (15) to be added to the first mutual match instance 602 corresponding to ad campaign (x). Conversely, since the first ad campaign instance 1102, which corresponds to ad campaign (x) does not identify the content (3), an identifier for content (3) is not included in the first mutual match instance 1202, even though first content instance 1002, which corresponds to content (3) does include an identifier for ad campaign (x). There is no "mutuality" of matching between ad campaign (x) and content (3). The inner loop process undertakes a similar approach in the evaluation of mutual matches for other ad campaigns.

Figure 13A:
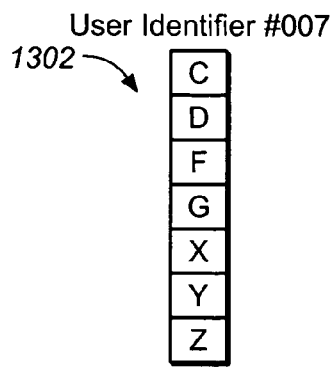
FIGS. 13A-13B are illustrative drawings of an example of instances of ad campaign-related user-related rules-based matching of ad campaigns to users and an illustrative flow diagram of a process performed by a fourth module of FIG. 9 to produce the instance in accordance with some embodiments of the invention.

FIG. 13A is an illustrative drawing of an ad campaign user-related rules-based match instance 1302 produced as output of the fourth module 914 of FIG. 9 in accordance with an embodiment of the invention. Ad campaign user-related rules match ad campaigns to user profiles. In one embodiment, the matching instances are represented as tables. Instance 1302 indicates that based upon ad campaign user-related rules, ad campaigns (a, d, f, g, x, y, z) are matched to a user profile identified as #007.

Figure 13B:
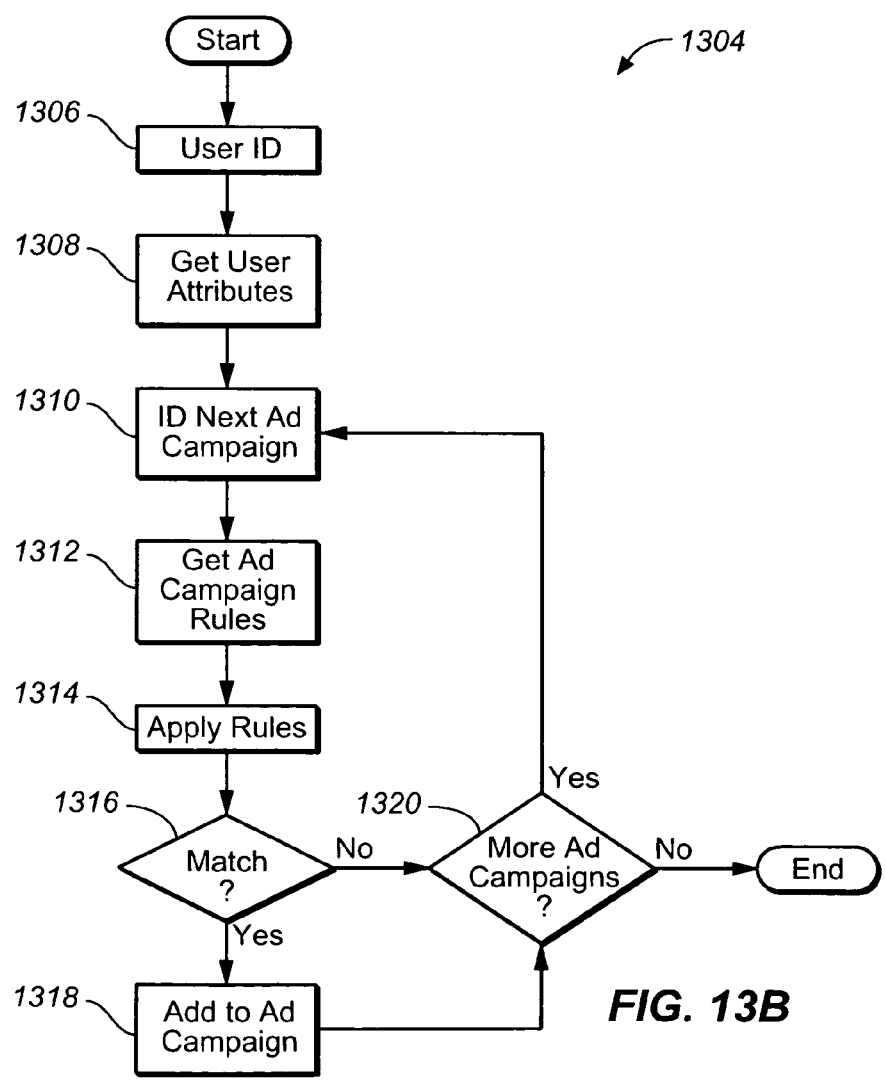

FIG. 13B is an illustrative flow diagram of a process 1304 to produce an ad campaign user-related rules-based match instance like that of FIG. 13A. In step 1306, a user profile is identified. In one embodiment, one or more persons may be identified as corresponding to the user profile. For example, a user may be an individual person or a group of people, such as the members of a household or an office, for instance. Alternatively, the identity of a device associated with a user may correspond to the user profile. In step 1308, user attributes associated with the identified user profile are retrieved from the user attribute storage repository 404b. In step 1310, a next ad campaign to be evaluated is identified. In step 1312, the ad campaign provider user-related rules of the identified next ad campaign to be evaluated are retrieved from the user-related ad campaign rules storage repository 408b. In step 1314, the retrieved ad campaign user-related rules are applied to the identified user's attributes. In decision step 1316, a determination is made as to whether there is a match between the current ad campaign provider user-related rules and the identified user's attributes. If there is a match, then in step 1318, an indication of the ad campaign is added to a user match instance such as that of FIG. 13A. In decision step 1320, after an ad campaign has been added to the user match instance or after a determination is made in step 1318 that there is no match, a determination is made as to whether there are additional ad campaigns to be evaluated. If so, then in step 1310, a next ad campaign to be evaluated is identified, and the steps following step 1310 are performed for that next ad campaign. If not, then the process 1304 ends.

The following is a brief illustrative example of the application of ad campaign provider user-related rules to the identified user's attributes according to the process 1304 of FIG. 13A. Assume that the user corresponding to user profile #007 has the following attributes: age is between 14-32; subscribes to content (3, 8, 15); purchases music and books online. Assume that ad campaign provider user-related rules for each of ad campaigns (c, f, g, y, z) targets users within ages 14-32. Also, assume that ad campaign provider user-related rules for ad campaign (d) target users within ages 14-32 and who also subscribe to content (8). Further assume that ad campaign provider user-related rules for ad campaign (x) target users within ages 14-32 and who also subscribe to content (8) and who also purchase either music or videos or books online. Finally assume that ad campaign provider user-related rules for ad campaign (a) (not shown in FIG. 13A) targets users within ages 14-32 and who also subscribe to content (10) (not shown in FIG. 13A) and who also purchase either music or videos or books online. With these assumptions, during iterations of the loop (steps 1310-1320) of the process 1304 during which the user-related rules for ad campaign (c) and (f) and (g) are applied to the attributes of user #007, a decision is made that the user #007's attributes meet the two criteria (i.e., age range and content subscription) set forth by the user-related rules for these three ad campaigns. During another iteration of the loop (steps 1310-1320), application of the user-related rules for ad campaign (d) to the user attributes results in a match of both of the user-related rules requirements (i.e., age range, content subscription) Similarly, during yet another iteration of the loop, application of the user-related rules for ad campaign (x) to the user attributes results in a match of all three of the user-related rules requirements (i.e., age range, content subscription and online purchases) However, during an iteration of the loop in which the user-related rules of ad campaign (a) are applied to the user attributes, a determination is reached that there is no match since the content subscription requirement of the user-related rules of ad campaign (a) is not met. The user identified with user profile #007 subscribes to content (3, 8, 15) but does not subscribe to content (10). Thus, ad campaigns (c, d, f, g, x, y, z) are included in the ad campaign user-related rules-based match instance 1302, but ad campaign (a) is not.

Figure 14A:
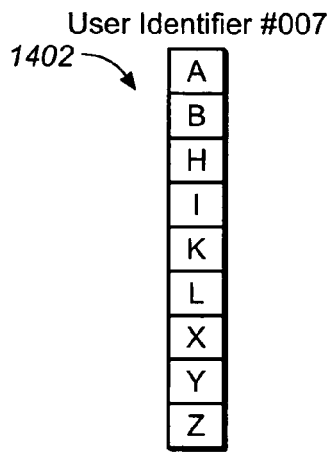
FIGS. 14A-14B are illustrative drawings of an example of an instance of user-related user rules based matching of ad campaigns to users in accordance with an embodiment of the invention and an illustrative flow diagram of a process performed by a fifth module of FIG. 9 to produce the instance in accordance with some embodiments of the invention.

FIG. 14A is an illustrative drawing of an ad campaign user rules based match instance 1402 produced as an output of the fifth module 916 of FIG. 9 in accordance with an embodiment of the invention. User-related rules match ad campaigns to users profiles. In one embodiment, an instance 1402 is represented as a table. Instance 1402 indicates that based upon user provided rules, ad campaigns (a, b, e, h, i, k, l, x, y, z) are matched to a user profile identified as #007.

Figure 14B:
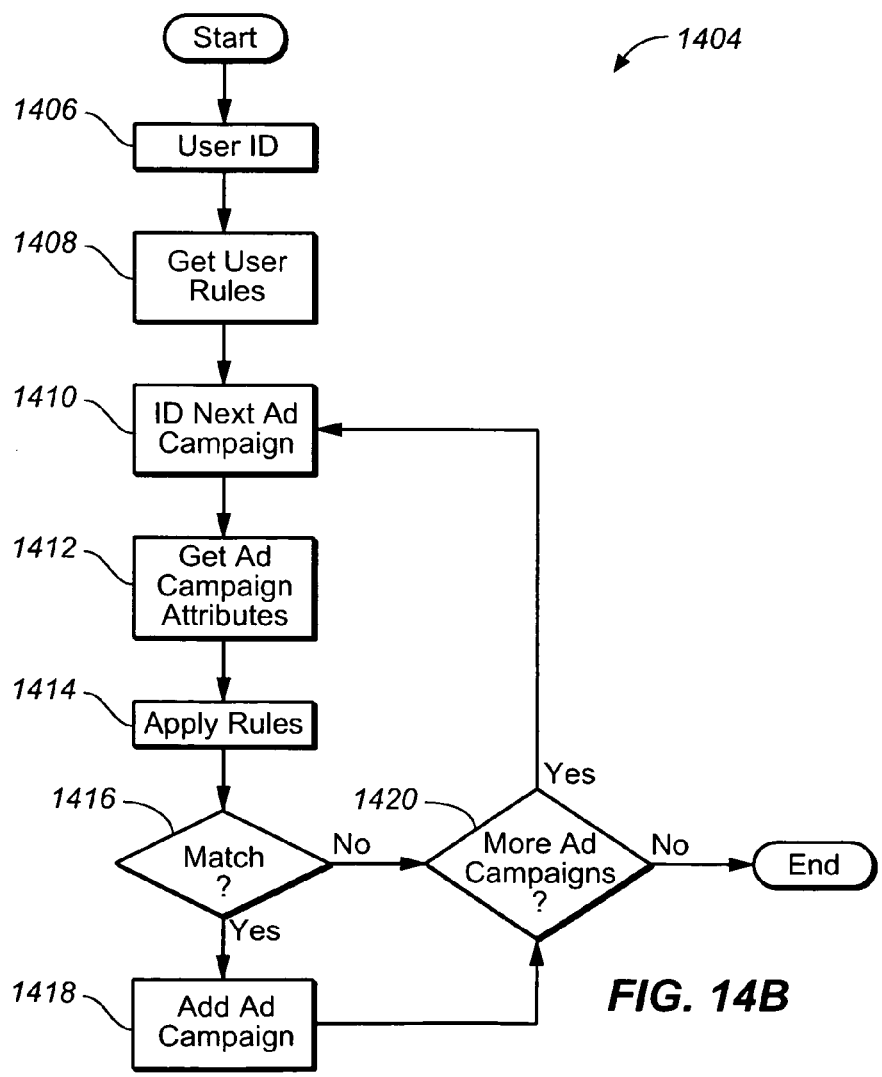

FIG. 14B is an illustrative flow diagram of a process 1404 to produce a user rules based match instance like that of FIG. 14A. In step 1406, a user profile is identified. As explained above, in one embodiment, the identity of a user is provided. In some embodiments, a user profile may comprise information provided by a user or by a group of users or a user organization at registration time and/or usage information gathered from time to time. Thus, a user profile may represent an individual person or a group of people, such as the members of a household or an office, for example. Basically, a user profile comprises information representative of a user for matching purposes. In step 1408, user-provided rules associated with the identified user profile are retrieved from the user rules storage repository 404a. In step 1410, a next ad campaign to be evaluated is identified. In step 1412, ad campaign attributes of the identified next ad campaign to be evaluated are retrieved from the ad campaign attributes storage repository 308c. In step 1414, the retrieved user-provided rules are applied to the identified ad campaign attributes. In decision step 1416, a determination is made as to whether there is a match between the user-provided rules and the currently identified ad campaign attributes. If there is a match, then in step 1418, the ad campaign is added to a user rules based match instance such as that of FIG. 14A. In decision step 1420, after an ad campaign has been added to the user rules based match instance or after a determination is made in step 1418 that there is no match, a determination is made as to whether there are additional ad campaigns to be evaluated. If so, then in step 1410, a next ad campaign to be evaluated is identified, and the steps following step 1410 are repeated for the next ad campaign. If not, then the process 1404 ends.

The following is a brief illustrative example of the application of user rules to ad campaign attributes according to the process 1404 of FIG. 14A. Assume that the user profile identified with identifier #007 specifies a rule that ads should not be tobacco related. Assume that attributes for ad campaigns (a, b, e, h, i, k, l, x, y, z) do not suggest any relationship with tobacco products. As explained above, a user may specify user rules during an initial registration process, for example. Further assume that attributes for each of ad campaigns (d, j, m, n) (not shown in FIG. 14A) indicate some relationship to tobacco. With these assumptions, during iterations of the loop (steps 1410-1420) of the process 1404 during which the user rule is applied to the attributes of ad campaigns (a, b, e, h, i, k, l, x, y, z), a decision is made that each of these ad campaigns' attributes matches the user rule's criterion (i.e., no tobacco). However, during iterations of the loop in which the user related rule is applied to the ad campaign attributes for ad campaigns (d, j, m, n), a determination is reached that there is no match since the attributes for each of these ad campaigns indicates relatedness to tobacco. Thus, ad campaigns (a, b, e, h, i, k, l, x, y, z) are included in the ad campaign user rules based match instance 1402, but ad campaigns (d, j, m, n) are not.

Figure 15A:
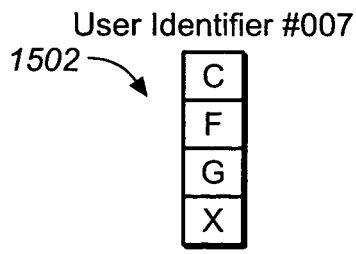
FIGS. 15A-15B are illustrative drawings of an example of a user-rules related mutual matching instance, which indicates mutual matching between an ad campaign-related user-related rules-based match instance of FIG. 13A and user-related user rules based match instance of FIG. 14A performed by the fourth and fifth modules of FIG. 9 and an illustrative flow diagram of a process performed by a sixth module of FIG. 9 to produce one or more ad campaign/user mutual matching instances in accordance with some embodiments of the invention.
Figure 15B:
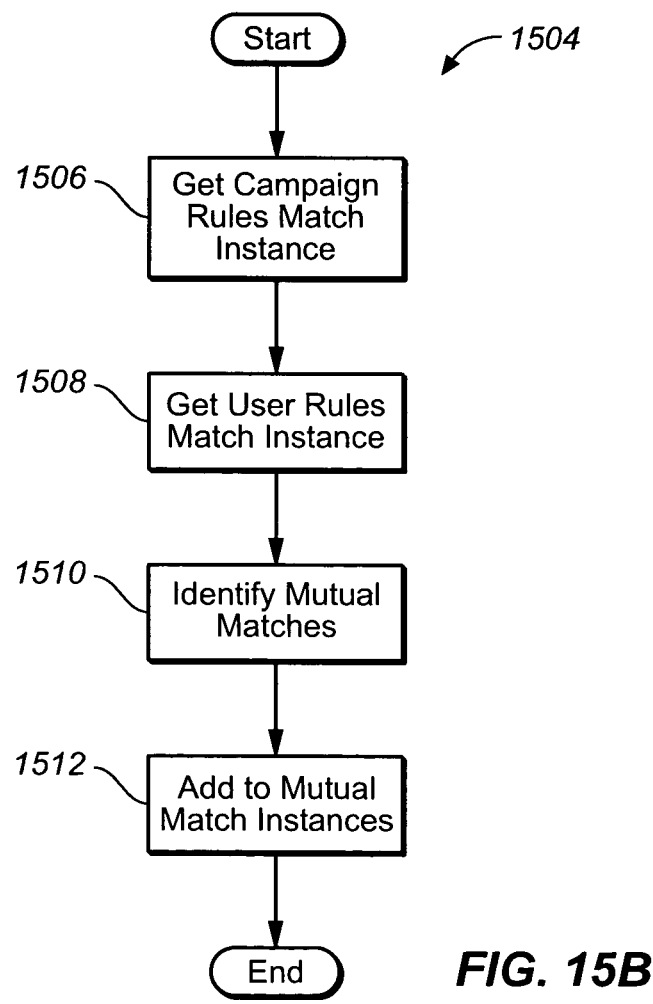

FIG. 15A is an illustrative drawing of a user-ad campaign related mutual matching instance 1502 produced as an output of the sixth module 918, which also is an output of the second sub-system 904, of FIG. 9. The example instance 1502 indicates areas of mutual matching between the ad campaign user-related rules-based match instances like that of FIG. 13A and the ad campaign user rules based match instances like that of FIG. 14A. FIG. 15B is an illustrative flow diagram of a process 1504 to resolve ad campaign user-related rules-based match instance and ad campaign user rules based match instances. In step 1506, ad campaign a user-related rules-based match instance for a given user, is selected for evaluation. In step 1508, an ad campaign user rules based match instance for the given user, is selected for evaluation. In step 1510, mutual matches (if any) are identified for the selected ad campaign user-related rules-based match instance and the selected ad campaign user rules based match instance. In step 1512, an indication of a matching ad campaign user-related rules-based match instance (if any) identified in step 1510 is added to a user-rules related mutual matching instance (e.g., a table) corresponding to the currently selected ad campaign user rules based match instance.

For example, assume that in producing the user-ad campaign related mutual matching instance 1502 of FIG. 15A, the process of FIG. 15B, evaluates mutual matching of the ad campaign user-related rules-based match instance 1302 of FIG. 13A relative to the ad campaign user rules based match instance 1402 of FIG. 14A. More specifically, step 1510 identifies mutual matches (if any) between a selected ad campaign user rules based match instance and individual ad campaign user rules based match instances. Referring to FIG. 13A, user-related rules-based match instance 1302 indicates that ad campaigns (c, d, f, g, x, y, z) are matched to a user profile identified as #007. Referring to FIG. 14A, ad campaign user rules based match instance 1402 indicates that ad campaigns (a, b, e, h, i, k, l, x, y, z) are matched to a user profile identified as #007. Step 1510 determines that the mutual matching between instance 1302 and instance 1402 comprises ad campaigns (x, y, z). Hence, step 1512 adds indicators of these mutual matching ad campaigns to the user-ad campaign related mutual matching instance 1502 of FIG. 15A.

FIG. 16A is an illustrative drawing of a user-ad campaign match instance 1602 produced as an output of the third sub-system 906 of FIG. 9. The example instance 1602 indicates an ad campaign to be associated with a user (or a user profile representative of the user) in accordance with an embodiment of the invention. FIG. 16B is an illustrative flow diagram of a process 1604 involving resolution of content-ad related mutual matching instances such as instance 1202 of FIG. 12A, produced in accordance with the process of FIG. 12B, in relation to user-ad campaign related mutual matching instance such as instance 1502 of FIG. 15A, produced in accordance with the process of FIG. 15B. The process of FIG. 16B further involves matching users to ad campaigns based upon content subscribed to or obtained by the user.

Referring to FIG. 16B, in step 1605, a user is selected. The selected user is a user for whom ad updates are to be determined. The selected user corresponds to a user profile. In step 1606, a user-ad campaign related mutual matching instance is identified that corresponds to the user selected in step 1605 and that was produced by the process of FIG. 12B. In step 1608, content-ad campaign related mutual matching instances produced by the process of FIG. 15B are identified, that identify ad campaigns that match ad campaigns of the instance identified in step 1606. In step 1610, content is identified that has been obtained by or subscribed to by the selected user. In step 1612, ad campaigns are identified in one or more instances identified in step 1608, that are matched in those identified instances, to content identified in step 1610. In step 1614, a user-ad campaign mutual matching instance is created that identifies the user selected in step 1605 and that identifies the ad campaigns identified in step 1612.

For example, assume that a user with user profile #007 is selected in step 1605. Further assume that, in step 1606, the user-ad campaign related mutual matching instance 1502 of FIG. 15A is selected, since that instance corresponds to user profile #007. In step 1608, a determination of which (if any) content-ad related mutual matching instances identify ad campaigns that match ad campaigns of the instance 1502 selected in step 1606. Referring to FIG. 12A, three content-ad related mutual matching instances 1202, 1204, 1206 are shown that identify ad campaigns identified by the selected instance 1502. Specifically, the instance 1502 relates user profile #007 to ad campaigns (x, y, z). Instance 1202 relates ad campaign (x) to content (4, 15). Instance 1204 relates ad campaign (y) to content (3, 4). Instance 1206 relates ad campaign (z) to content (3). In step 1610, specific user content that has been obtained or subscribed to by the selected user with corresponding user profile #007. The identification step 1610 may involve a user device communicating the identity of such content over network 116 to a server (not shown) involved with the implementation of match system 624. In this example, assume that user with user profile #007 has obtained or subscribed to content (2, 4, 8, 15). In step 1612, ad campaigns are identified that are matched, by one or more instances identified in step 1608, to the content identified in step 1610. In this example, instance 1202 matches identified content (4, 15) to ad campaign (x), and instance 1204 matches identified content (4) to ad campaign (y). There is no match to ad campaign (z) since instance 1206 does not match ad campaign (z) to any of the content identified by instance 1206. Thus, in step 1614, the user-ad campaign mutual match instance 1602 is created, which identifies the selected user with corresponding user profile #007 and the identified ad campaigns (x, y). Therefore, ads from ad campaigns (x, y) are thereby identified for delivery by ad source 622 to the user with user profile #007, or more alternatively in some embodiments, to a device 406 associated with user profile #007.

In some embodiments of the invention, association of ads with content is conditioned upon agreement between an ad campaign provider and a content provider as to payment. For instance one of a content provider's ad campaign related matching rules may specify that an ad campaign provider must agree to pay a predetermined amount prescribed by the content provider in order for that ad campaign provider's advertisements to be associated with the content provider's content, and that the ad provider must agree to pay that amount before an ad is delivered to a user for association with the content provider's content. Alternatively in the event that multiple are determined to be eligible for delivery to a user, ad campaign providers may compete through a bidding process, for the opportunity to have their ads delivered to a user (i.e., a user having a particular user profile).

In some embodiments, before an ad is delivered to a user, the content provider may be contacted to ascertain whether the content provider accedes to the delivery of the ad for combination with that content provider's content.

Moreover, in some embodiments, an ad campaign provider may specify (through ad delivery metadata) ad rotation rules. These ad distribution rules may depend upon content and/or the user profiles, for example. In other words, a variety of ads from one or more ad campaign providers may be delivered to a user in concert with ad rotation rules that determine the order or rules by which ads are to be associated with content. The ad rotation rules may specify characteristics such as ad sequencing, ad lifetime and ad placement within content, for example.

FIGS. 17A-17E are illustrative drawings of a content provider graphical user interface (GUI) used by content provider devices 312 to interact over a network 116 with a web based publisher application operative on the registration server 302 as shown in FIG. 3 in accordance with some embodiments of the invention. The publisher application provides publishing tools, registration and content reporting, for example. The content provider GUI comprises a web page that is accessed via a browser on a content provider's device 312 and that is used for content provider registration.

Figure 17A:
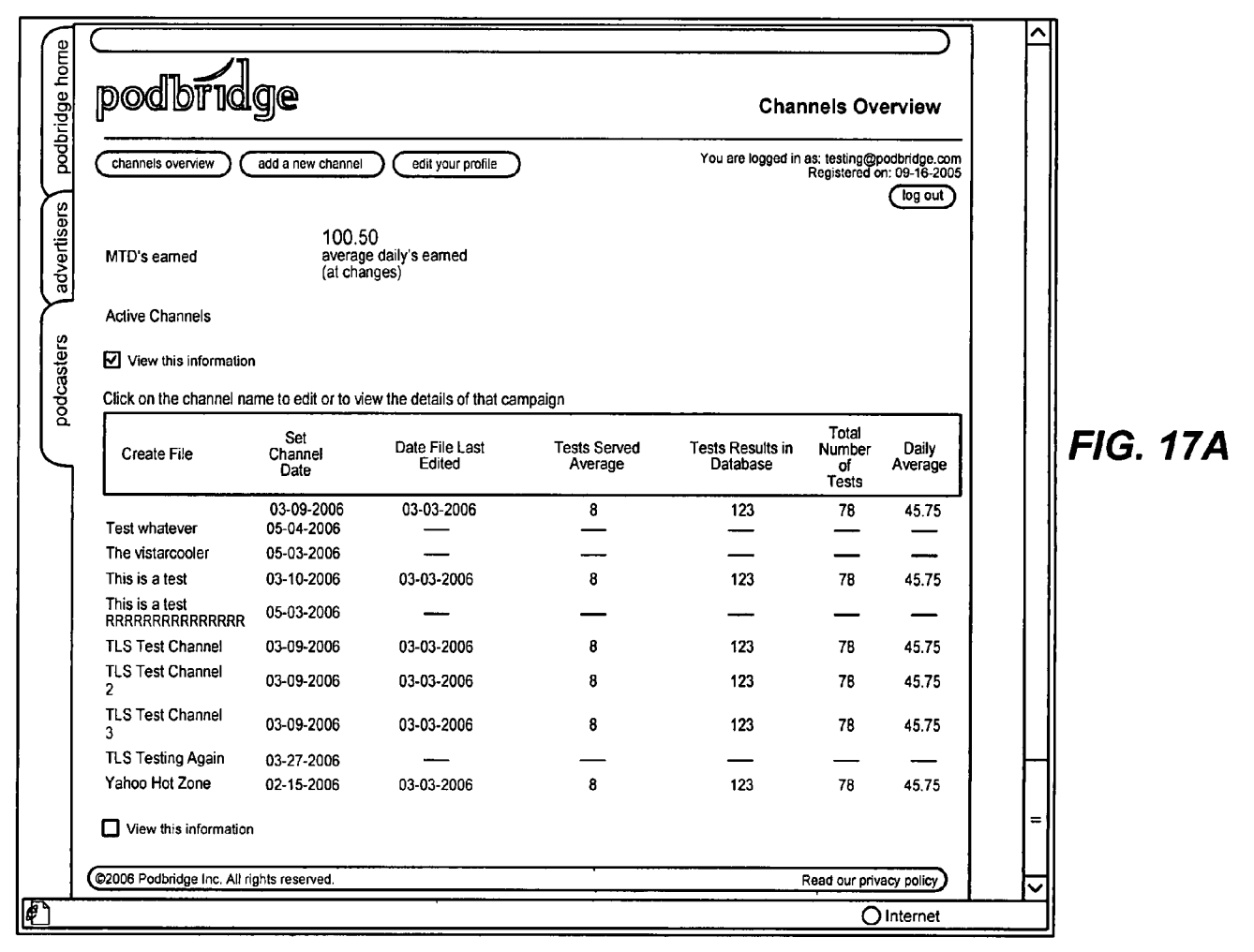
Figure 17B:
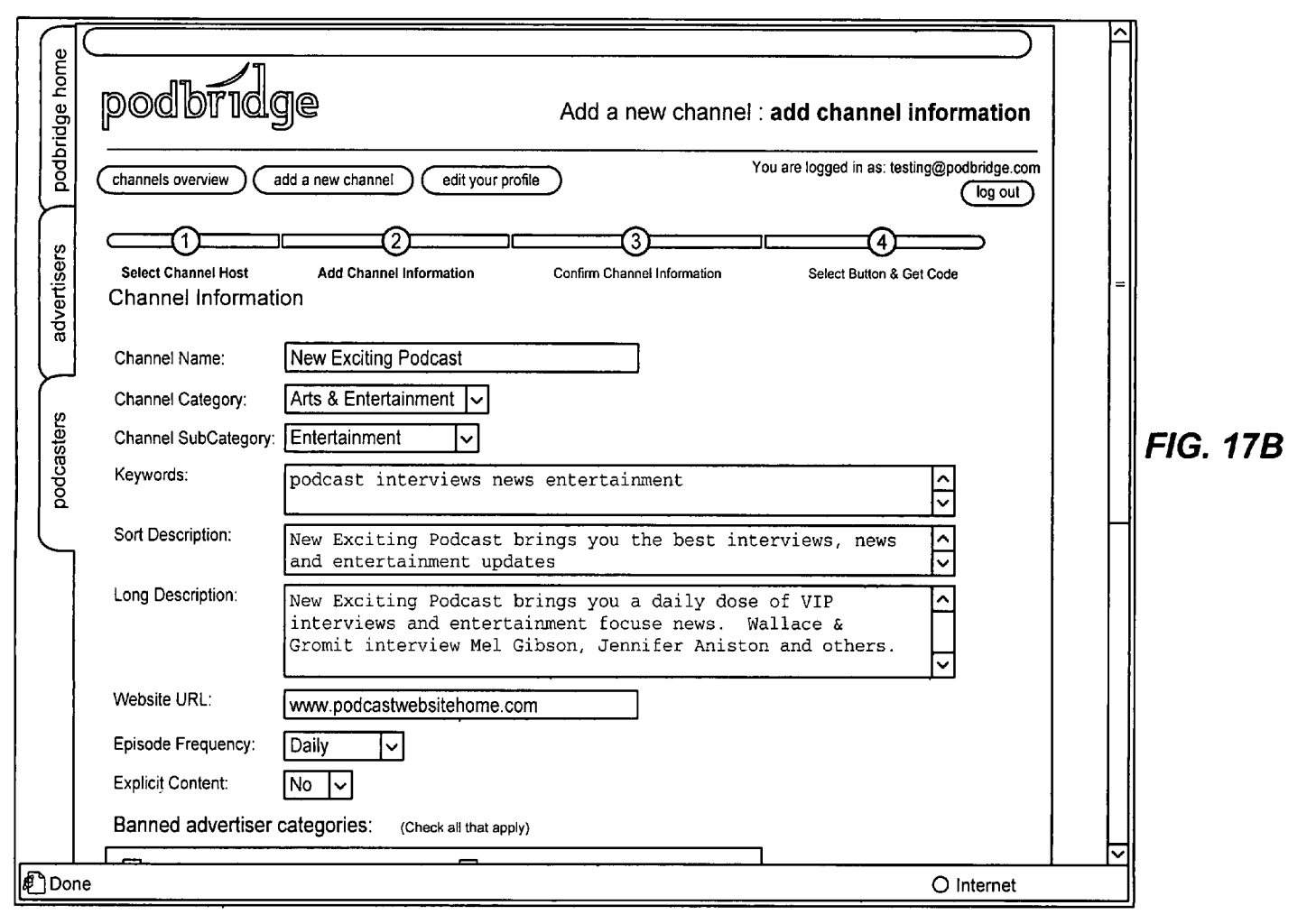

FIGS. 17B-17C are illustrative drawings of top and bottom portions of a scrollable "Add new channel" content provider GUI screen displayed during the adding of a new content channel (or feed) to the collection of channels to be subject to a matching process. The "Add new channel" screen includes data entry fields for entry of content provider control information such as rules and attributes concerning a channel to be added. The example "Add new channel" screen includes data fields, which in this example illustration, solicit content provider information concerning the channel.

In this example, the content provider has placed in the Channel Name field the name attribute: 'New Exciting Podcast'. The content provider has placed in the Channel Category field the channel category attribute: 'Arts & Entertainment'. The content provider has placed in the Channel SubCategory field the subcategory attribute: 'Entertainment'. The content provider has placed in the Keywords field the keywords: podcast, interviews, news, entertainment. The content provider has placed in the Short Description field a brief description of the content of the podcast. The Long Description field sets forth a longer and more detailed description of the content of the podcast. The Website URL field typically sets forth a content provider home page. (Once a feed has been added to iTunes or to any other RSS manager, there a link is provided on the manager's UI to a content provider web site. This URL serves as such a link. For devices compliant with the RSS standard, this URL is stored in a feed's RSS XML.) The Episode Frequency field sets forth a content frequency attribute of the podcast, i.e., the frequency with which episodes of the podcast are available, which is daily. The Explicit Content field indicates that an explicit/not explicit content attribute of the content for this podcast, which in this case is 'false', i.e., not explicit. The Banned Advertiser Categories solicits content provider input to rules to filter banned ad categories. In this example, content provider has indicated the banned advertising categories by checking off boxes in a predetermined list of categories. Thus, for example, one content provider ad campaign-related rule is that ad campaigns falling within checked categories ('Beer, Wine & Liquor' and 'Gas & Oil' and 'Cigarettes & Tobacco' in this example) may not be matched with this new channel named 'New Exciting Podcast'.

Thus, content provider rules may be quite simple such as the filtering rules represented by the "Banned advertiser categories' of FIG. 17C in which all ad categories are eligible for matching with the channel except ad categories specifically identified by the content provider.

However, alternative types of content rules are possible consistent with the invention. For instance, a content provider rule may instead provide that no ad may be matched with the channel unless the content provider specifically identifies it. Also, alternatively, somewhat more sophisticated content provider rules may applied involve a content provider's combining categories such as the above in logic statements using AND and NOT Boolean connectors. An example of an even more sophisticated approach to content matching rules development involves a content provider's building complex queries such as SQL expressions, for example. Therefore, content provider rules are not intended to be limited to the simple filtering rules set forth in FIG. 17C.

Figure 17D:
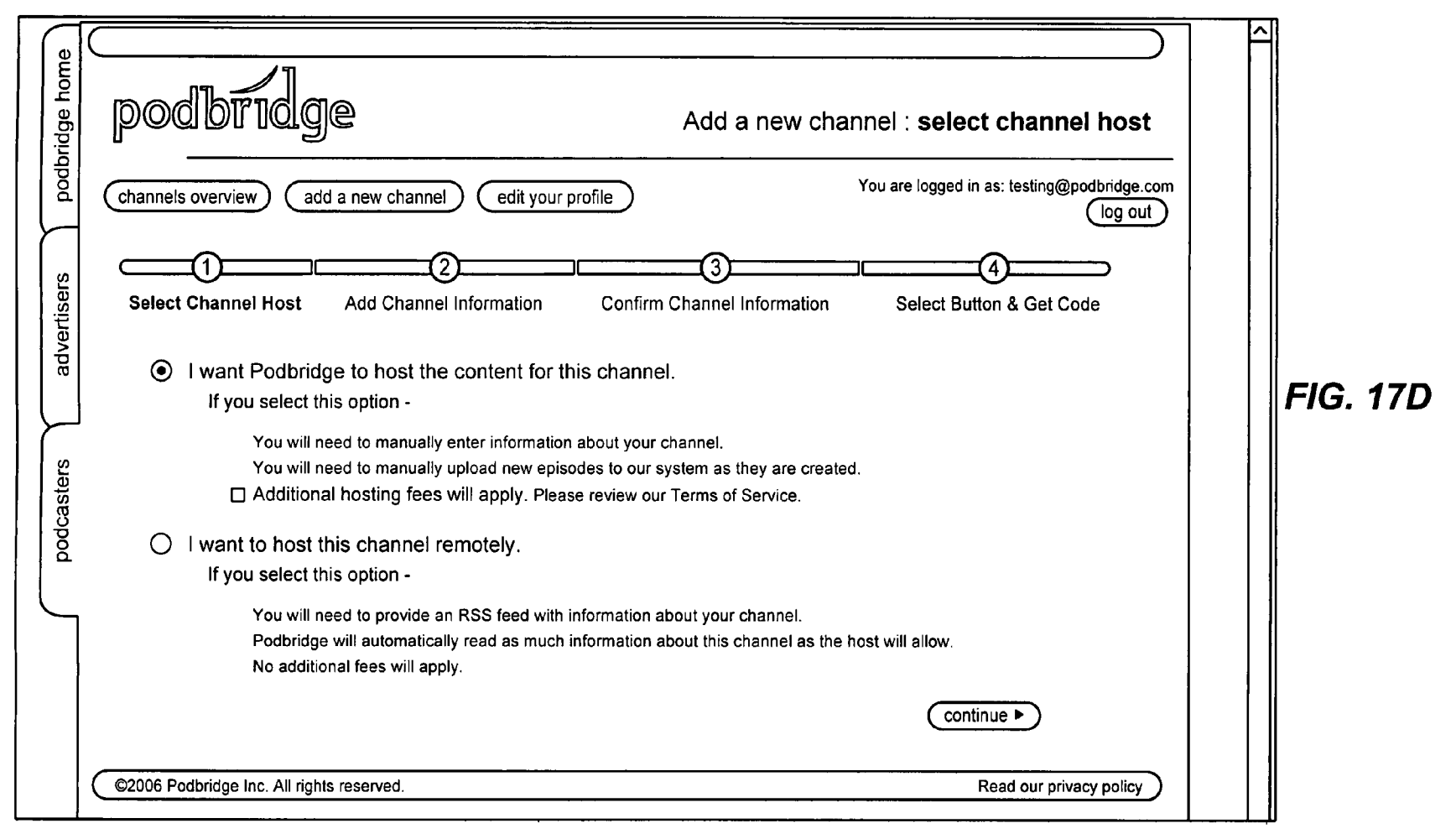

FIG. 17D is an illustrative drawing of a "select channel host" content provider GUI screen displayed during the selection of the entity which is to host the new channel (or feed). A content provider has the option of being responsible for hosting the podcast channel. In other words, for example, the content provider can elect to provide a server that delivers podcast updates to users. Alternatively, the content provider can designate separate content provider (e.g. the intermediary such as Podbidge) to provide a server that podcasts content updates to users.

Figure 17E:
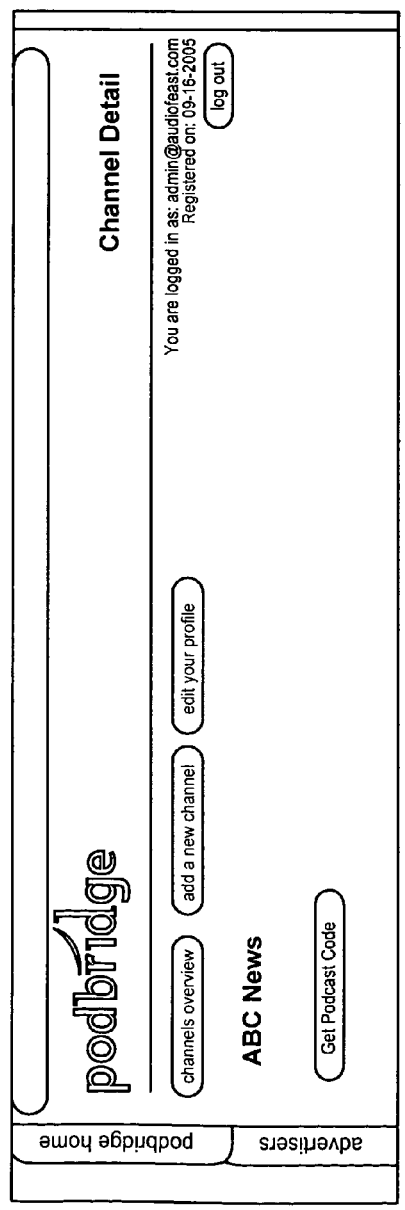

FIG. 17E is an illustrative drawing of a "Channel Detail" content provider GUI screen displayed during a content provider's copying of a "Get Podcast" button to its web page and also showing Java script associated with the "Get Podcast" button. As part of the registration process, the content provider obtains a "Get Podcast" button, which it incorporates into its web page to facilitate users' subscribing to receive the content provider's content combined with ads. The "Get Podcast" button provides an easy way for users to subscribe. When a user visits the content provider's web page, the user can actuate the "Get podcast" button on the page to subscribe to a podcast offered by the content provider. The Java script controls the process of user subscription to the podcast.

In some embodiments, a content provider can exercise ad approval authority. An ad approval mechanism, such as a UI screen, allows a content provider to be alerted of ads proposed for running on the content provider's channel and to review such ads prior to their running on a content provider's channel. For instance, if a content provider has enabled an approval mechanism, the ad approval process runs as follows. When an advertiser makes a proposal to run an ad campaign on a content provider's channel, a backend cron job sends a communication, such as an e-mail, alerting the content provider of the proposed new ad campaign. The communication may include a direct link to the page where a representative of the content provider can review the proposed ad campaign. Upon clicking the link content provider representative can observe information such as the following: advertiser company name; campaign specific information (e.g., name, description, RSS text, time period for the campaign to run/ listener limits; maximum credits (explained below) that can be earned by the campaign (campaigns can be cancelled or they may finish prior to running out of credits). In addition, for each media file in the campaign the content provider can observe the proposed ads and can find out the proposed placement of ads within the provider's content feed. The content provider can choose to approve the ad campaign by approving the entire campaign or specific media files.

FIGS. 18A-18D are illustrative drawings of a ad campaign provider graphical user interface (GUI) used by ad campaign provider devices 314 to interact over a network 116 with a campaign manager operative on the registration server 302 as shown in FIG. 3 in accordance with some embodiments of the invention. The campaign manger provides for registration of new ad campaign providers, ad campaign publishing management tools and ad usage reporting. The ad campaign provider GUI comprises a web page that is accessed via a browser on an ad campaign provider's device 314 and that solicits ad campaign provider information for monitoring ad campaign results, for example.

FIG. 18A is an illustrative drawing of a portion of a scrollable "Campaign Detail" advertisement campaign GUI screen. As with the content provider GUI, in this example, a third party intermediary controls the provider registration server 302 and makes available a browser based GUI application used by ad campaign providers to set up and track the performance of their ad campaigns. Once an ad campaign has been set up (i.e. registered), ads in the campaign become eligible for combination with registered content. As can be seen from FIG. 18A, the "campaign overview" screen provides a summary of the status of the overall ad campaign including month-to-date listens, average daily listens, month-to-date spend, average daily spend. In this example, it is assumed that this screen was presented originally with empty fields to solicit corresponding ad campaign provider information. The "campaign overview" screen also provides a list of campaign names and corresponding start date, end date, total budget, daily budget and total served. Moreover, buttons labeled "add a new campaign" and "Edit your profile", each navigate the ad campaign provider to screens that solicits different ad campaign provider information.

FIG. 18B is an illustrative drawing of a portion of a scrollable "Campaign Details" for "telecom ad campaign" ad campaign GUI screen that is accessed by actuating the "Telecom Ad Campaign" entry in the screen of FIG. 18A. This screen solicits an ad campaign provider to undertake any one or more of several actions. By checking the appropriate box on the screen, the ad campaign provider can view targets of the campaign, view market categories encompassed by the campaign, view advertisements in the campaign, upload more ads to the campaign, and view podcasts in the campaign.

Figures 2, 18C:

FIG. 18C is an illustrative drawing representing a portion of a scrollable "Campaign Details" ad campaign GUI screen that is generated by checking the "Targets", "Categories" and "Advertisements in this Campaign" check boxes on screen of FIG. 18B. FIG. 18D is an illustrative drawing of a portion of a type of campaign GUI screen generated by selecting the "Upload Ads/Files check box on a screen like that of FIG. 18B. In this example, an ad campaign provider has populated the fields in the screen of FIG. 18D with information concerning a new ad campaign.

Figure 19A:

FIGS. 19A-19C are illustrative drawings representing successive portions of a scrollable "Add a New Campaign" ad campaign GUI screen that is generated by actuating the "add a new campaign" button on the "Campaign Overview" screen of FIG. 18A or on the "Campaign Detail" screen of FIG. 18B. These screens are used to solicit ad campaign provider information concerning a new ad campaign. FIG. 19A shows that an ad campaign provider has entered information into "Campaign Information and "Target" fields. FIG. 19B shows that an advertiser has selected categories to which the ad campaign applies. The "Markets for your product or service" Target guides the ad campaign provider in specifying an ad campaign provider content-related rule that relates to "markets". The "Age groups" Target guides the ad campaign provider in specifying an ad campaign provider user profile-related rule that relates to "age". The "Gender", "Children in Household" Targets guide the ad campaign provider in specifying ad campaign provider user profile-related rule that relates to whether the ad is directed to a particular "gender" and whether it is appropriate for use with "children in the household." The "Categories" field guides the ad campaign provider in specifying ad campaign provider content-related rules that relate to the category of product or service to which an ad campaign is directed. Note that alternatively, the "Markets for your product or service", "Age groups", "Gender", "Children in Household" Targets and the "Categories" may be viewed as an ad campaign attributes that content providers may use in conjunction with content provider ad campaign-related rules to determine whether an ad is suitable for combination with the content provider's content. In other words, the targets and categories of FIGS. 19A-19B may serve as ad campaign rules from the perspective on an ad campaign provider and may serve as ad campaign attributes from a content provider's perspective. FIG. 19C shows that an ad campaign provider is uploading a new ad for the new ad campaign.

Moreover in some embodiments, an ad campaign provider can search and add particular categories of content to a campaign based upon keywords, for example. For instance, assume an ad provider wants to advertise a windshield product. The ad provider may want to advertise the windshield product on a fixed list of automotive channels. Thus, for example, an ad campaign provider GUI (not shown) may permit an ad campaign provider to define ad hoc categories based upon keywords, content type (e.g., news show, financial reporting, adult) or source of the podcast provider (e.g. company A, company B, website C, Mr. D). For instance, in one GUI embodiment not shown), an ad campaign provider can type "automotive" or "car" into a search box and get a list of content feeds that have the "automotive" keyword in its metadata. An ad campaign provider can explicitly choose the specific content feeds to advertise on.

It will be appreciated that using the user interface screens described above, an ad campaign provider may produce content related ad campaign provider rules and user related ad campaign provider rules. Appendix B, which is expressly incorporated herein in its entirety by this reference, comprises examples of ad campaign provider filtering rules that may be presented using SQL for instance.

In some embodiments, once an ad campaign has been submitted, it will show up in the relevant content providers' campaign queues, awaiting matching and/or approval, if applicable. In some cases content providers will allow for automatic approval subject to filtering rules such as, exclude tobacco ads, etc. The subscriber system also may send an alert to the content providers regarding the new campaign. Once a campaign has been submitted, changing the campaign by adding new ad media files causes those files to go through the approval process again. Changing meta-information (e.g., ad media file mp3 (audio), m4v (video), etc.) also causes the campaign to go through the approval process again. An ad provider may cancel an ad campaign after it has been submitted and approved.

Figure 20A:
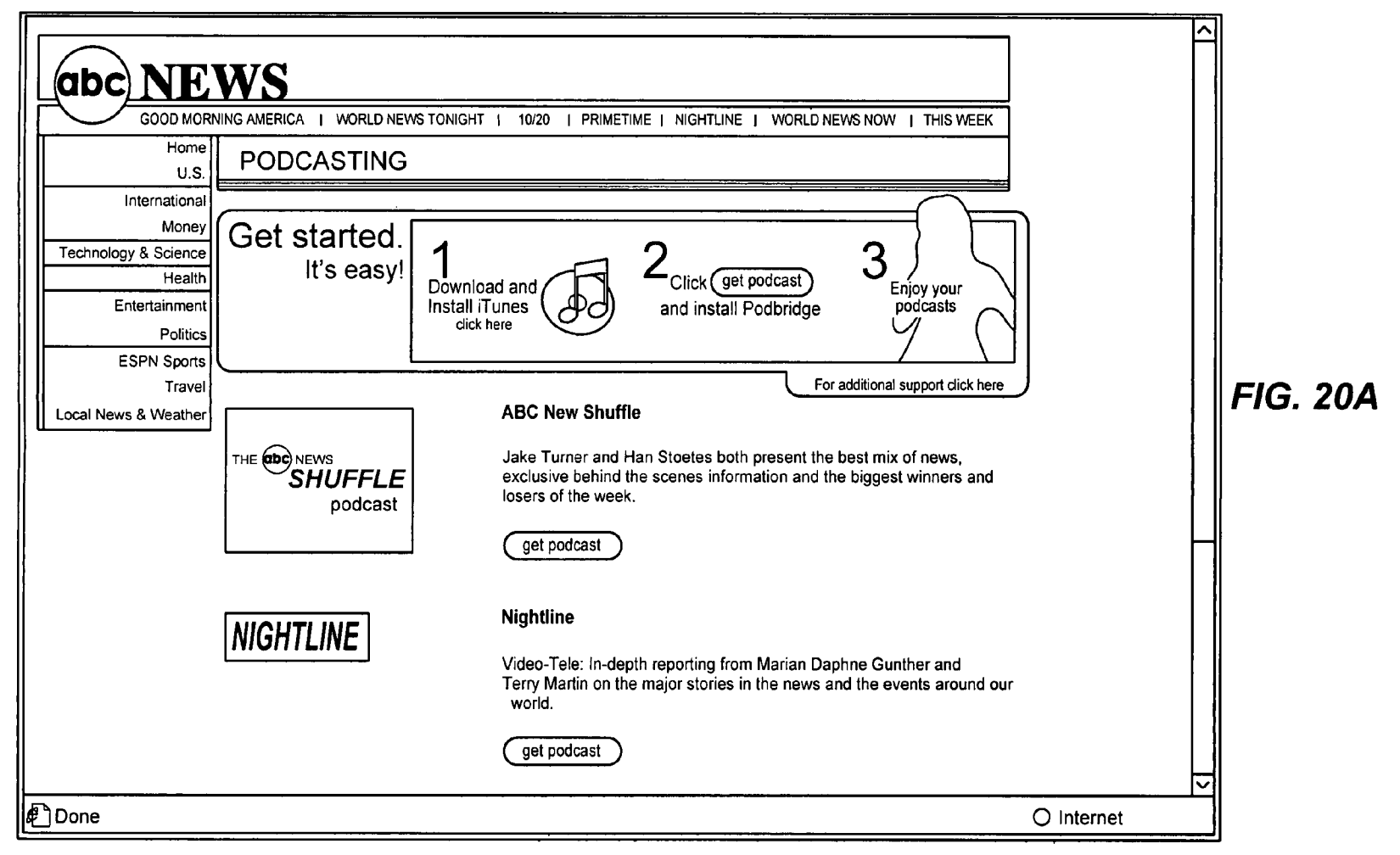

FIGS. 20A-20B are illustrative drawings of a content provider graphical user interface (GUI) used by user devices 406 to interact over a network 116 with a registration profile gathering server 402 as shown in FIG. 4. More particularly, FIGS. 20A-20B are illustrative drawings of a content provider web page including a "Get Podcast" button and an intermediary's (such as Podbridge's) user registration web page that is delivered to a user device in response to a user's actuating the "Get Podcast" button on the content provider web page in accordance with some embodiments of the invention. FIG. 20A shows that the content provider web page may include various information and also a "Get Podcast" button, which may have been added using the process described above with reference to FIG. 17E, for example. Upon a user's actuating the "Get Podcast" button on the web site of a content provider or on the web site of the intermediary, the user's browser is redirected to a web page of the intermediary site that provides the registration information request shown in FIG. 20B. In this example, the requested registration information is best characterized as user attribute information. However registration information also may involve requests for user acceptability rues that indicate the kinds of information that the user does and does not want to receive. User acceptability rules can be used to screen-out particular ads or types of ads. It will be appreciated that although only one user registration screen is shown, there may be more than one.

For instance, additional screens (not shown) may be provided that seek detailed information concerning user preferences. For example, additional screens may request that a user specify active preferences, which serve as user acceptability rules for the delivery of information such as, "I am interested in Electronics" "I am not interested in Feminine Hygiene products" or do/do not want to receive certain types of ads, such as ads for tobacco, alcohol, automotive, etc. This additional information can be useful in matching ads to users. However, requests for this additional information generally ought to be balanced with the possibility that a user will not have the time, motivation or the patience to provide detailed preference information.

User attribute information is stored in user attribute storage repository 404b shown in FIG. 4. User rules information is stored in user rules storage repository 404a shown in FIG. 4. Thus, user profile information gathered from users may be used by the ad selection process to determine which ads to deliver to which user devices.

Usage Reporting

Figure 21:
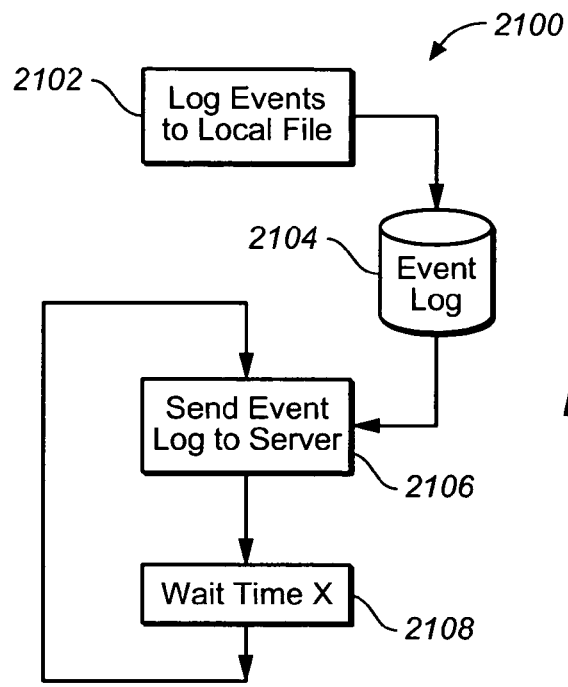
FIG. 21 is an illustrative flow diagram of a process by which the usage reporting module of FIG. 7 reports usage events in accordance with an embodiment of the invention.

FIG. 21 is an illustrative flow diagram of a process 2100 by which the usage reporting module 709 of FIG. 7 reports usage events in accordance with an embodiment of the invention. In step 2102, events are logged (i.e., stored) in an event log 2104 (i.e, in a data structure in memory) associated with the user device 406. Steps 2106-2108, periodically send an event log over the network 116 to user information server 403, as shown in FIG. 4. Step 2108 sets a time interval in which to send the event log. Step 2106 represents sending of the event log after passage of a time interval prescribed in step 2108. It will be appreciated, of course, that availability of a network connection between the user device 406 and a server 403 influences the actual timing of when the user device 406 sends the updated event log to a backend server. For instance, the user device 406 may be able to establish a connection with such backend server for event log delivery only during limited time frames such as when the ad source server of FIG. 6 sends an ad update or when a user device 406 requests a content updates as described with reference to FIG. 5. Moreover, in some embodiments, the user device 406 does not connect to the server 403 when the event log is empty.

The following Reportable Events Table sets forth a list of examples of reportable events in accordance with some embodiments of the invention.

REPORTABLE EVENTS TABLE 1. add feed - an event recorded each time a feed is added.
    format: af,<event time>,<feed url>
2. play count - the current play count of podbridge content that was played on iTunes, The play count is calculated internally by the agent.
    format: pc,<event time>,<file guid>,<play count>
3. ad play count - same as the content play count, but for the stitched ads.
    format: ac,<event time>,<ad guid>,<play count>
4. iPod play count - the play count for content played on the iPod, this is a derived value from the internal play count and the iTunes reported play count.
    format: pd,<event time>,<file guid>,<play count>
5. iPod ad play count - the play count for ads played on the iPod, this is a derived value from the internal play count and the iTunes reported play count.
    format: ad,<event time>,<ad guid>,<play count>
6. play event - when iTunes starts playing podbridge content the start time and position are stored, when the song play stops, the play duration and play starting position are calculated to exclude the inserted ads.
    format: pl,<event time>,<file guid>,<start position>,<play time>
7. ad play event - the ad play starting point (reletive to the ad as a single entity) and the play duration are reported.
    format: at,<event time>,<ad guid>,<start position>,<play time>
8. download complete - this event notifies about a successfully completed download of an item.
    format: cc,<event time>,<file guid>,<feed url>,download time, download size in bytes
9. download failed - this event notifies about a failed download of an item.
    format: <event time>,<file guid>,<feed url>,download time, download size in bytes For example, typically, play event information can be aggregated by both iTunes service and iPod player. An iPod player sends its play logs to the iTunes service each time it connected to a PC, iTunes aggregates iPod player play logs and its own iTunes service play logs and make it available to query using the iTunes service APIs.

In some embodiments, such usage logs sent to the tracking server include a GUID of the content or ad played, start position, end position and timestamp. The usage reports provide information that may be used to calculate content feed and ad consumption by individual user devices. The usage reports also serve as a source of information for input to the user profile. The usage information is indicative of user preferences, which may constitute user attributes. Usage information may constitute one or more user attributes used to estimate the probability that a user will actually access podcasts to which he or she has subscribed and the probability that a user will actually respond to a "call to action" placed in an ad. Usage information may be one of the user attributes accessed by the match system server 624 of FIG. 6, in the course of resolving ad provider criteria, content provider criteria and user criteria to determine which ads to deliver to which user devices.

More specifically, in some embodiments, all the usage reports go first to usage information gathering 403 shown in FIG. 4 and are stored in an operational database (DB). Once every X time the usage reports are uploaded from the operational DB to a Data Warehouse (not shown), which holds and breaks the information to have it ready for report generation. The reporting tools run on the data stored within the Data Warehouse.

Usage may be reported to ad providers and/or content providers, for example, to determine payment amounts owed by an ad provider in return for having ads performed on user devices while stitched together with content provider content. The usage information also may contribute to statistics as to user habits and as to content and ad usage. Such server, which is not shown in the drawings, runs cron jobs to generate reports and/or send them via e-mail. Web applications such as a Publisher and the Campaign Manager also have access to the Data Warehouse server to retrieve reporting information to be presented in charts, for example.

The following Agent Generated Player Event Log sets forth a format of an example list of events in accordance with some embodiments of the invention.

Agent Generated Player Event Log

16/02/2006 16:58:56,–8,1DECB48B-461A-4F26-8EFB-033CA7B54821
pl,16/02/2006
17:09:55,E0102C7C-1CAD-46A1-84D3-9318C95230FC.mp3,18,3
pl,16/02/2006
17:10:05,0B227E79-EBEA-4212-9FC9-A2A56F02BACD.mp3,0,6
pl,16/02/2006
17:10:21,0B227E79-EBEA-4212-9FC9-A2A56F02BACD.mp3,12,10
pl,16/02/2006
17:10:25,CC2A4D12-0A70-3211-8E66-CF2AA1B05ECA.mp3,0,4
pl,16/02/2006
17:10:33,CC2A4D12-0A70-3211-8E66-CF2AA1B05ECA.mp3,3354,4
pc,16/02/2006
17:10:36,E0102C7C-1CAD-46A1-84D3-9318C95230FC.mp3,1
pl,16/02/2006
17:11:00,CC2A4D12-0A70-3211-8E66-CF2AA1B05ECA.mp3,3426,27
pl,16/02/2006
17:11:16,D6315892-B5E8-483D-9DF8-65325FBD3201.mp3,0,16
pc,16/02/2006
17:11:36,D6315892-B5E8-483D-9DF8-65325FBD3201.mp3,1

Ad Distribution Rules

In some embodiments, ads in the campaign may be associated with distribution criteria such as an appearance percentage value specified by the ad provider that represents the ad's appearance ratio within the campaign or such as the frequency with which an ad is to be displayed to a user. These criteria are reconciled prior to delivery of ads to client devices. For instance, the match system 624 may be used to determine which ads are eligible for distribution to a user, while the ad distribution criteria are used to determine which ads to actually distribute. The ad distribution criteria can be used to regulate the actual number and mix of ads delivered to a one or more user devices, for example.

For instance a campaign could have three advertisements (i.e., ad content files) with the example appearance ratios shown in the following Appearance Ratio Table.

Appearance Ratio Table

| Ad Name | Appearance Ratio |
|---|---|
| Ad1 | 40% |
| Ad2 | 35% |
| Ad3 | 25% |

In this example, for each 100 ads delivered to user devices for the campaign, 40 will be Ad1, 35 will be Ad2 and 25 will be Ad3. As explained below, for yield management more complex algorithms may be used by an ad campaign provider to decide which ad goes out to which user for insertion into which content feed.

Generally speaking ad distribution criteria (i.e., determining which ads go to what user device and how often) may consider user attributes from storage repository 404b, as factors such as, (1) user behavior and usage, (2) user preferences and inclinations (e.g., target ads based upon user profiles), (3) consumption predictions (e.g., for 1000 bought ads, how many impressions do we need to download to the users 1000× consumption factor?) Thus, in general, different users might receive different ones or combinations of Ad1, Ad2 and Ad3. Although for a big ad campaign, for instance, a user may get all the three ads.

Ad Insertion

Ads delivered to a client device are associated with metadata that determines where the ads are to be inserted relative to the content. In a present embodiment, a client-side agent retrieves this ad insertion meta-data from the ad source server 622 shown in FIG. 6. This ad insertion information includes instructions concerning insertion of the ads to content. For example, in one embodiment, the ad insertion information includes instructions as to the content feed to which an ad is to be inserted and as to the position in the feed at which the ad is to be inserted. The insertion information can be provided as a list of ad names and associated content feed names and content feed positions for each ad.

The content metadata in an RSS expression presents the possible ad slots. In other words, content metadata that accompanies content delivered to a user device indicates the locations in that content where ads may be inserted. An agent running on a user device may include slot information from the content's RSS as part of an ad request to an ad server. The ad server, in turn, may use the slot information to calculate what ads should be inserted in what locations and then to respond with ad insertion instructions using the same ad slot insertion XML format as was used for the content RSS, for example. In most cases, the ad server will likely use the ad slot XML from the RSS provided by the agent with the ad query. However, this functionality also allows for overwriting of ad slot information presented in the RSS XML. For instance there may be an urgent message that needs to go at the beginning of a content presentation, but the RSS XML may provide no ad slot at the beginning of the content, at location 0 (beginning). In that case, the ad server may respond with ad metadata indicating that the message should be inserted into the beginning of the content despite the failure of the RSS XML to indicate an ad slot at that location. The ability to insert content at a location other than locations identified as ad slots is useful for insertion of sponsorship messages, for example.

It will be appreciated that content and ads have separate life cycles, although sometimes there are some dependencies between them. For instance, one can consider the content and ad cycles as two separate threads with some dependencies. A user device ordinarily requests content first. The agent tries to splice ads to the content. The agent first may try to use ads cached in the user device's local storage. If the ads to be spliced have not been retrieved from the network (i.e. from the ad server) or have expired, then the agent must request the ads from the network before they can be spliced.

For instance, ads may be delivered based upon content, such as a daily talk show. Moreover, for example, the same ads may be spliced into successive episodes of the talk show. Therefore, at least until the cached ads expire or a new episode arrives with metadata indicating a need to insert different ads, the agent can continue to obtain the ads from the cache without the need to go back to the network. If the metadata of a subsequent content episode (e.g. talk show episode) indicates a need for different ads, then the agent must retrieve those new ads before they can be inserted into the content.

Moreover, the agent can update the ads in the cache and add new ads asynchronously, i.e. independently, from content requests. The agent aware of the type of feeds consumed by the user, the agent can bring ads into the cache independently. The agent asks the ad server for the ads to splice/stitch for a particular content/episode, due to the fact that the agent independently obtain new ads for the user's content selection, generally ads are pre-cached on the PC, however if the desired ad is not presented on the PC the agent can obtain it from a specified (by the ad server) ad content server.

Figure 22:
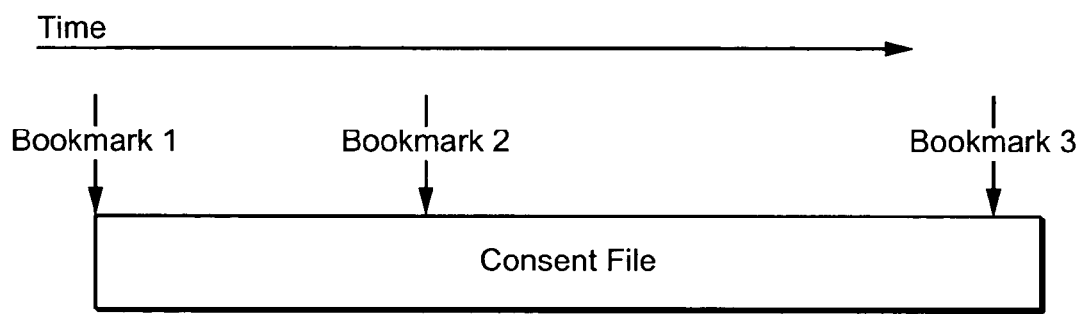
FIG. 22 is an illustrative drawing representing a content file with associated cue sheet providing book marks that indicate locations in the content file where ads are to be inserted in accordance with some embodiments of the invention.

FIG. 22 is an illustrative drawing representing a content file with associated cue sheet providing book marks for ad insertion in accordance with some embodiments of the invention. The book marks provide indications of locations in the content file where ads are to be inserted. Content files provided to the content publisher system 312 include such cue sheet information. The content files may be provided, for example, by content sources 310-1 to 310-n. In addition to ad insertion location, the cue sheet may provide information such as fade-out. As explained above, the ad insertion information is used by the ad server to decide which ad goes to which slot. The ad server sends the results back to an agent on the user device as a in response to the agent's ad request.

Basically, in some embodiments, ad insertion process proceeds as follows.
1) A content provider provide ad slot cue sheet information to the RSS XML of a feed' s RSS.
2) An agent sends the cue sheet XML obtained from the RSS to the ad server as part of the ad request.
3) The ad server responds with the final cue sheet back to the agent, which the agent uses a guide to insert ads into content slot locations.

FIG. 23 is an illustrative drawing of an example of XML code that encodes an RSS feed representing two content files and their associated cue sheet information. In podcasting, RSS meta data usually is associated with each podcast content channel. Typically, RSS meta data specifies information such as, title, author, and location of content. Ordinarily, podcasting involves delivery of a digital media content files to a consumer's storage. In some an embodiment of the present invention, ad files are completely separate from content files until they reach a consumer's storage where they are assembled. Moreover, in accordance with an aspect of the invention, RSS meta data are extended to indicate: (1) where an Ad goes in the content—time codes, and (2) what style of ads are acceptable to be inserted at those slots—style codes.

More specifically, in some embodiments, between <item> tags <podbridge:ad> tags are inserted. An ad <slot> item describes ad slot characteristics, which may include location where ad is to be inserted within content and style of the ad. As to location, in the first illustrated example in FIG. 23, one ad is permitted every 15 minutes, (at times 0, 15 minutes, 30 minutes and 45 minutes) and the ad may not exceed 15 seconds. In the second example in FIG. 23, two ads are permitted in the beginning (at time 0) (i.e. there are two slots associated with the same timecode) and two adds are permitted in 30 minutes after the beginning (absolute time). There is no time limit on ad length in this second example.

In order to obtain an ad list with associated ad insertion points for particular content, the agent/plug-in sends a query to the ad-server:

e.g., http://www.podbridge.com/QueryCampaign

The Query Campaign is a POST HTTP query, the POST data is the request parameters and the slot information (URI formatted).

For example, such a request may be formatted as follows:

---
uid=<Podbridge user identifier>&feed=<feed identifier (also the feed url)>&episode_guid=<episode guid>&version=1.0.0.30&slot[ ]=slot?fadeout=false&max= 25&timecode=0:1:15.6&slot[ ]=slot?fadeout= true&max=135&timecode=0:19:0.0&slot[ ]=slot?fadeout=false&timecode= 0:50:1.1 each line ends with the character "&"
---

The slot information is based on the actual slots in the Podbridge RSS extension. Also, parameters correspond to arguments in the original slot information.

The feed and episode_guid should be uuencoded to avoid characters that would break the schema.

In context of XML feed structure, note that the novel Podbridge RSS extension is part of the original feed RSS and a child element of the "item":

Ad Meta-Data Example

---
<rss ...>
...
<channel>
...
<item>
...
<podbridge:ads>
<slot fadeout="false" max="25" timecode="0:1:15.6"/> (see comment 1)
<slot fadeout="true" max="135" timecode="0:19:0.0"/> (see comment 2)
<slot fadeout="false" timecode="0:50:1.1"/> (see comments 3 and 4)
</podbridge:ads>
</item>
</channel>
</rss>
---

Comment 1: indicates that an ad could be inserted after one minute and 15 seconds and 6 tenths of the second from the beginning of the content. Fadeout effect is off.

Comment 2: indicates that an ad could be inserted after 19 minutes from the beginning of the content. Max length of the ad should not exceed 135 seconds. Fadeout effect will be applied in the transition from the content to the ad.

Comment 3: indicates that an ad could be inserted after 50 minutes and one and one tenth seconds after the beginning of the content and that fade effect is turned off.

Comment 4: note that fadeout implies that after the ad ends it will fade-in to the content. Thus, there is no explicit fadein argument; fadein is implied from fadeout; alternatively, a fadein argument may be provided to overwrite the default behavior of fadein=true when fadeout=true.

In response to a request from the agent on the user device for list of ads to be inserted, for instance, an ad server might provide an ad list containing the following information. As part of the ad server response to the agent the actual splicing slots for ads are presented together with rotation rules if any. It will be appreciated that this is cue sheet XML converted to the message protocol for the ad server.

---
Ad Insertion Instructions Returned from the Ad Server (Example)

<podbridge:ads>
<slot fadein="true" duration="0:0:25.5" url="http://www.ad-servers.org/melomania?ad=vid1.mp4" timecode="0:2:10.1"/>
<slot fadeout="true" duration="0:2:15.0" url="http://www.podbridge.com/ads/v_ad.mp4" timecode="0:6:0.0"/>
<slot fadeout="true" duration="0:0:35.5" url="http://www.ad-servers.org/melomania?ad=cocacola.mp4" timecode="1:12:1.9"/>
<rotation expires = "10/1/2006 9:0:0"/>
</podbridge:ads>
---

Comments on the Above Example of Ad Insertion Instructions Returned by the Ad Server:

Comment 5: each episode has a <podbridge:ads> clause.

Comment 6: url="http://www.ad-servers.org/melomania?ad=vid1.mp4", for example, indicates the location of the add to be inserted in the lot.

Comment 7: There are many different ad rotation rules. A few examples are as follows:

a) "expires" (expires="10/1/2006 9:0:0")—indicates the fix time when the agent needs to go and get new set of ads from the ad server (or from the local cache) for the particular episode.

b) "every" (every="24:0:0")—indicates that the agent should get new set of ads from the ad server (or from the local cache) after the specified period.

c) "random" (random="0:2:0")—indicates that the agent should rotate the ads for the cache randomly every specified period of time.

d) "round robin" (roundrobin="0:2:0")—indicates that the agent should rotate the ads from the cache randomly every specified period of time.

FIG. 24 is an illustrative chart showing a matrix of ad encoding possibilities for content media in a variety of different encoding formats. Ads are re-encoded prior to delivery to a user device 406, so as to match the encoding of the content to which they are to be inserted.

FIGS. 25A-25B are illustrative drawings of a content and ads before insertion (FIG. 25A) and after ad insertion (FIG. 25B). FIGS. 25C-25D are illustrative drawings showing fade details near the beginning of an inserted ad (FIG. 25C) and near the end of an inserted ad (FIG. 25D). For instance, location of an ad insert point may be determined by converting a time code offset encoded in XML associated with the ad, as illustrated in FIG. 23, for example, into a count of mp3 frames. The frame count is an absolute value and is the number of mp3 frames from the start of the stream at which the ad is inserted.

In some embodiments, ads are inserted on-the-fly (i.e., as content is received), and at each insertion point, the main stream fades out before an ad, and fades in after an ad. The position of ad insert points is reflected as the count of mp3 frames from the start of the stream. In the case of content encoded as mp3 frames, during the processing of the main content, the management agent counts the number of mp3 frames streamed until the stitch frame has been reached. From this point the fade-out effect is performed on a number of frames, until complete silence. The ad is streamed after the fade-out effect. After streaming the ad, before the continued stream of the main content begins, a fade-in effect is performed on a number of frames prior to the insert point.

The approximate offset in bytes in which to perform the fade-in effect and continue streaming the next main content segment can be calculated. For instance, the offset can be calculated as the approximate byte offset from the beginning of the main content stream as follows. Insert. Point offset=number of frames to Insert point * mp3 frame size. Subtract from that the size in bytes of the space required for the fade effect: Byte offset=Insert point offset−(number of frames in fade * mp3 frame size).

From the Byte offset the ad insertion agent finds the start of the next mp3 frame on the stream. The fade-in effect is performed on the mp3 frames from the previous segment of the main content. The next segment is streamed until the next insert point is reached. In this manner no content information is lost in the unedited parts of the main content. The controlled fade-ins and fade-outs between main content and ads permit a user to experience a smoother transition between content and advertisement.

FIG. 26A-Hb are illustrative diagrams representing content and associated ad insertion points (FIG. 26A) and a set of ads and corresponding ad insertion points (FIG. 26B). FIG. 26A represents three pieces of content: C1, C2 and C3. These could be three audio files or three video files, for example. Insertion points I1-I3 represent three insertion points for C1. Insertion points I4-I5 represent two insertion points for C2. Insertion points I6-I7 represent two insertion points for C3.

FIG. 26B represents metadata indicating ad insertion points for five ads A1-A5. A1 has insertion points I1, I6. A2 has insertion point I3. A3 has insertion point I2. A4 has insertion points I4 and I7. A5 has insertion points I2, I4 and I6.

There is an apparent overlap in the insertion of ads A1 and A5 and in the insertion of ads A3 and A5 and in the insertion of A4 and A5. In other words, for example, the metadata in FIG. 26B indicates that both ad A1 and ad A5 are to be inserted to insertion point I6 in content C3. Moreover, there is an apparent duplication of the insertion of ads A1, A4 and A5. In other words, for example, the metadata in FIG. 26B indicate that ad A5 is to be inserted at three different insertion points: I2 in C1, I4 in C2 and I6 in C3.

Therefore, in some embodiments, ad rotation rules are provided to guide association of ads with content.

Ad Placement Rules

For example, referring to FIGS. 26A-B, ad placement metadata may specify:
(1) A1 to be inserted to I6 only between 6 am-noon, and A1 to be inserted to I1 only during 12:01 pm-5:559 am.
(2) A5 to be rotated evenly among insert insertion points I2, I4 and I6.
(3) A2 to be removed after listened/viewed once.
(4) A2 and A4 expire after 48 hours.
(5) After A4 listened/viewed once on each of insertion points I4 and I7, A3 is rotated evenly between slots I4 and I7.

Thus, the ad placement (rotation) metadata control a process operative on the user device to rotate the association of ads with content, to thereby facilitate remote implementation of an advertising involving combination of ads with media content.

It will be appreciated that although ads are spliced into a content file, the ad rotation scheme as implemented through the agent (plug-in) can change the ads in the content file. The agent has access to the content files and can modify them by changing the ad insertions, for example. There is no need for a content refresh request from a media manager (e.g. iTunes device) or any action from the user to trigger such ad rotation or replacement. Such ad update operation can be performed on the content and ad that have been provided to the user device.

The following are some additional examples of ad rotation rules (not necessarily limited to the example of FIGS. 26A-26B). An ad campaign may have multiple advertisements. For instance, an ad campaign for beverage products may include an ad for a non-diet beverage product and an ad for a diet beverage product. The advertiser may specify that these two ads are to be rotated in any of the following manners, for example: 70% of ads played are to be for the non-diet beverage and 30% of the ads played are to be for the diet beverage, or during even weeks play non-diet beverage ads and during odd weeks play diet beverage ads, or during the evening play non-diet beverage ads and during the day, play diet beverage ads.

For example, ads may be inserted dynamically in order to achieve a degree of smart ad rotation. These criteria may include factors such as time of day during which an ad provider wants the ad to play. The insertion information also may include ad rotation rules such as, play Ad1 in the morning; play Ad2 in the afternoon; and play Ad3 in the evening. Client-side implementation of placement rules in accordance with insertion information may require the agent to access context information from the device concerning context in which content or ads are actually played. The context may be time of day during which, or location of play (obtained from a user's zip code, user's IP address or GPS device for example) at which, a device user presses a button to actually play a content file. The agent inserts an ad dynamically that is appropriate to the context in accordance with the rules criteria specified by the insertion information.

Post Consumption Recall

It will be appreciated that the network 116 used to deliver advertisements and content also can be used for communication among network users and between network users and ad providers. Therefore, there is an opportunity for users to share the ads or reactions to the ads with others connected to the same network 116 or to respond to ad providers. More specifically, for example, in some instances, ads are "short" and personalized to individual consumers based on criteria such as age, gender and location and more. A consumer may have been working out in gym when he or she heard of a product, advertisement or offer. As explained above, a system in accordance with some embodiments of the invention tracks ads a consumer has listened/viewed. Therefore, the offer in fact may have been targeted to the user based upon user profile information obtained for the user. The system also can save a history of offers for each consumer. In accordance with an aspect of the invention, a consumer can later (e.g. when he or she has more time) recall the previously listened/viewed advertisement/offer by invoking the plug-in client/agent software. The consumer can find the previously listened/viewed advertisement/offer in the past 30 days or 60 days, for example. This enables the consumer to not miss out any personalized offers (ex. 30% off dinner or dress) sent their way. The consumer then can take follow up actions such as go to the web to get further information about the "short" advertisement or making an online purchase; Making a phone call to the number indicated on the recalled advertisement; or make a VOIP call through the computer interface.

Note that in some embodiments, ad usage log is part of a usage log that is aggregated by the agent and sent to the ad servers for reporting. The ad is presented as a standard GUID play. The server distinguishes ads from other content as part of some usage analysis process, which forms no part of the present invention. So in the agent's usage log alone one cannot necessarily tell which is content and which ad.

Moreover, for example, a consumer may watch podcasts of three episodes of one TV program and two podcast episodes of another TV show (all saved on a local hard disk for instance) in one sitting on a weekend. Later, the consumer may want to provide some feedback specific to each show and the content publishers may wish to receive such feedback. In the past, there was no easy way to do this. Since a system in accordance with some embodiments saves a listened/viewed history of each episode of content a consumer has listed/viewed, the a computer program controlled process running on the system can provide a uniform interface for the consumer to comment episode by episode basis across different content providers. For instance, a computer program controlled process could permit a user to "tell a friend", e.g. to send to friends over the network, recommendations or comments concerning feeds. Alternatively, a computer program controlled process could use usage patterns to make recommendations to users, e.g. the "if you like that feed, you probably will like this feed".

Payment/Credits

In some embodiments, ad campaign providers pay content providers for the right to associate their ads with content provider content. For instance, the match system 624 may be used to determine which ads are eligible for distribution to a user, and ad provider distribution rules may be used to determine which ads to actually distribute. However, an ad campaign provider and an ad content provider generally must agree upon a payment price as a condition for insertion of ads into content.

Once a content provider approves an ad campaign or parts of it, approved ads may be scheduled to run on the content provider's channel. Once the campaign is actually running and ad media is running on the channels or the campaign has finished running, credits are applied to the content provider's account. More particularly, in accordance with a revenue sharing arrangement agreed upon by content providers and ad providers, credits corresponding to percentage of revenue from ads that have been played on a content provider's feed/channel are transferred from the ad provider to the content provider.

Some embodiments of the invention use a credit system to keep track the amount of revenue that a content provider has earned through participation in the subscription system. The credit system uses credits having a 1:1 ratio with dollars (1.50 credits equals $1.50). The credit system allows the subscription system to accumulate income for the content provider without constantly writing checks to the content providers. Content providers ultimately receive dollar payment for their earned credits. The amount paid in dollars is deducted from the credits available within content provider's credit account. The credit system also allows content providers to be advertisers, since the content providers can apply credits earned through their channels to run ads for their content on other channels.

A method of purchasing credits for purchases of ads "on" content providers' content channels permits the subscription system to quickly recognize revenue from ad purchases. The credit approach allows advertisers to set aside a specific expense budget and manage it directly on the subscription system web site.

A process for purchasing advertiser credits in accordance with one embodiment of the invention proceeds basically as follows. An advertiser enters an advertiser profile including information such as name, description, TID, maybe a credit card, contact information, web site, etc. Available credits can be broken into two categories: available credits, and pending transaction credits. Available credits can be used immediately for new campaigns. Once a campaign has been submitted, the amount of credit required to run the campaign is taken out of the available credits category and placed into pending transaction credits. An ad provider also may choose to purchase more credits. In one embodiment, credits reflect the number of dollars spent on a 1:1 ratio as explained above. If an ad provider is also a content provider, then the ad provider may earn credits through its own channels. Basically, if an entity is both an advertisement and a content publisher, the entity can transfer credit earned from the ads that have been played on its channels towards its ad campaign and buy more ad impressions. An ad provider's profile on the subscription is updated with the number of credits available.

Bidding

Alternatively, ad campaign providers and content providers may arrive at pricing terms through a bidding process. Different ad campaign providers may be willing to pay different amounts depending upon the user profile information or content attribute information, for example. A bidding process may be developed in which ad campaign providers specify amounts they are willing to pay per impression delivered and/or perceived and specify daily budget limits as to the total amounts that they are willing to spend. For example, the registration server 102 of FIG. 1 can run a program that receives ad campaign bidding information and that determines which eligible ads to send to which users based upon a bidding process. For example, for a given user profile/content combination, assume that the match system of FIG. 9 identifies ten ad campaigns that are eligible for delivery to a given user. In that case, the bidding process could be limited to the ten ad campaign providers whose ads were determined to be eligible for delivery based upon the match process. The highest bidding ad campaign provider would have its ad(s) sent to the user. The bidding process also might make provision for ranking of bid results so that ads from several bidders are be sent, for example, perhaps all for some intermediate price for instance.

It will be understood that the foregoing description and drawings of preferred embodiment in accordance with the present invention are merely illustrative of the principles of this invention, and that various modifications can be made by those skilled in the art without departing from the scope and spirit of the invention.

COMPUTER CODE APPENDIX A

Get Podcast Button Code

```
<!-- Copy and Paste this javascript in your Website to display the 'Get Podcast'
button -
->
<!-- You can substitute the button_get_podcast.gif below with your own -->
<script src="http://www.podbridge.com/js/add_channel.js" language='JavaScript'
type='text/javascript'></script>
```

COMPUTER CODE APPENDIX A-continued

```
<a href='#' onclick= 'AddChannel_onclick("http://www.podbridge.com/rss/797CDF8E-E834-4D67-A87F-
CFB60F9F863E.rss", "Wrestling Observer Live"); return false;'>
<img src='http://www.podbridge.com/images/button_get_podcast.gif' alt='Get Podcast' width='100'
height='25' border=0 align=center> </a>
```

JavaScript loaded in response to Get Podcast button

```
        function AddPcast_onclick(url,title)
        {
                AddPcast(url,title);
        }
        function AddChannel_onclick(url,title)
        {
            // Browser Detection
            var agt=navigator.userAgent.toLowerCase( );
          var is_major = parseInt(navigator.appVersion);
          var is_minor = parseFloat(navigator.appVersion);
          var is_nav = ((agt.indexOf('mozilla')!=-1) && (agt.indexOf('spoofer')==-1)
                  && (agt.indexOf('compatible') == -1) && (agt.indexOf('opera')==-1)
                  && (agt.indexOf('webtv')==-1) && (agt.indexOf('hotjava')==-1));
          var is_nav2 = (is_nav && (is_major == 2));
          var is_nav3 = (is_nav && (is_major == 3));
          var is_nav4 = (is_nav && (is_major == 4));
          var is_nav4up = (is_nav && (is_major >= 4));
          var is_navonly      = (is_nav && ((agt.indexOf(";nav") != -1) ||
                      (agt.indexOf("; nav") != -1)) );
          var is_nav6 = (is_nav && (is_major == 5));
          var is_nav6up = (is_nav && (is_major >= 5));
          var is_gecko = (agt.indexOf('gecko') != -1);
          var is_ie     = ((agt.indexOf("msie") != -1) && (agt.indexOf("opera") == -1));
          var is_ie3    = (is_ie && (is_major < 4));
          var is_ie4    = (is_ie && (is_major == 4) && (agt.indexOf("msie 4")!=-1) );
          var is_ie4up  = (is_ie && (is_major >= 4));
          var is_ie5    = (is_ie && (is_major == 4) && (agt.indexOf("msie 5.0")!=-1) );
          var is_ie5_5  = (is_ie && (is_major == 4) && (agt.indexOf("msie 5.5") !=-1));
          var is_ie5up  = (is_ie && !is_ie3 && !is_ie4);
          var is_ie5_5up =(is_ie && !is_ie3 && !is_ie4 && !is_ie5);
          var is_ie6    = (is_ie && (is_major == 4) && (agt.indexOf("msie 6.")!=-1) );
          var is_ie6up  = (is_ie && !is_ie3 && !is_ie4 && !is_ie5 && !is_ie5_5);
            var is_mac = (navigator.userAgent.toLowerCase( ).indexOf("mac") !=-1) ? true:
false;
            var kitName = "applewebkit/";
            var tempStr = navigator.userAgent.toLowerCase( );
            var pos = tempStr.indexOf(kitName);
            var is_AppleWebkit = (pos != -1);
            if(is_mac == true || is_AppleWebkit == true)
            {
                AddToMyChannels_Mac(url,title);
            }
            {
                AddToMyChannels_Moz(url,title);
            }
            else if(is_ie5up)
            {
                AddToMyChannels_PC(url,title);
            }
        }
        function AddToMyChannels_Mac(url,title)
        {
            // Detect the plugin
            if(true == FindPlugins( )) {
                window.open('http://www.podbridge.com/agent/mac_add_channel.php?url=' +
url + '&t
    e=' + title,"Safari_AddChannel","status=yes,scrollbars=no,width=500,height=650");
            } else {
                showInstallWindow_Mac( );
            }
        }
        function FindPlugins( ) {
            numMimeTypes = navigator.mimeTypes.length;
            for (i = 0; i < numMimeTypes; i++) {
                mimeType = navigator.mimeTypes[i];
                if (mimeType.type == "application/x-audiofeast" || mimeType.type ==
"application/
    odbridge") {
                    return true;
                }
            }
            return false;
        }
        function AddToMyChannels_PC(url,title)
```

COMPUTER CODE APPENDIX A-continued

```
        {   try
            {
            var xObj = new ActiveXObject("PodBridge.BroadcastService");
                if (xObj == null)
                {
                    ObjLoad = false;
                } else {
                    ObjLoad = true;
                }
                AddPC(url,title);
            }
            catch(e)
            {
                // AudioFeast Service is not present
                showInstallWindow(url,title);
        function AddToMyChannels_PC_Silent(url,title)
        {   try
            {
                var xObj = new ActiveXObject("PodBridge.BroadcastService");
                if (xObj == null)
                {
                    ObjLoad = false;
                } else {
                    ObjLoad = true;
                }
                reply = xObj.AddFeed(url,title);
            }
            catch(e)
            {
                // AudioFeast Service is not present.
                // This shouldn't ever happen -- installation should prevent this from
launching.
            }
        }
        function AddToMyChannels_Moz(url,title) {
            if(true == FindPlugins( )) {
                window.open('http://www.podbridge.com/agent/mac_add_channel.php?url=' +
url + '&title
    =' + title, "Safari_AddChannel","status=yes,scrollbars=no,width=500,height=650");
            } else {
                showInstallWindow( );
            }
        }
        function AddPC(url,title) {
            window.open("http://www.podbridge.com/agent/pc_add_channel.php?url=" + url +
"&title=" + title,
            "PC_AddChannel","status=yes,scrollbars=no,width=500,height=650");
        }
        function AddPcast(url,title) {
            window.open("http://www.podbridge.com/agent/pcast_add_channel.php?channel=" + url
+ "&title=
    " + title,"Pcast_AddChannel","status=yes,scrollbars=no,width=500,height=650");
        }
        function showInstallWindow_Mac(url,title) {
            window.open("http://www.podbridge.com/install/index.php?channel=" + url +
"&title=" + title,
            "Install","status=yes,scrollbars=no,width=500,height=650");
        }
        function showInstallWindow(url,title) {
            window.open("http://www.podbridge.com/install/index.php?channel=" + url +
"&title=" + title,
            "Install","status=yes,scrollbars=no,width=500,height=650");
        }
        function showItunesWindow( ) {
window.open("http://www.podbridge.com/install/itunes.php","Itunes","status=yes,scrollbars=no,
    width=500,height=650");
        }
        podbridge_callback( );
```

APPENDIX B

Examples of c_rules and u_rules.
[In the following, the term, c_qualrules signifies content qualifier rules. A campaign in order to get a match to content requires that the content be qualified by the campaign's c_qualrules. The term u_qualrules signifies user qualifier rules. A campaign in order to target a user requires that a user be qualified by the campaign's u_qualrules]
C_qualrules grammer;
Complex expression using:
   ([provider_rules],
   [specific_podcast_channels],
   [catalog_category_rules],
   [catalog_subcategory_rules],
   [keyword_rules],
   [usage_pattern_rules],
   [category_rules] )
Example c_qualrules:
(channel.provider_id in (3) or channel.id in (('C6F9C964-858E-4454-ACB1-4FD8AAE1E352','8A5449C1-B146-4A29-A5F7-F6CD0A0BDD72') or channel.id in (select id from channel where idxfti @@ to_tsquery('default','sports')) or channel.category in ('News') and channel.subcategory in ('Sports') or channel.category in ('Sports') and channel.category in ('News')) and channel.peaktimes in ('Morning Commute','Evening Commute') and channel.is_adult = 't' and channel.is_tobacco = 't'
Explanation:
This example campaign targets podcasts —{If the podcast provider is 'Sporting News' or if the podcasts are specifically 'Sporting News' or 'Wrestling Observer Live' or if the podcasts showup during a search by 'sports' keyword anytime now and in the future or if the podcasts are classified in the catalog under News->Sports or Sports->News now and in the future and if the channel listening peaks (by historical usage) are during the commute hours and if the channel allows adult and tobacco ads}

---

U_qualrules grammar
Complex expression using:
   ([age_rules],
   [gender_rules],
   [location_rules],
   [children_in_household_rules]
   )
Example:
users.age between (25,40) and users.gender in ('M') and ( users.zipcode in (select destination from zips_fifty where origin = '95123') or users.zipcode in ( select zipcode from metro where cbsa_name in ('San Francisco Bay Area')) and users.children = 'f'
Explanation:
Target users whose age is between 25 and 40, both genders and if (They are either 50 miles within the zipcode 95123 or If they belong to any zipcode under 'San Francisco Bay Area' US Census CBSA_NAME and there are no children in household.

---

The invention claimed is:

1. A method of managing insertion of media advertisements in media content over a network, comprising:
receiving a request for advertisement updates for insertion in media content subscribed to by a user device;
receiving information identifying at least one media advertisement to insert in the subscribed to media content on the user device, wherein the advertisement is associated with an advertisement campaign including a plurality of advertisements, the information received from a server that performs a process matching media advertisements to media content;
generating metadata in response to the request, the metadata indicating an advertisement placement rule to designate insertion location of the at least one media advertisement in the subscribed to media content, wherein the advertisement placement rule:
designates sequencing of insertion of the at least one media advertisement into one or more subscribed to media content files consistent with the location information,
associates the designated sequence with a specified condition concerning play of one of the subscribed to media content files,
designates frequency with which the at least one media advertisement is to be inserted into the subscribed to content,
designates at least one criterion for expiration of the at least one media advertisement, and
designates advertisement distribution criteria, wherein the distribution criteria include an advertisement appearance ratio associated with the advertisement campaign;
sending in response to the request the at least one media advertisement over the network to the device; and
sending the metadata over the network to the device so that the advertisement updates may be inserted into one of the subscribed to media content files in accordance with the sequence designated by the advertisement placement rule when the media content file is played under the specified condition, and wherein at least one media advertisement is inserted into the one or more subscribed to media content files prior to delivery of the media content files to the user device.

2. The method of claim 1, wherein the metadata includes metadata in an XML type format.

3. A non-transitory computer-readable storage medium having embodied thereon a program, the program executable by a processor to perform a method for managing insertion of media advertisements in media content over a network, the method comprising:
receiving a request for advertisement updates for insertion in media content subscribed to by a user device;

receiving information identifying at least one media advertisement to insert in the subscribed to media content on the user device, wherein the advertisement is associated with an advertisement campaign including a plurality of advertisements, the information received from a server that performs a process for matching media advertisements to media content;

generating metadata in response to the request, the metadata indicating an advertisement placement rule to designate insertion location of the at least one media advertisement in the subscribed to media content, wherein the advertisement placement rule:

designates sequencing of insertion of the at least one media advertisement into one or more subscribed to media content files consistent with the location information, associates the designated sequence with a specified condition concerning play of one of the subscribed to media content files, designates frequency with which the at least one media advertisement is to be inserted into the subscribed to content, designates at least one criterion for expiration of the at least one media advertisement, and designates advertisement distribution criteria, wherein the distribution criteria include an advertisement appearance ratio associated with the advertisement campaign;

sending in response to the request the at least one media advertisement over the network to the device; and sending the metadata over the network to the device so that the advertisement updates may be inserted into one of the subscribed to media content files in accordance with the sequence designated by the advertisement placement rule when the media content file is played under the specified condition, and wherein at least one media advertisement is inserted into the one or more subscribed to media content files prior to delivery of the media content files to the user device.

4. The non-transitory computer-readable storage medium of claim 3, wherein the metadata includes metadata in an XML type format.

5. A system for managing the insertion of media advertisements in media content over a network, the system comprising:

a content server hosting media content files subscribed to by a user device;

an advertisement server hosting media advertisements for insertion into the subscribed to media content files, wherein each of the media advertisements are associated with an advertisement campaign including a plurality of advertisements; and an advertisement matching server that:

matches media advertisements from the advertisement server with subscribed to media content files from the content server, the media advertisements matched with the subscribed to media content files in accordance with metadata generated in response to a request for advertisement updates, the metadata indicating an advertisement placement rule that designates an insertion location of the media advertisements in the subscribed to media content files, wherein the advertisement placement rule:

designates sequencing of insertion of at least one of the media advertisements into one or more of the subscribed to media content files consistent with the location information, associates the designated sequence with a specified condition concerning play of the one or more subscribed to media content files, wherein the advertisement updates may be inserted into one of the subscribed to media content files in accordance with the sequence designated by the advertisement placement rule when the media content file is played under the specified condition, and wherein at least one media advertisement is inserted into the one or more subscribed to media content files prior to delivery of the media content files to the user device, designates frequency with which the at least one media advertisement is to be inserted into the subscribed to content, designates at least one criterion for expiration of the at least one media advertisement, and designates advertisement distribution criteria, wherein the distribution criteria include an advertisement appearance ratio associated with the advertisement campaign.

6. The system of claim 5, wherein the advertisement matching server generates metadata that corresponds to the advertisement placement rule, the metadata delivered to the user device for insertion of the at least one media advertisement into one or more subscribed to media content files.

7. The system of claim 6, wherein the subscribed to media content files are already present at the user device prior to insertion of the at least one media advertisement.

8. The system of claim 6, wherein the subscribed to media content files are received at the user device concurrent with the at least one media advertisement.

* * * * *